United States Patent
Greenboim

(10) Patent No.: US 12,253,393 B2
(45) Date of Patent: Mar. 18, 2025

(54) SYSTEMS AND METHODS FOR DETECTING EVENTS USING DATA CLASSIFICATION

(71) Applicant: IoT Technologies LLC, La Jolla, CA (US)

(72) Inventor: Abraham Greenboim, La Jolla, CA (US)

(73) Assignee: IOT Technologies LLC, La Jolla, CA (US)

( * ) Notice: Subject to any disclaimer, the term of this patent is extended or adjusted under 35 U.S.C. 154(b) by 136 days.

(21) Appl. No.: 18/106,806

(22) Filed: Feb. 7, 2023

(65) Prior Publication Data

US 2023/0304836 A1  Sep. 28, 2023

Related U.S. Application Data

(60) Provisional application No. 63/307,370, filed on Feb. 7, 2022, provisional application No. 63/396,565, filed (Continued)

(51) Int. Cl.
*G01F 1/20* (2006.01)
*G01F 1/10* (2006.01)

(Continued)

(52) U.S. Cl.
CPC .................. *G01F 1/20* (2013.01); *G01F 1/10* (2013.01); *G01M 3/2807* (2013.01)

(58) Field of Classification Search
CPC .......... G01F 1/20; G01F 1/10; G01M 3/2807; G01M 3/3254; G01M 3/28; G06Q 10/20;

(Continued)

(56) References Cited

U.S. PATENT DOCUMENTS 11,105,705 B1 * 8/2021 Lowitz ................. G05D 7/0641
11,629,721 B2    4/2023 Greenboim
(Continued)

FOREIGN PATENT DOCUMENTS

CN       112539887 A  *  3/2021  ............... F17D 5/06
EP       2183551 B1      1/2017
JP       2020012824 A    1/2020

OTHER PUBLICATIONS

Office Action dated Oct. 6, 2023 in related U.S. Appl. No. 17/834,920, in 31 pages.

(Continued)

*Primary Examiner* — Eric S. McCall
(74) *Attorney, Agent, or Firm* — Procopio, Cory, Hargreaves & Savitch LLP

(57) ABSTRACT

Devices, systems and methods for leak detection/identification are provided herein. Also provided are devices, systems and methods for monitoring and/or measuring fluid usage. In some aspects, a system comprising a sensor, a processing system, and a platform are provided. In some aspects, the sensor may be coupled to a spinning device. The sensor can be configured to detect fluid data, which can comprise, for example, displacement data of liquid and/or movement data associated with the liquid in a container and/or flow data associated with a flow of fluid in a conduit. The processing system can be coupled with the sensor and configured to communicate the fluid data. The platform can comprise an application communicatively coupled to one or more databases storing evaluation data (e.g., known pattern data) and configured to receive the fluid data and determine if there is a leak.

16 Claims, 12 Drawing Sheets

Related U.S. Application Data on Aug. 9, 2022, provisional application No. 63/408,350, filed on Sep. 20, 2022, provisional application No. 63/418,949, filed on Oct. 24, 2022, provisional application No. 63/311,202, filed on Feb. 17, 2022, provisional application No. 63/311,271, filed on Feb. 17, 2022.

(51) Int. Cl.
| | | |
|---|---|---|
| *G01M 3/28* | (2006.01) | |
| *G01M 3/32* | (2006.01) | |
| *G06Q 10/06* | (2023.01) | |
| *G06Q 10/20* | (2023.01) | |
| *G06Q 50/02* | (2024.01) | |
| *G06Q 50/06* | (2024.01) | |
| *G06Q 50/26* | (2024.01) | |

(58) Field of Classification Search
CPC ........ G06Q 50/06; G06Q 10/06; G06Q 50/02; G06Q 50/26
See application file for complete search history.

(56) References Cited

U.S. PATENT DOCUMENTS

| | | |
|---|---|---|
| 2002/0124633 A1 | 9/2002 | Yang et al. |
| 2006/0174707 A1 | 8/2006 | Zhang |
| 2010/0292852 A1 | 11/2010 | Gertmar et al. |
| 2016/0356270 A1 | 12/2016 | Zhang et al. |
| 2018/0177064 A1 | 6/2018 | van Pol et al. |
| 2018/0202844 A1 | 7/2018 | Artiuch et al. |
| 2020/0124494 A1 | 4/2020 | Soloman |
| 2020/0240820 A1 | 7/2020 | Boerhout |
| 2020/0363283 A1 | 11/2020 | Horne et al. |
| 2021/0011500 A1 | 1/2021 | Halimi et al. |
| 2021/0131846 A1 | 5/2021 | Heim |

OTHER PUBLICATIONS

International Search Report and Written Opinion received in PCT/US2023/012529, mailed Oct. 17, 2023, 12 pages.
Official Action mailed Apr. 15, 2024 in U.S. Appl. No. 17/834,914, 37 pages.
International Search Report and Written Opinion received in PCT/US2022/032581, mailed Oct. 6, 2022, 15 pages.
International Preliminary Report on Patentability (IPRP) under Chapter I of the PCT mailed Dec. 21, 2023 in PCT/US2022/03258, 11 pages.
Office Action mailed Jan. 5, 2024 in U.S. Appl. No. 17/834,916, 15 pages.
Office Action dated Mar. 23, 2023 in related U.S. Appl. No. 17/834,916, in 19 pages.
Official Action mailed Aug. 2, 2024 in U.S. Appl. No. 18/534,383, 28 pages.

* cited by examiner

SYSTEMS AND METHODS FOR DETECTING EVENTS USING DATA CLASSIFICATION

CROSS-REFERENCE TO RELATED APPLICATIONS

This Application claims priority under 35 U.S.C. § 119(e) to U.S. Provisional Patent Applications Nos. 63/307,370, filed Feb. 7, 2022, and entitled "Systems and Methods for Detecting Leaks in a Toilet Tank and Other Water Tanks;" 63/396,565, filed Aug. 9, 2022, and entitled "Methods for Identifying Leaks Using Data Classification;" 63/408,350, filed Sep. 20, 2022, entitled "Methods of Identifying events;" 63/418,949, filed Oct. 24, 2022, entitled "Methods and Systems for Identifying Animal Activity;" 63/311,202, filed Feb. 17, 2022, entitled "Systems and Methods for Detecting and Cleaning Dust, Dirt, Ice, and Snow;" and 63/311,271, filed Feb. 17, 2022, and entitled "Systems and Methods for Dust," each of which is incorporated herein by reference as if set forth in full.

BACKGROUND

Field of the Invention

The embodiments described herein are generally directed to a method of identifying events and, more specifically, using the Wasserstein metric to classify data sets in order to identify animal specific events.

Description of the Related Art

Machine Learning algorithms are often used to classify various sets of data. However, it can be difficult for some Machine Learning algorithms to classify data sets obtained from movement sensors due to, for example, the noise present within the data.

Data obtained from various types of sensors (e.g., measuring movement, position, etc.) may be used to try to identify and/or detect an event, however, accumulation of noise within the data makes this difficult.

For example, often, it can be difficult to detect a leak in a fluid container or conduit such as a swimming pool, toilet, piping, or water/chemical tanks. With respect to liquids, one complicating factor is evaporation. For example, in a swimming pool, the water will evaporate overtime lowering the water level. It can be very difficult to determine whether a reduced water level is due to evaporation only, or also due to a leak. The conventional method for detecting leaks is the "Bucket Test." The Bucket Test involves placing tape on the inside and outside of a bucket, filing the bucket partially with water, marking the water level on the inside tape, placing the bucket on a stair in the pool, and marking the level of the pool water on the outside tape. The bucket is then left in place for a period sufficient enough for measurable evaporation to have occurred.

The water level in the pool and in the bucket will be lower and the decrease in water level inside the bucket, and in the pool (outside of the bucket) can be measured and compared. If there is no leak, then the decrease in water level inside and outside the bucket should be the same. But if there is a leak, then the decrease in the pool level, outside the bucket will be greater. However, such a bucket test is not suitable for all containers, can require pumps and that valves be shut off or otherwise adjusted, and the results can be inaccurate, for example, with weather conditions or timing requirements not being met.

As another example, Mouse infestation is a major issue in homes, particularly in small places. They construct nests near food sources and pollute them. With their wastes, mice carry nasty diseases. Human infections are also caused by their bites. It is problematic for the owners to catch and evacuate them. Mechanical animal trap devices are widely used for pest control (e.g., in residential, commercial, and industrial buildings) and other various reasons (e.g., wildlife management, hunting, etc.). It is useful to be able to remotely and automatically monitor the traps, detect animal activity near traps, and identify/classify specific types of animal activities, specific types of animals, and so on.

Cameras may be used to monitor for animal activity. However, this may not be a practical solution, since cameras are expensive and automatically identifying/classifying animal activity from video footage may require too great an amount of computer resources (e.g., computing power, communication bandwidth). Animal trap systems using other types of sensors (e.g., motion sensors) may be cumbersome and/or energy consuming. In addition, it may be difficult to analyze data from the sensors due to, for example, accumulation of noise within the data. What is needed is an animal detection system that is both energy efficient and lightweight.

Further, data obtained from various types of sensors (e.g., dropped in or installed at a fluid container) may be used to try to detect a leak, however, accumulation of noise within the data makes this difficult.

SUMMARY

Accordingly, devices, systems, methods, and non-transitory computer-readable media for classification of noisy data, obtained via one or more sensors, are disclosed herein.

In an aspect, a data evaluation system for identification/classification of movement (or other sensor data) is provided. In one embodiment, the movement may be related to one or more of: a fluid a system having a liquid flowing therethrough, a gas system having a gas/dust flowing therethrough, sports/exercise monitoring (e.g., via sensors coupled to a body, sports equipment, etc.), and working machinery (e.g., house appliances, industry equipment, road vehicles, etc.). In an embodiment, one or more sensors may be used to obtain data related to movement. In one aspect, data from one or more of sensors including an accelerometer, a compass, a gyroscope, and/or a microphone can be obtained for analysis/classification. In one embodiment, the system performs analysis/classification of the movement/sensor data in order to determine whether an event has occurred. In another embodiment, the system performs analysis/classification of the sensor data in order to determine that a current condition of a monitored system or entity belongs to one or more predetermined categories. In one embodiment, based on the results of the analysis/classification, the system is configured to perform one or more additional functions (e.g., sending notifications, saving/transmitting the results, turning on/off parts of a machine or system, adjusting parts of a machine or system, etc.).

In one aspect, analysis/classification is performed by using a Wasserstein distance/metric approach on the data received from the one or more sensor devices. The Wasserstein distance is a distance defined between two probability distributions on a given metric space and may be calculated as a distance between two data sets obtained from a sensor. The one embodiment, the system and/or method for classification/identification of movement data calculates Wasserstein distances between a first data set and a second data set, wherein the first data set comprises a known and identified evaluation data and the second data is the current movement/sensor data. In one embodiment, the Wasserstein distance(s) are then used to determine whether the second data set is "close enough" to the first data set to be categorized as belonging to the same category. In one embodiment, the Wasserstein distance(s) are used to determine how close the second data set is to the first data set (e.g., on a sliding or a discrete scale). In another embodiment, the second (current) data set may be compared (i.e., via Wasserstein distances) to a plurality of different classified first data sets (evaluation data) to determine the correct classification of the second/current data set.

In one embodiment, an evaluation method and/or system for identification/classification of movement (or other sensor) data related to sports/exercise movement is disclosed. The sports/exercise movement data may be obtained from one or more sensors (e.g., accelerometers, compasses, gyroscopes, and/or microphones) coupled to a person's body (via clothing/shoes, a wearable device, or being located near a person). In one embodiment, the system and method may be used to facilitate sports training of a user/athlete based on past performance. The past performance sensor data may be collected for the user/athlete and/or other users/athletes and saved as evaluation data. As the athlete is training, the system may then compare (via the Wasserstein metric) current sensor data (i.e., current athlete performance) to the evaluation data, to determine whether the athlete is performing similarly/close to the past performance(s). The performance may comprise a desired set of movements, as recorded by the sensor(s), for any sport or exercise (e.g., baseball, tennis, soccer, football, throwing, running, dancing, etc.). For example, a baseball player can train their swing to be similar to their own previous swing or similar to the swing(s) of one or more (other) professional baseball players. In one embodiment, the system may (i) continually or periodically compare the current performance of an athlete to a desired performance and (ii) based on the comparison, recommend improvements to the performance (e.g., swing).

In one embodiment, the system and method may be used to determine a condition of an athlete (e.g., top form, injured, out of shape, normal, etc.). For example, current sensor data may be compared to sensor data corresponding to the one or more athlete conditions (previously collected as evaluation data). In one embodiment, the system may be used to forecast/predict a winner or ranking of a race (for humans, horses, etc.) or a winner of a sports game (e.g., baseball, football, etc.) using, for example, the determination of athlete condition(s).

In an aspect, a system for leak identification/classification in a fluid system (e.g., a system having a liquid flowing therethrough, a system having a gas flowing therethrough) is provided. The leak identification/classification may comprise identifying a type of leak (e.g., stable, small, medium, major, etc.) by using a Wasserstein distance/metric approach on data received from one or more sensor devices (e.g., an accelerator, a 3-axis compass, a gyroscope, etc.). The Wasserstein distance is a distance defined between two probability distributions on a given metric space and may be calculated as a distance between two data sets obtained from a sensor. The one embodiment, the system for leak identification calculates Wasserstein distances between a first data set and a second data set, wherein the first data set is a known and identified data set and the second data set is the current data being used to identify the leak. The Wasserstein distances are then used to determine whether the second data set is "close enough" to the first data set to be categorized as belonging to the same category. In one embodiment, the second (current) data set may be compared (i.e., via Wasserstein distances) to a plurality of different classified data sets to determine the correct classification of the second/current data set.

The fluid system can comprise a conduit and a fluid (e.g., liquid, gas) flowing through the conduit. In some aspects, the fluid system can comprise one or more containers (e.g., appliances, a sink, a tub, a toilet tank, a toilet bowl, a pool, a jacuzzi, a water heater, a washing machine, a dishwasher) and a plumbing system coupled to the container(s) for directing a fluid to and/or from the container(s), and the conduit can be part of the plumbing system. It should be appreciated that when two physical components are described herein as being "coupled to" one another, such term is intended to include both direct coupling (in which two elements that are coupled to each other contact each other) and indirect coupling (in which at least one additional element is between the two elements) unless the context dictates otherwise. The fluid system can further comprise one or more sensor devices comprising at least one sensor (e.g., 1, 2, 3, 4, 5 or more sensors) configured to detect fluid data associated with the fluid passing through the conduit. The fluid data can be associated with the flow of the fluid in the conduit, and/or associated with the fluid when positioned in a toilet, pool or other container before and/or after flowing through the conduit, for example, a rise and drop in fluid level in the container, movement/velocity data from an accelerometer floating in the container, x-y-z position data, heading and angle data of a 3-axis compass sensor floating in the container, etc.).

Fluid data can further include, among other things, length of time of a flow event data obtained from a sensor positioned outside of a portion of the conduit (e.g., amount of time of a single flow event of fluid passing a portion of the conduit the sensor device is positioned in or around, for example, from a flush), vertical displacement data associated with a flow event (e.g., a flush and/or any other event causing fluid to flow in or out of the container and/or through the conduit) obtained from a sensor positioned in a toilet, pool or other container of a fluid system (e.g., change in a vertical distance from the sensor device to a top of the fluid in the container from a first time to a second time), temperature data, movement data (e.g., data associated with a movement of a sensor floating in a toilet tank, pool or other container—such as Delta over time in one or more of the XYZ coordinates), time data associated with movement data, time data associated with displacement data, time data associated with length of flow data, and/or vector magnitude data associated with a flow event obtained from a sensor positioned in a toilet, pool or other container of a fluid system. A processing system can be coupled with the at least one sensor and configured to communicate the fluid data, for example, to a platform.

The platform can comprise an application communicatively coupled to one or more databases (e.g., remote databases) storing evaluation data, and can be configured to receive the fluid data, determine if there is a leak in the fluid system and identify/classify the type of leak based at least in part on calculating Wasserstein distances between data clouds obtained from the current fluid data to the previously obtained and classified evaluation data (e.g., data corresponding to stable conditions). In some embodiments, the platform can comprise one or more databases storing evaluation data, and an application coupled with the at least one database and configured to receive the fluid data and determine if there is a leak in the fluid system based at least in part on comparing the fluid data to the evaluation data. Evaluation data can comprise data associated with the fluid system and/or data associated with other fluid systems. In some aspects, evaluation data can be collected as part of an installation process (e.g., the installer can collect baseline evaluation data for stable and normal conditions/environments and the data can be sent to the database(s) via one or more sensor devices and/or via a user system input device. In some aspects, the database(s) can store evaluation data associated with numerous fluid systems located anywhere throughout a home, a building, a city, a county, a state, a country, and/or the world, which can be indicative of various events and conditions. Such evaluation data can include, among other things, historic fluid data, vertical displacement data associated with a normal flush, displacement data associated with a small leak, displacement data associated with a medium leak, displacement data associated with a major leak, movement data (e.g., movement detected using an accelerometer) associated with a normal flush, movement data associated with a small leak, movement data associated with a medium leak, movement data associated with a major leak, length of time of flow through a conduit portion associated with a normal flush, length of time of flow through a conduit portion associated with a small leak, length of time of flow through a conduit portion associated with a medium leak, length of time of flow through a conduit portion associated with a major leak, a normal number of flushes in a given period of time, a high number of flushes in a given period of time, a tank refill time under normal conditions, temperature data, time data associated with movement data, time data associated with displacement data, time data associated with length of flow data, a tank refill time under a leak condition, and/or displacement and/or length of time of flow associated with an activity in a container (e.g., a subject (e.g., person, animal, baby, kid, adult—of various sizes, shapes, weight, etc.) jumping in a pool, a subject struggling in a pool, a subject swimming in a pool). The application can be configured to determine if there is a leak in the fluid system by comparing the fluid data obtained from the one or more sensor devices to evaluation data associated with various known events and conditions. Specifically, the application can be configured to calculate Wasserstein distance(s) from the current fluid data to the evaluation data to determine whether the conditions associated with the current fluid data can be accurately categorized as belonging to one of the known events and conditions.

In some aspects, the application can be configured to determine an event type (e.g., a leak, a flush, a jumping in a pool, a struggle in a pool, a lack of activity beyond a threshold period of time) by comparing the fluid data obtained from the one or more sensor devices to evaluation data. In another aspect, the application can be configured to determine a leak type (e.g., stable/normal, small, medium, major) by comparing the fluid data to the evaluation data. In one example, the leak type is a toilet tank leak.

In some aspects, the at least one sensor comprises one or a combination of: an accelerator, a compass, a gyroscope, and a microphone/sound sensor. In an embodiment, the at least one sensor comprises at least one accelerometer, wherein the accelerometer is positioned in a tank coupled to the conduit, the tank comprising the fluid. The fluid data can comprise accelerometer data (e.g., X, Y and/or Z coordinate data at different times; delta in X, Y and/or Z coordinate data over time) from the accelerometer positioned in the fluid in the tank, and the evaluation data can comprise at least accelerometer data associated with a normal flow of the fluid passing through the conduit, and accelerometer data associated with at least one of a minor leak, a medium leak, and a major leak of the fluid passing through the conduit. In another embodiment, the at least one sensor comprises at least one compass (e.g., a 3-axis magnetic compass sensor) positioned in the tank coupled to the conduit. The fluid data can include, for example, X-Y-Z position data and heading/orientation data associated with a normal flow of the fluid (e.g., stable with no leak). The fluid data can also include the compass data associated with various types of leaks (e.g., minor, medium, major). In one embodiment, the at least one sensor comprises at least one gyroscope positioned in the tank and the fluid data can include, for example, heading/orientation and angular velocity data associated with normal flow and/or various types of leaks. In one embodiment, the at least one sensor comprises at least one microphone positioned in or near the tank, and the fluid data can include audio data (e.g., amplitude and frequency) associated with normal and/or leak environments. In one aspect, data from one or more of the accelerometer, compass, gyroscope, and/or microphone can be used to identify a leak as discussed elsewhere in the disclosure.

All suitable fluids are contemplated, including liquids (e.g., water, liquefied/liquid gas) and gases. All suitable fluid systems are contemplated, including toilet systems (including toilet and associated plumbing), a pool system (including a pool and associated plumbing), a hot tub system (including a hot tub and associated plumbing), a gas system (e.g., an appliance such as a stove utilizing gas and associated piping), an irrigation system. It should be appreciated that the systems described herein can detect leaks in any portion of the fluid systems (e.g., a faucet, a shower hose, a toilet flapper valve, a water tank, a supply line) due to, for example, corrosion, mineral deposits, loose bolts, misalignment of pipes and/or valves, improper sealing, and/or defective gaskets, o-rings, washers, etc. Such pipes can include City utility pipes sewer, water, gas, storm drain, etc.

It is contemplated that a fluid system can comprise a pool system comprising a pool, a sample container in a pool (e.g., a cup or other small container), a fluid in the pool and the sample container, and a plumbing system for the pool (e.g., piping coupled to the pool container that is configured to contain water for swimming). The at least one sensor can comprise a distance sensor (e.g., laser sensor, ultrasound sensor), and the fluid data can comprise distance data at various times from the sensor to a top of the fluid in the pool. The evaluation data can comprise evaporation data, which can for example be obtained using a weight sensor configured to weigh the sample container (and fluid contained in the sample container) at various times. The weight sensor can be coupled to the sample container. Thus, the evaporation data can comprise weight data at different times and/or a change in weight between two or more times or time periods.

The fluid data can comprise data indicative of a distance from a sensor to the top of the fluid in the pool at different times and/or data indicative of a movement of a sensor in the fluid (e.g., floating on the fluid in the pool) over time. In some aspects, a second sensor device separate from the first sensor can comprise an ultrasonic sensor, a first sensor device can comprise the weight sensor, and optionally a third sensor device separate from the first and second devices can comprise a third sensor (e.g., ultrasonic sensor, accelerometer) and be positioned, for example, inside the pool or at least partially wrapped around a conduit of a pipe system for the pool. It should be appreciated that each sensor device can comprise a processing system coupled with at least one sensor of the sensor device, and be configured to communicate fluid data to the application running on the platform.

It is also contemplated that fluid data can be associated with a first time period of flow of the fluid passing through the conduit at a first time, and a second time period of flow of the fluid passing through the conduit at a second time. The fluid data can be associated with any suitable number of time periods of flow of a fluid passing through the conduit at any suitable number of different times (e.g., at least 20, at least 50, at least 75, at least 100, at least 150, at least 175, at least 200 period of flow at different times). This data can be gathered, for example, from a sensor positioned in a portion of the conduit and/or wrapped around a portion of the conduit. In some aspects, an ultrasonic sensor can use a transducer to send and receive ultrasonic pulses that relay back information about a flow, for example, the length of time of a flow. In some aspects, the fluid data can be associated with a single time period of flow of the fluid passing through the conduit at a first time (or two or more periods at different times), and the evaluation data can include earlier fluid data obtained via the system relating to the fluid system (e.g., from each period of flow of fluid through the conduit or conduit portion over hours, days, weeks, months, or even years), which can be associated with a normal flow from a first event (e.g., a toilet flush, or container refill), and/or an abnormal flow from a second event (e.g., toilet flush or container refill when there is a minor, medium or major leak).

In some aspects, the at least one sensor can comprise an accelerometer and the fluid data can comprise vector magnitude data.

Thus, it should be appreciated that the at least one sensor can comprise any suitable number and type(s) of sensors, including, for example, one or more accelerometers, one or more magnetic compasses, one or more gyroscopes, one or more microphones, one or more temperature sensors, one or more laser sensors, and/or one or more ultrasonic sensors.

The sensor device can be positioned, for example, in a fluid container (e.g., a toilet tank, a float in a toilet tank, a pool, a hot tub), outside of the container, and/or can be positioned in the conduit and/or can be wrapped around at least a portion of the conduit.

Some contemplated systems can further comprise a spinning device and a dynamo or other electrical generator coupled to the at least one sensor. The electrical generator can generate an output due to a spinning of the spinning device caused by a fluid flow, and the output can charge a battery of the system (e.g., a battery that powers the controller—e.g., ESP 32 microcontroller). In some aspects, a resistor can be provided, and the system (e.g., a voltage measuring module of the system) can measure how long there is voltage through the resistor, which can be used to determine how long current is flowing from the dynamo (and therefore how long the spinning device is spinning due to water flowing through the conduit). The power from the dynamo can charge a battery, and the system can detect the amount of charge stored to extrapolate how long the current was flowing, which can be the same as the span of fluid flow.

The application can further be configured to determine a future leak is likely by comparing the fluid data to the evaluation data (e.g., where the data indicates a change in refill period). For example, by comparing data associated with flush refill over time with, for example, fluid data indicating flush refill time is longer than normal, the application can determine that a leak is starting or imminent, and/or the toilet mechanism is getting old.

A user system application may be provided, and can be configured to receive condition information from the platform. The condition information can be associated with a status of the fluid system. In some aspects, the user system application can be configured to display the indication of the status of the fluid system via a display of the user system. The indication can comprise, for example, a leak warning or alert, and/or a warning or alert relating to activity or lack thereof at a time (e.g., flushing activity and/or sink use during closed hours of a business, lack of flushing activity and/or sink use for an extended number of hours (e.g., 8 hours) where activity should be detected). In some aspects, the user system application can be configured to receive information associated with the fluid system via the user interface (e.g., a toilet size, toilet usage information, known data associated with the fluid such as normal refill period (which can be evaluation data), average number of flushes per day).

It is contemplated that the systems described herein can be used to detect leaks in HVAC and/or gas systems. For example, evaluation data may comprise data indicating that a flow of a fluid (liquid gas, gas) is continuous when used, for example, for cooking or for a water heater. The fluid data detected by the one or more sensors (e.g., ultrasonic sensor(s)) can indicate that a flow of the fluid is, for example, slower, faster, and/or intermittent.

In some aspects, a method for leak identification/classification comprises using one or more hardware processors to (a) obtain fluid data (e.g., vector magnitudes within small time intervals, collected over a given period of time) from at least one sensor device, (b) calculate Wasserstein distances between a data distribution set from the obtained fluid data and at least one previously classified distribution data set, and (c) use the Wasserstein distance(s) to categorize the fluid data. In an exemplary embodiment, the fluid data can be classified as belonging to a particular set (e.g., normal, no-leak environment) if the Wasserstein distance between the fluid data and the particular set (associated with the environment) is within a predetermined threshold. In another embodiment, the fluid data set can be compared to (i.e., via Wasserstein distance) to multiple data sets associated with multiple scenarios (e.g., stable, small leak, medium leak, etc.) and be classified according to the shortest Wasserstein distance.

In some aspects, a method for detecting a leak comprises using one or more hardware processors to (a) obtain fluid data from a first sensor device, (b) obtain fluid data from a second sensor device, (c) obtain fluid data from a third sensor device, wherein each of the first, second and third sensor devices are deployed in different fluid systems (e.g., first, second and third fluid systems of the same building), and (d) determine a condition and/or usage associated with each of the first, second and third fluid systems based at least in part of the fluid data obtained from the first, second and third sensor devices. In some aspects, determining if there is a leak in one or more of the fluid systems can comprise, for example, determining a vector magnitude, a change in distance from a sensor to a fluid portion (e.g., top of a fluid in a container) over time, a period of time of a flow associated with the fluid data, or any other suitable data based on the fluid data. In some aspects, determining if there is a leak in one or more of the fluid systems can comprise, for example, comparing fluid data obtained from the first, second and/or third sensor devices to evaluation data stored in one or more databases.

In another aspect, a system for leak detection in a building comprising a plurality of fluid systems utilizing a fluid is provided. The system can comprise a plurality of sensor devices, each sensor device comprising at least one sensor configured to detect fluid data. Each sensor device can be deployed in a different fluid system of the plurality of fluid systems. The system can also comprise a plurality of processing systems, each processing system coupled with a sensor device of the plurality of sensor devices, and configured to communicate the fluid data. In some aspects, the processing system can be configured to control the sensor device. The system can also comprise a platform comprising an application coupled with one or more databases storing evaluation data. The one or more databases can comprise one or more remote databases. The application can be configured to receive the fluid data (e.g., from a processing system) and determine if there is a leak in a fluid system of the plurality of fluid systems by comparing the fluid data to the evaluation data. In some aspects, the fluid data can comprise identification data associated with a fluid system.

In another aspect, a device for fragrance dispensation based on detecting that a person sits on a toilet is provided. In one embodiment, the detection is based on movement data provided by a sensor (e.g., an accelerometer disposed near/on the toilet). In an embodiment, the device may be configured to (i) detect movement, (ii) determine that a person is about to sit on the toilet, and (iii) based on the determination, spray a fragrance and/or dispense a tablet (e.g., a slow release fragrance tablet) into the toilet. In some embodiments, since the method does not rely on a weight sensor at the toilet seat, the method may ensure that the fragrance is dispersed prior to the person actually sitting down on the toilet or very soon after. The method of identifying movement that indicates that a person is about to sit down may include a machine learning algorithm and/or the Wasserstein metric algorithm, as described elsewhere in the disclosure. Detection, or determination can result from a device installed under or near the toilet seat that can include a sensor, e.g., and accelerometer that can detect motion and determine whether, e.g., a release or spray is needed. Algorithms can be used to classify events, e.g., about to sit, initial seating, ling seating, and then these events can be used to determine whether and how much of a release is required.

All suitable fluids are contemplated, including liquids (e.g., water, liquefied/liquid gas) and gases. All suitable fluid systems are contemplated, including toilet systems (including toilet and associated plumbing), a pool system (including a pool and associated plumbing), a hot tub system (including a hot tub and associated plumbing), a gas system (e.g., an appliance such as a stove utilizing gas and associated piping), an irrigation system, and/or an HVAC system (e.g., including heating element, pipe system, ventilation element, air conditioner). The plurality of fluid systems can comprise the same or different types of fluid systems.

Fluid data can include, among other things, length of time of a flow event data obtained from a sensor positioned outside of a portion of a conduit of a fluid system, vertical displacement data associated with a flow event obtained from a sensor positioned in a toilet, pool or other container of a fluid system, movement data associated with a flow event obtained from a sensor positioned in a toilet, pool or other container of a fluid system, and/or vector magnitude data associated with a flow event obtained from a sensor positioned in a toilet, pool or other container of a fluid system.

Evaluation data can comprise data associated with one or more fluid systems of the building and/or data associated with other fluid systems (e.g., separate from the building). For example, the database(s) can store evaluation data associated with numerous fluid systems located anywhere throughout a home, a building, a city, a county, a state, a country, and/or the world, which can be indicative of various events and conditions. Such evaluation data can include, among other things, historic fluid data, fluid data (e.g., fluid data of a different type and/or of a different sensor device and/or different fluid system) vertical displacement data associated with a normal flush, displacement data associated with a small leak, displacement data associated with a medium leak, displacement data associated with a major leak, movement data associated with a normal flush, movement data associated with a small leak, movement data associated with a medium leak, movement data associated with a major leak, length of time of flow through a conduit portion associated with a normal flush, length of time of flow through a conduit portion associated with a small leak, length of time of flow through a conduit portion associated with a medium leak, length of time of flow through a conduit portion associated with a major leak, a normal number of flushes in a given period of time, a high number of flushes in a given period of time, a tank refill time under normal conditions, a tank refill time under a leak condition, and/or displacement and/or length of time of flow associated with an activity in a container (e.g., a subject (e.g., person, animal, baby, kid, adult—of various sizes, shapes, weight, etc.) jumping in a pool, a subject struggling in a pool, a subject swimming in a pool). The application can be configured to determine if there is a leak in a fluid system in the building by comparing the fluid data obtained from at least one sensor device of the plurality of sensor devices to evaluation data associated with various events and conditions.

It is contemplated that a fluid system of the building can comprise a pool system comprising a pool, a sample container in a pool, and a fluid in the pool and the same container. The at least one sensor or a sensor device deployed in the pool system can comprise a weight sensor and be coupled to the sample container. The fluid data can comprise weight data (e.g., weight of the fluid in the sample container; weight of the sample container with fluid) at different times. The evaluation data can comprise evaporation data. Additionally or alternatively, the at least one sensor of a sensor device deployed in the pool system can comprise an ultrasonic sensor, a time of light sensor, a laser sensor, and/or infrared sensor. The fluid data can comprise data indicative of a distance from the sensor to the top of the fluid in the pool at different times. In some aspects, a first sensor device can comprise the weight sensor, a second sensor device separate from the first sensor can comprise the ultrasonic sensor, and a third sensor device separate from the first and second devices can comprise a third sensor (e.g., ultrasonic sensor, accelerometer) and be at least partially wrapped around a conduit of a pipe system for the pool. It should be appreciated that each sensor device can comprise a processing system coupled with at least one sensor of the sensor device, and be configured to communicate fluid data to the application. In some aspects, the processing system can be configured to control the sensor device and/or the at least one sensor. It should also be appreciated that one or more sensor devices of a system for leak detection in a building can be deployed in a pool system, and additional sensor devices of the system can be deployed in one or more other fluid systems (e.g., jacuzzi system, toilet system, washing machine system, dishwasher system, sink system, irrigation system, HVAC system, gas system).

The fluid data can be associated with a first time period of flow of the fluid passing through a conduit of a fluid system of the plurality of fluid systems at a first time, and a second time period of flow of the fluid passing through the conduit at a second time. The fluid data can be associated with any suitable number of time periods of flow of a fluid passing through the conduit of a fluid system of the plurality of fluid systems at any suitable number of different times (e.g., at least 20, at least 50, at least 75, at least 100, at least 150, at least 175, at least 200 period of flow at different times). In some aspects, the fluid data can be associated with a single time period of flow of the fluid passing through the conduit of a fluid system of the plurality of fluid systems at a first time (or two or more periods at different times), and the evaluation data can include earlier fluid data obtained via the system relating to the fluid system (e.g., from each period of flow of fluid through the conduit or conduit portion over hours, days, weeks, months, or even years), which can be associated with a normal flow from a first event (e.g., a toilet flush, or container refill), and/or an abnormal flow from a second event (e.g., toilet flush or container refill when there is a minor, medium or major leak).

A sensor device of the plurality of sensor devices can comprise any suitable number and type(s) of sensors, including, for example, one or more accelerometers, one or more compass sensors, one or more gyroscopes, one or more microphones, one or more laser sensors, one or more temperature sensors, one or more weight sensors, and/or one or more ultrasonic sensors. In some aspects, an ultrasonic sensor can use a transducer to send and receive ultrasonic pulses that relay back information about a flow, for example, the length of time of a flow. In some aspects, the one or more sensors can comprise an accelerometer and the fluid data can comprise vector magnitude data.

A sensor device of the plurality of sensor devices can be positioned in a fluid container (e.g., a toilet tank, a float in a toilet tank, a pool, a hot tub) and/or can be positioned in the conduit and/or can be wrapped around at least a portion of the conduit.

Some contemplated systems can further comprise a spinning device and a dynamo or other electrical generator coupled to the at least one sensor device of the plurality of sensor devices. In some aspects, a sensor (and/or the resistor) can be used to measure how long there is voltage through the resistor, which can be used to determine how long current is flowing from the dynamo (and therefore how long the spinning device is spinning due to water flowing through the conduit). The power from the dynamo can charge a battery, and the system can detect the amount of charge stored to extrapolate how long the current was flowing, which can be the same as the span of fluid flow.

The application can further be configured to determine a future leak is likely in one or more fluid systems of the building by comparing the fluid data to the evaluation data. For example, by comparing data associated with flush refill over time with, for example, fluid data indicating flush refill time is longer than normal, the application can determine that a leak is starting or imminent, and/or the toilet mechanism is getting old.

A user system application may be provided, and can be configured to receive condition information from the platform. The condition information can be associated with a status of one or more fluid systems of the building. In some aspects, the user system application can be configured to display the indication of the status of the fluid system via a display of the user system. The indication can comprise, for example, a leak warning or alert. In some aspects, the user system application can be configured to receive information associated with the fluid system via the user interface and/or an input device (e.g., a toilet size, toilet usage information) and communicate such information to the platform.

In another aspect, a fluid monitoring system is provided. The fluid monitoring system can comprise at least one sensor (e.g., an accelerometer) configured to detect fluid data associated with a fluid flowing through a first pipe section, a wired or wireless communication interface; and at least one processor configured to perform instructions, the instructions configured to cause the at least one processor to (a) receive the fluid data, (b) determine whether the fluid data is indicative of a normal condition or an abnormal condition, and (c) upon determining the fluid data is indicative of an abnormal condition, at least one of (1) cause a fluid valve coupled to the fluid pipe section to adjust, (2) modify a parameter associated with the at least one sensor, and (3) transmit to at least one of a platform, an external system and a user system, via the communication interface, at least one of the fluid data and a notification relating to the fluid data.

The parameter associated with the at least one sensor can be, for example, associated with a frequency and/or length of time the accelerometer is configured to detect the fluid data. Causing the fluid valve coupled to the fluid pipe section to adjust can comprise closing the fluid valve. Additionally or alternatively, causing the fluid valve to adjust can comprise controlling an electric motor coupled to the fluid valve. The valve can comprise any suitable valve, including, for example, a ball valve. The fluid monitoring system can also comprise a motor coupled to the at least one sensor and the fluid valve.

The fluid data can comprise any suitable data as described elsewhere herein, and can include, for example, vibration data, accelerometer data, magnetic compass data, etc.

In some embodiments, the fluid monitoring system can comprise a second sensor (e.g., accelerometer) configured to detect a second fluid data associated with a second fluid flowing through a second pipe section, a second wired or wireless communication interface, and at least one second processor configured to perform instructions, the instructions configured to cause the at least one second processor to (a) receive the second fluid data, (b) determine whether the second fluid data is indicative of a second normal condition or a second abnormal condition, and (c) upon determining the second fluid data is indicative of a second abnormal condition, at least one of (1) cause a second fluid vale coupled to the second fluid pipe section to adjust, (2) modify a parameter associated with the second sensor, and (3) transmit to at least one of the platform, the external system and the user system, via the second communication interface, at least one of the second fluid data and a second notification relating to the second fluid data. The notification(s) can be indicative of, for example, a present or future leak.

In yet another aspect, a method for detecting a leak is provided, comprising using one or more hardware processors to (a) obtain output data associated with an output of an electrical generator, wherein the electrical generator is coupled to a spinning device positioned in at least one of a fluid conduit and a fluid container, and wherein the output is generated via the spinning of the spinning device caused by a flow of the fluid in the at least one of the fluid conduit and the fluid container, and (b) determine if there is a leak in the fluid system comprising the at least one of the fluid conduit and the fluid container based at least in part on the output data. In some aspects, the method can comprise using the one or more hardware processors to (c) obtaining charge data associated with a battery configured to be charged by the output of the electrical generator. In some aspects, the step of determining if there is a leak in the fluid system comprising the at least one of the fluid conduit and the fluid container is based at least in part on the charge data. In some aspects, determining if there is a leak in the fluid system comprising the at least one of the fluid conduit and the fluid container can comprise comparing at least one of the output data and the charge data with evaluation data (e.g., charge data associated with a normal event such as a flush, charge data associated with an abnormal event, output data associated with a normal event, output data associated with an abnormal event) stored in one or more databases. In some aspects, the output data can comprise output data associated with different time periods and/or events. In some aspects, the charge data can comprise charge data associated with different time periods and/or events. In some aspects, the output data can comprise a change in output data detected at different time periods and/or events. In some aspects, the charge data can comprise a change in charge data associated with different time periods and/or events.

In yet another aspect, a system for a conduit having a fluid flowing therethrough is provided, comprising a spinning device, an electrical generator, a resistor, at least one module, a battery, and a controller. The spinning device can comprise a hub, and optionally a set of blades radiating from the hub, and can be configured to be positioned in the conduit and to rotate when the fluid flows therethrough and/or when the fluid flows that contacts the spinning device. The electrical generator (e.g., a dynamo) can be coupled to the spinning device and configured to generate an output (e.g., electrical energy) based at least in part on a rotation of the spinning device when the fluid flows therethrough. The resistor can be configured such that the output passes through the resistor. The at least one module (e.g., voltage measuring module) can be configured to obtain output data associated with the output that passes through the resistor (e.g., voltage across the resistor), for example, a length of time a voltage across the resistor is measured. The battery can be coupled to the electrical generator and configured to be charged by the output. The controller can comprise an application configured to receive the output data and determine a status of a fluid system comprising the conduit based at least in part on the output data. In some aspects, the battery is configured to charge the system or component thereof such that not external power source is needed. In some aspects, the output data comprises a length of time a voltage across the resistor is measured. In some aspects, the status of the fluid system comprises a current or future leak.

All suitable fluids are contemplated, including liquids (e.g., water, liquefied/liquid gas) and gases. All suitable fluid systems are contemplated, including toilet systems (including toilet and associated plumbing), a pool system (including a pool and associated plumbing), a hot tub system (including a hot tub and associated plumbing), a gas system (e.g., an appliance such as a stove utilizing gas and associated piping), an irrigation system, and/or an HVAC system (e.g., including heating element, pipe system, ventilation element, air conditioner).

The status can comprise a normally functioning/stable fluid system (e.g., toilet system) or an abnormally functioning fluid system (e.g., minor, medium or major leak, or future leak detected).

The electrical generator can be coupled to the controller, for example, via wires and a slip ring device. The electrical generator can be coupled to the spinning device via gears, and the gears can be configured to reduce a torque of a rotational motion generated by the spinning device. Additionally or alternatively, the electrical generator can be coupled to the hub of the spinning device, or a blade of a set of blades radiating from the hub.

The application can be coupled to a database storing evaluation data. Evaluation data can comprise data associated with the fluid system and/or data associated with other fluid systems. For example, the database(s) can store evaluation data associated with numerous fluid systems located anywhere throughout a home, a building, a city, a county, a state, a country, and/or the world, which can be indicative of various events and conditions. Such evaluation data can include, among other things, fluid data (e.g., any of the fluid data described in this disclosure), output data associated with a normal flush, output data associated with a small leak, output data associated with a medium leak, output data associated with a major leak, length of time of flow and/or charge associated with a normal flush, length of time of flow and/or charge associated with a small leak, length of time of flow and/or charge associated with a medium leak, length of time of flow and/or charge associated with a major leak, a normal number of flushes in a given period of time, a high number of flushes in a given period of time, a tank refill time under normal conditions, a tank refill time under a leak condition, and/or output and/or length of time of flow associated with an activity in a container (e.g., a subject (e.g., person, animal, baby, kid, adult—of various sizes, shapes, weight, etc.) jumping in a pool, a subject struggling in a pool, a subject swimming in a pool). The application can be configured to determine if there is a leak in the fluid system by comparing the output data obtained from the one or more sensor devices to evaluation data associated with various events and conditions. The application can be configured to determine a status of a fluid system comprising the conduit based at least in part on the output data and the evaluation data. In some embodiments, the application can be configured to determine the status based at least in part on determining a current in the system based on the output data (e.g., where the output data comprises data associated with voltage across the resistor). In some embodiments, the application is configured to determine the status based at least in part on determining an overall power of the system based on the current and the power data. In some embodiments, the application is configured to transmit power data associated with the overall power to a user system application (e.g., a mobile phone app, a home monitor application such as Blink™).

Any of the methods above and elsewhere in this application may be embodied, individually or in any combination, in executable software modules of a processor-based system, such as a server, and/or in executable instructions stored in a non-transitory computer-readable medium.

Other advantages and benefits of the disclosed devices, systems and methods will be apparent to one of ordinary skill with a review of the following drawings and detailed description.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
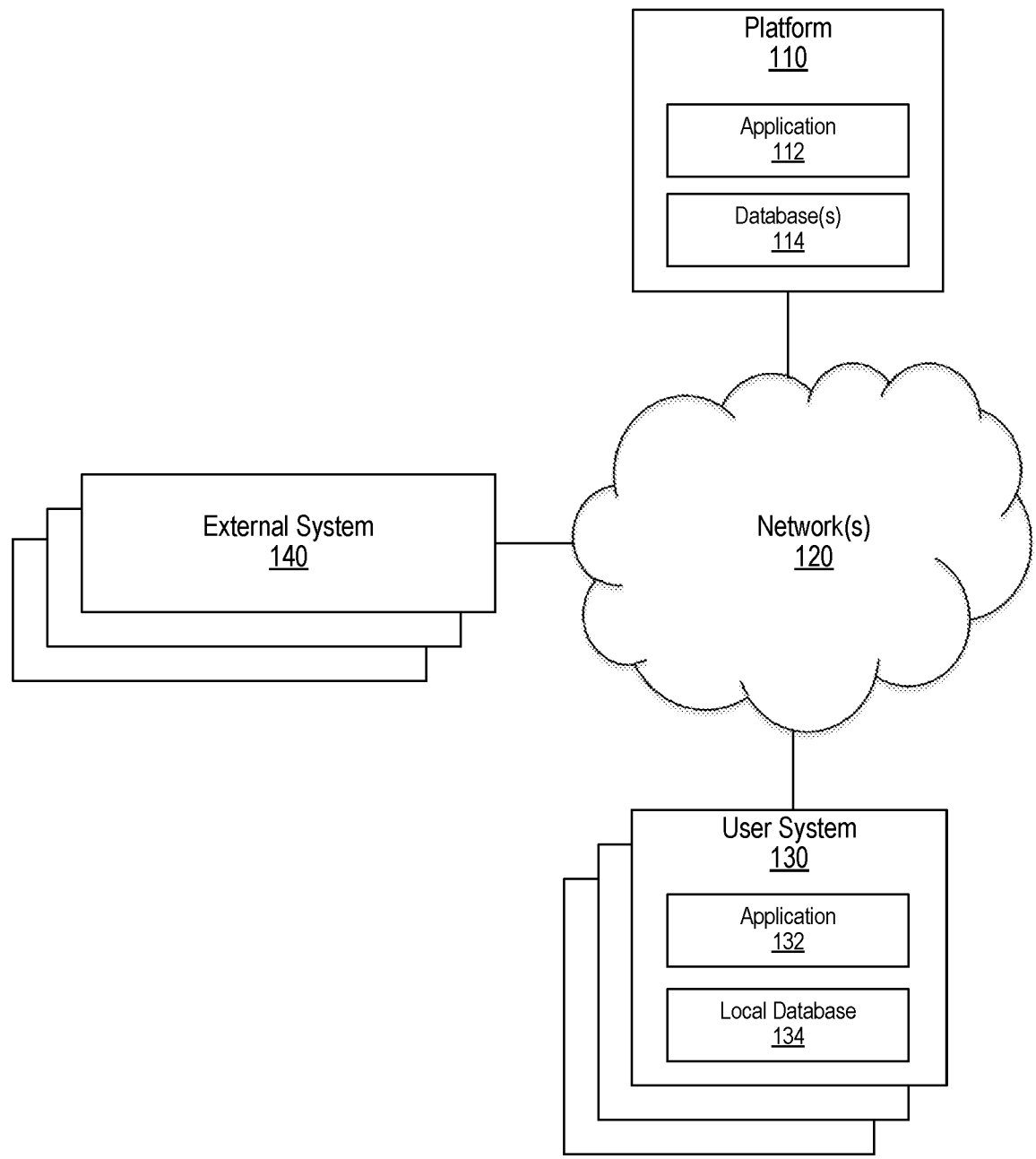
FIG. 1 illustrates an example infrastructure, in which one or more of the processes described herein, may be implemented, according to an embodiment.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

In the following disclosure, a reference to a sensor or sensors can include, unless indicated to the contrary, at least any of the following an accelerometer, a gyroscope, a compass, a sound sensor, a laser sensor, a temperature sensor, and an ultrasonic sensor, video camera and frame camera. Simply referencing one or more of these sensors, does not necessarily mean that other in this lost or other sensors generally cannot be used.

In some aspects of the disclosure, systems, methods, and non-transitory computer-readable media are disclosed for measuring usage and/or for leak detection in a container (e.g., pool tank, toilet tank) or conduit (e.g., plumbing pipes) that contains a fluid. Sensors can be placed in or adjacent the container and data can be transmitted to a platform where the data can be viewed and/or transmitted to a user system, e.g., a smartphone application, for viewing. An example platform on which the systems and methods can be implemented is described first, followed by a description of a processing system on which various aspects of the system can be implemented. The systems and methods are then described in the context of the platform and processing system. In some aspects, the platforms described herein can execute code using one or more computer processors.

In some aspects, a system for leak detection is provided, comprising a sensor device comprising at least one sensor configured to detect vertical displacement data (displacement in the z-axis) of liquid in a container, a processing system coupled with the sensor and configured to control the sensor and communicate the displacement data, and a platform comprising a database storing evaluation data, and an application coupled with the database and configured to receive the displacement data and determine if there is a leak in the container (e.g., in the container or associated plumbing) by comparing the displacement data to the evaluation data. In some embodiments, the application is configured to communicate with an automated valve fluidly coupled to the container to cause the valve to adjust (e.g., shut off). In some embodiments, the application is configured to communicate with an external system to schedule (or provide an interface for scheduling) a plumbing consultation or service based on a detection. In some embodiments, the application is configured to communicate with a user system of a service provider, building manager, and/or other entity, to indicate a type of leak, provide evidence, request and receive feedback and/or fluid system information (e.g., confirmation of leak, toilet size or other information, pool size, toilet usage information, age of toilet, pool or other object, date and/or other information relating to a service (e.g., an earlier service) to the fluid system) based at least in part on the displacement data.

In some aspects, the system can further comprise a user system application configured to receive condition information from the platform associated with a status of the container. The user system application can be further configured to display or otherwise transmit an indication of the status of the container via a display of the user system, and/or to receive user feedback, for example, relating to the accuracy of the condition information. The indication can comprise a sound (e.g., an alarm), visual or other indication of a potential leak or abnormal activity.

The sensor device can comprise any suitable sensor(s), including, for example, an accelerometer, a compass, a gyroscope, sound sensor, temperature sensor, barometer, ultrasonic sensor, distance sensor, weight sensor, and/or a laser sensor. In some aspects, the sensor is configured to detect displacement in the x-axis, y-axis, and/or z-axis. For example, the x, y and z axis data from an accelerometer and/or gyroscope can be used in determining if there is a leak. In some aspects, the magnitude of a vector (or vector magnitude), for example, according to the equation vector magnitude=$\sqrt{(x^2+y^2+z^2)}$, can be used in determining if there is a leak and/or monitoring fluid flow based on the displacement data. It should be appreciated that accelerometer data comes in XYZ coordinate values, and contemplated systems can use accelerometer data in any suitable way in determining movement of the accelerometer (e.g., Delta over time in each coordinate), for example, as the accelerometer floats in the fluid of a container. In some aspects, a formula for the angle of the vector displacement can be used in determining if there is a leak and/or monitoring fluid flow.

In some aspects, the sensor is included in a drone and can be remotely controlled or be programmed with a software-controlled flight plan.

The sensor can be place anywhere in the container, including, for example, floating on the surface of the fluid in the container, or coupled to and/or positioned within the float of the container (e.g., toilet tank).

The vertical displacement data can comprise data indicative of a rise and/or drop in the liquid in the container. The vertical displacement data and any other suitable data from the sensor(s) (e.g., fluid data as described elsewhere in this disclosure) can be used to determine whether there is a leak and/or whether a leak is minor, medium, or major.

The evaluation data can comprise any suitable data associated with the system itself, the container, the conduit, the liquid, the gas, and/or containers, conduits and fluids separate of the system, for example, any of the evaluation data described elsewhere in this disclosure. For example, the container can comprise a toilet, a pool, a spa, or a jacuzzi, and the evaluation data can comprise historic displacement data, frequency data (e.g., of flushes or rapid displacements), time data associated with displacement, length of time data associated with displacement, rate data associated with displacement, feedback data (e.g., if a determined leak has been confirmed or reported as inaccurate), threshold data (e.g., when a valve should be adjusted, evaporation data, when a service should be scheduled), vertical displacement data (e.g., different vertical displacement data, historic vertical displacement data, vertical displacement data associated with a different fluid system), movement data, fluid data (e.g., historic fluid data, fluid data associated with a different fluid system), or any other suitable data associated with the toilet, pool, spa or jacuzzi, and/or a different toilet, pool, spa or jacuzzi.

In some aspects, one or more algorithms that use Wasserstein Distance(s) are utilized to detect a leak. For example, the system can detect whether data is indicative of normal use conditions or a leak by calculating Wasserstein distance(s) between the current data distribution and evaluation data (previously classified as normal). The abnormal activity can comprise, for example, a future leak or a current leak.

The platform can comprise, for example, a user computing device (e.g., a mobile phone, tablet, laptop, computer), or could comprise a third party back end system, which can be coupled to one or more user devices.

In some aspects, the system can be used in an open container such as a pool, and can comprise a second sensor and/or sensor device configured to detect vertical displacement data of liquid in a smaller container (e.g., within the container). It is contemplated that evaporation information (which can be evaluation data) can be derived from the displacement data obtained by the second sensor. For example, the two sensors can be used in a similar manner to a bucket test for pools, where sensor data is automatically collected after a pre-determined evaporation period (e.g., 24 hours) and can be more accurate and reliable than markings typically used with bucket tests.

In some aspects, the container can comprise an open container, and the application can further be configured to determine whether a person has entered the pool based on, for example, the displacement data, the movement data, and/or the accelerometer data (e.g., accelerometer movement data). In some aspects, the system can further comprise a second sensor and/or sensor device configured to detect at least one of a chlorine level, a bromine level, a pH level, and an alkaline level in the liquid, wherein the processing system is coupled with the second sensor and configured to control the sensor and/or communicate data associated with the at least one of the chlorine level, the bromine level, the pH level, and the alkaline level to the platform, which can be communicated to a user system application and/or used to determine a condition of the container, the fluid in the container, and/or plumbing associated with the container.

In some aspects, the systems described herein can further comprise one or more sensors configured to detect at least one of a sound, a temperature, a humidity, an acceleration, and a barometric pressure. The application can be configured to receive sensor data associated with the sound, temperature, humidity, acceleration, barometric pressure, etc. In some aspects, the application can be configured to determine if there is a leak or likely future leak in the container at least in part on the additional data.

According to another aspect, a system for leak detection in a building comprising a plurality of toilet tanks is provided, comprising a plurality of sensor devices each configured to detect vertical displacement data of water in a toilet tank, each sensor device of the plurality of sensor devices being deployed in a different toilet tank of the plurality of toilet tanks. The system can further comprise a plurality of processing systems, each processing system of the plurality of processing systems coupled with a sensor device of the plurality of sensor devices and configured to communicate the displacement data and/or control the sensor device(s). The system can further comprise a platform, comprising a database storing evaluation data, and an application coupled with the database and configured to receive the displacement data and determine if there is a leak in a toilet tank (e.g., the toilet tank or associated plumbing) of the plurality of toilet tanks by comparing the displacement data to the evaluation data. In some aspects, the communication between the main and the devices can be done in mesh networks (e.g., custom made mesh network), for example, in a hotel environment with each device acting as a hot spot to a neighboring device.

In some aspects, the system can further comprise a user system application configured to receive condition information from the platform associated with a status of the one or more of the toilet tanks. The user system application can be further configured to display or otherwise transmit an indication of the status of one or more of the toilet tanks via a display of the user system, and/or to receive user feedback, for example, relating to the accuracy of the condition information. The indication can comprise a sound (e.g., an alarm), visual or other indication of a potential leak or abnormal activity.

The sensor devices can comprise any suitable sensor(s), including, for example, an accelerometer, a gyroscope, a microphone/sound sensor, a temperature sensor, a distance sensor, humidity sensor, barometer, and/or a laser sensor. In some aspects, the sensor is further configured to detect displacement in the x-axis, y-axis, or both. The sensor can be place anywhere in the container, including, for example, floating on the surface of the fluid in the tank, coupled to the float of a toilet tank and/or positioned inside the float. In some aspects, the sensor can be placed outside of the container.

In some aspects, the systems described herein can further comprise one or more sensors configured to detect at least one of a sound, a temperature, a humidity, an acceleration, and a barometric pressure associated with a toilet tank of the plurality of toilet tanks. The application can be configured to receive sensor data associated with the sound, temperature, change in a temperature, humidity, acceleration, barometric pressure, etc. In some aspects, the application can be configured to determine if there is a leak in one or more of the toilet tanks at least in part on the additional data.

In some aspects, the system can further comprise a user system application configured to receive information from the platform associated with a status of at least one toilet tank of the plurality of toilet tanks (e.g., whether there is a leak). In some aspects, the user system application can be further configured to display (or otherwise transmit) an indication of the status of at least one toilet of the plurality of toilet tanks via a display, speaker or other interface of the user system.

According to yet another aspects, a system for leak detection is provided, comprising a spinning device, a sensor coupled with the spinning device and configured to detect flow data associated with a flow of fluid in a conduit, a processing system coupled with the sensor and configured to communicate the flow data (and/or control the sensor), and a platform comprising a database storing known pattern data related to known patterns of flow, and an application coupled with the database and configured to receive the flow data and determine if there is a leak by comparing the data to a subset of the known pattern data. The flow data can comprise any data associated with the fluid flowing through the conduit (e.g., rate of flow, length of time of flow, type of flow, content of flow, accelerometer data, movement of accelerometer, spin data, ultrasonic sensor data). The known pattern data can comprise any data indicative of a known pattern of flow in the system or outside of the system. In some aspects, the sensor an comprise at least one of a gyroscope, a compass, and an accelerometer. In some aspects, the sensor can be coupled with the processing system via wires and a slip ring device. In some aspects, the system can be trained over time to increase accuracy as to what a normal activity and abnormal activity looks like. In some aspects, the systems described herein can further comprise one or more sensors configured to detect at least one of a sound, a temperature, a humidity, an acceleration, and a barometric pressure. The application can be configured to receive sensor data associated with the sound, temperature, humidity, acceleration, barometric pressure, etc. In some aspects, the application can be configured to determine if there is a leak in the container at least in part on the additional data. In some aspects, the conduit can be coupled to a pool, jacuzzi, tub, toilet, sink, coffee maker, washing machine, or any other appliance with a fluid connection.

According to another aspect, a method for leak detection is provided comprising using at least one hardware processor to: obtain sensor data from one or more sensors positioned in and/or coupled to at least one of a conduit and a container, the sensor data including fluid data (e.g., flow data, vertical displacement data, movement data, length of time of a flow event) obtained over time; and identify (e.g., by determining) a status of the at least one of the conduit and the container (e.g., normal activity, a leak, a danger, activity in the container; environment around the conduit and/or container). In some contemplated methods, the at least one hardware processor can be used to communicate with an automated valve fluidly coupled to the container and/or conduit to cause the valve to adjust (e.g., shut off). In some contemplated methods, the at least one hardware processor can be used to communicate with an external system to schedule a plumbing consultation or service based on a detection. In some contemplated methods, the at least one hardware processor can be used to communicate with a user system of a service provider, building manager, and/or other entity, to indicate a type of leak, provide evidence, request and receive feedback (e.g., confirmation of leak) based at least in part on the displacement data.

In yet another aspect, a system for leak detection in a fluid system (e.g., a system having a liquid flowing therethrough, a system having a gas flowing therethrough) is provided. The fluid system can comprise a conduit and a fluid (e.g., liquid, gas) flowing through the conduit. The fluid system can further comprise one or more sensor devices comprising at least one sensor (e.g., 1, 2, 3, 4, 5 or more sensors) configured to detect fluid data associated with the fluid passing through the conduit. The fluid data can be associated with the flow of the fluid in the conduit, and/or associated with the fluid within a toilet, pool or other container before and/or after flowing through the conduit (e.g., rise and drop in fluid level in the container). As described elsewhere herein, fluid data can include, among other things, length of time of a flow event data obtained from a sensor positioned outside of a portion of the conduit (e.g., length of time of a fluid of a flow event passes a portion of the conduit where the sensor is positioned), vertical displacement data associated with a flow event obtained from a sensor positioned in a toilet, pool or other container of a fluid system (e.g., distance data at different times from the sensor to a top of a fluid in the container), movement data, and/or vector magnitude data associated with a flow event obtained from a sensor positioned in a toilet, pool or other container of a fluid system. A processing system can be coupled with the at least one sensor and configured to communicate the fluid data, for example, to a platform. In some aspects, the processing system can be configured to control the sensor device and/or the at least one sensor. The platform can comprise an application communicatively coupled to one or more databases (e.g., remote databases) storing evaluation data, and configured to receive the fluid data and determine if there is a leak in the fluid system based at least in part on comparing the fluid data to the evaluation data. In some embodiments, the platform can comprise one or more databases storing evaluation data, and an application coupled with the at least one database and configured to receive the fluid data and determine if there is a leak in the fluid system based at least in part on comparing the fluid data to the evaluation data. In some aspects, determining if there is a leak in the fluid can comprise, for example, determining a vector magnitude, a change in distance from a sensor to a fluid portion (e.g., top of a fluid in a container) over time, a period of time of a flow associated with the fluid data, or any other suitable data based on the fluid data. Evaluation data can comprise data associated with the fluid system and/or data associated with other fluid systems. For example, the database(s) can store evaluation data associated with numerous fluid systems located anywhere throughout a home, a building, a city, a county, a state, a country, and/or the world, which can be indicative of various events and conditions. As described elsewhere herein, such evaluation data can include, among other things, fluid data, weight data associated with a smaller container positioned in the container and holding the same type of fluid as the container, vertical displacement data associated with a normal flush, displacement data associated with a small leak, displacement data associated with a medium leak, displacement data associated with a major leak, length of time of flow through a conduit portion associated with a normal flush, length of time of flow through a conduit portion associated with a small leak, length of time of flow through a conduit portion associated with a medium leak, length of time of flow through a conduit portion associated with a major leak, a normal number of flushes in a given period of time, a high number of flushes in a given period of time, a tank refill time under normal conditions, a tank refill time under a leak condition, and/or displacement and/or length of time of flow associated with an activity in a container (e.g., a subject (e.g., person, animal, baby, kid, adult—of various sizes, shapes, weight, etc.) jumping in a pool, a subject struggling in a pool, a subject swimming in a pool). The application can be configured to determine if there is a leak in the fluid system by comparing the fluid data obtained from the one or more sensor devices to evaluation data associated with various events and conditions.

According to one aspect, a method for leak detection is provided comprising using at least one hardware processor to (a) obtain fluid data (e.g., from a sensor device) associated with a fluid flowing through a conduit and/or in a container of a first fluid system, and (b) determine whether there is a normal or abnormal condition associated with the first fluid system based on the fluid data. The fluid data can be obtained, for example, from a processing system coupled to the at least one sensor. In some aspects, the fluid data can comprise sets of data obtained at different time periods, and/or can comprise data associated with a change in the fluid data between a first time and a second time, a second time and a third time, and so forth. Determining whether there is a normal or abnormal condition associated with the first fluid system can comprise, for example, comparing the fluid data to evaluation data stored in one or more databases. Determining whether there is a normal or abnormal condition associated with the first fluid system can comprise, for example, determining a vector magnitude, a change in distance from a sensor to a fluid portion (e.g., top of a fluid in a container) over time, a period of time of a flow associated with the fluid data, or any other suitable data based on the fluid data. The evaluation data can in some methods comprise different sets of data associated with different time periods and/or conditions.

All suitable fluids are contemplated, including liquids (e.g., water, liquefied/liquid gas) and gases. All suitable fluid systems are contemplated, including toilet systems (including toilet and associated plumbing), a pool system (including a pool and associated plumbing), a hot tub system (including a hot tub and associated plumbing), a gas system (e.g., an appliance such as a stove utilizing gas and associated piping), an irrigation system, and/or an HVAC system (e.g., including heating element, pipe system, ventilation element, air conditioner).

It is contemplated that a fluid system can comprise a pool system comprising a pool, a sample container in a pool, and a fluid in the pool and the same container. The at least one sensor can comprise a weight sensor and be coupled to the sample container. The fluid data can comprise weight data (e.g., weight of the fluid in the sample container; weight of the sample container with fluid) at different times (e.g., a first time and a second time at least 15 minutes, at least 30 minutes, at least 1 hour, at least 3 hours, at least 6 hours, at least 12 hours, at least 24 hours apart, or between 12-36 hours apart). The evaluation data can comprise evaporation data (e.g., a change in fluid level associated with evaporation over a time period when everything in the pool system is functioning normally). Additionally or alternatively, the weight data can comprise evaluation data, and the at least one sensor detecting fluid data can comprise an ultrasonic sensor. The fluid data can comprise data indicative of a distance from the sensor to the top of the fluid in the pool at different times (e.g., a first time and a second time at least 15 minutes, at least 30 minutes, at least 1 hour, at least 3 hours, at least 6 hours, at least 12 hours, at least 24 hours apart, or between 12-36 hours apart). In some aspects, a first sensor device can comprise the weight sensor (for example, to gather evaluation data), a second sensor device comprising a sensor separate from the first sensor device can comprise the ultrasonic sensor (or other distance sensor or other sensor), for example, to gather fluid data, and optionally a third sensor device separate from the first and second devices can comprise a third sensor (e.g., an ultrasonic sensor, an accelerometer), for example, to gather fluid data. In some aspects, the third sensor device can be positioned in the container, outside of the container, and/or at least partially wrapped around a conduit of a pipe system for the pool. It should be appreciated that each sensor device can comprise a processing system coupled with at least one sensor of the sensor device, and be configured to communicate fluid data to the application. In some aspects, the processing system can be configured to control the sensor device and/or the at least one sensor.

In some aspects, for example, where a sensor is positioned in or around a portion of a conduit of a fluid system (e.g., within a pipe section, wrapped around a pipe section), fluid data can be associated with a first time period of flow of the fluid passing through the conduit (or portion thereof—e.g., where a sensor is positioned) at a first time, and a second time period of flow of the fluid passing through the conduit (or portion thereof) at a second time. The fluid data can be associated with any suitable number of time periods of flow of a fluid passing through the conduit at any suitable number of different times (e.g., at least 20, at least 50, at least 75, at least 100, at least 150, at least 175, at least 200 period of flow at different times). In some aspects, the fluid data can be associated with a single time period of flow of the fluid passing through the conduit at a first time (or two or more periods at different times), and the evaluation data can include, for example, earlier fluid data obtained via relating to the fluid system (e.g., from each period of flow of fluid through the conduit or conduit portion over hours, days, weeks, months, or even years), which can be associated with a normal flow from a first event (e.g., a toilet flush, or container refill), and/or an abnormal flow from a second event (e.g., toilet flush or container refill when there is a minor, medium or major leak). Viewed from another perspective, evaluation data can comprise historic fluid data associated with the fluid system. In some aspects, evaluation data can comprise fluid data associated with remote fluid systems. In some aspects, determining if there is a leak can comprise a comparison of one or more time periods of flow from the fluid data and one or more time periods of flow from the evaluation data.

The sensor device from which fluid data is obtained can comprise any suitable number and type(s) of sensors, including, for example, one or more accelerometers, one or more compass sensors, one or more gyroscopes, one or more sound sensors, one or more temperature sensors, one or more laser sensors, and/or one or more ultrasonic sensors. In some aspects, an ultrasonic sensor can use a transducer to send and receive ultrasonic pulses that relay back information about a flow, for example, the length of time of a flow. In some aspects, the one or more sensors can comprise an accelerometer and the fluid data can comprise vector magnitude data.

The sensor device can be positioned, among other positions, in or adjacent a fluid container (e.g., a toilet tank, a float in a toilet tank, a pool, a hot tub) and/or can in a conduit and/or can be wrapped around at least a portion of the conduit.

In some contemplated methods, the fluid data can comprise a length of time there is voltage measured through a resistor, output data associated with an output of an electrical generator (e.g., dynamo) from a flow of a fluid causing a spinning device coupled to the electrical generator to spin, and/or charge data associated with a battery charged by the output of the electrical generator.

In some methods, the abnormal condition can comprise a future leak that is determined to be likely based on comparing the fluid data to the evaluation data. For example, by comparing data associated with flush refill over time with, for example, fluid data indicating flush refill time is longer than normal, it can be determined that a leak is starting or imminent, and/or the toilet mechanism is getting old. As another example, the fluid data obtained cam comprise a set of fluid data (e.g., length of time of a flow event and/or output from a dynamo from a flow event, movement data of an accelerometer in the fluid in a container) associated with flow events (or lack thereof) at different times (e.g., at least 2, at least 5, at least 10, at least 15, at least 20, at least 25, at least 50, at least 75, at least 100 different times), for example, within an hour, a 12 hour, a 24 hour, a 48 hour, a 72 hour, or a week period. A pattern and/or a change (e.g., length of time of flow changes by at least 10%, by at least 15%, by at least 20%, by at least 25%, by at least 35%, by at least 45%, by at least 50%, by at least 75%, by at least 100%) can be identified and associated with a condition, such as a future leak. In some aspects, the condition can be determined based on the set of fluid data obtained from the sensor device, evaluation data stored in one or more databases, and optionally other information.

In some contemplated methods, a step of using the at least one hardware processor to send condition information to a user interface is provided. The condition information can be associated with a status of the fluid system. In some aspects, a step of using the at least one hardware processor to display the indication of the status of the fluid system via a display of the user system is provided. The indication can comprise, for example, a leak warning or alert. In some aspects, a step of using the at least one hardware processor to receive information associated with the fluid system via the user interface (e.g., a toilet size, toilet usage information) is provided.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120, or may be entirely implemented on the loopback (e.g., localhost) interface. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases. In addition, communication between any of these systems, for example, platform 110, user systems 130, and/or external system 140, may be entirely implemented on the loopback (e.g., localhost) interface.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. Each user system 130 may comprise or be communicatively connected to a client application 132 and/or one or more local databases 134. In some aspects, an application 132 can be downloaded onto a user system 130, such as a user's phone or tablet that allows them to, for example, set up an account and log-on. While user system 130 and platform 110 are shown here as separate devices connected by a network 120. User system 130 may comprise an application 132 that may comprise one portion of a distributed cloud-based system that integrates with platform 110, for example, using a multi-tasking OS (e.g., Linux) and local only (localhost) network addresses.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, or may be entirely implemented on the loopback (e.g., localhost) interface, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may comprise, be communicatively coupled with, or otherwise have access to one or more database(s) 114. For example, platform 110 may comprise one or more database servers which manage one or more databases 114. Server application 112 executing on platform 110 and/or client application 132 executing on user system 130 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Access™ PostgreSQL™, MongoDB™, and the like, including cloud-based databases and proprietary databases. Data may be sent to platform 110, for instance, using the well-known POST, GET, and PUT request supported by HTTP, via FTP, proprietary protocols, requests using data encryption via SSL (HTTPS requests), and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130 and potentially using a local database 134, may interact with a server application 112 executing on platform 110 to execute one or more or a portion of one or more of the various functions, processes, methods, and/or software modules described herein. In an embodiment, client application 132 may utilize a local database 134 for storing data locally on user system 130.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

While platform 110, user systems 130, and external systems 140 are shown as separate devices communicatively coupled by network 120, each of the devices shown as platform 110, user systems 130, and external systems 140 may be implemented on one or more devices, and/or one or more of platform 110, user systems 130, and external systems 140 may be implemented on a single device.

Figure 2:
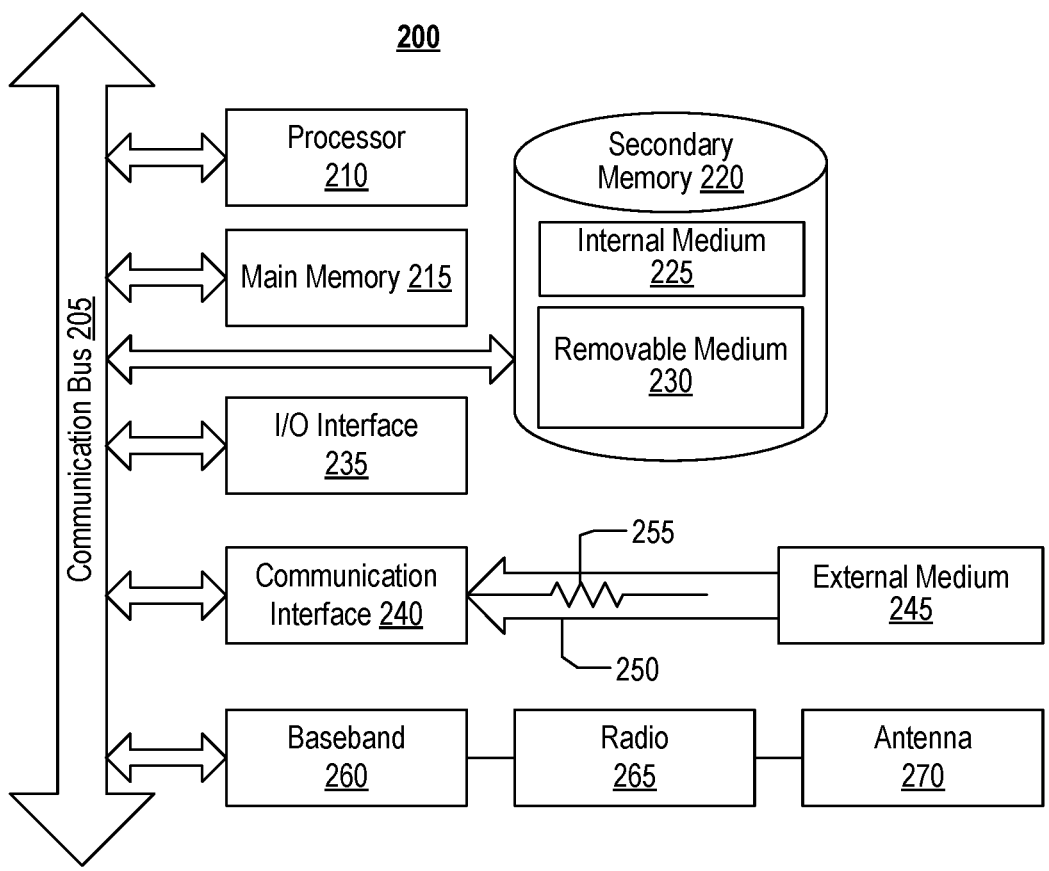
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the software) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, can enable system 200 to perform the various functions of the disclosed embodiments.

Embodiments of processes for leak detection and monitoring and/or measuring water usage will now be described in detail. It should be understood that the described processes may be embodied in one or more software modules that are executed by one or more hardware processors (e.g., processor 210), for example, as a software application (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the software application are executed by platform 110 and other portions or modules of the software application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processor(s) 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Figure 3:
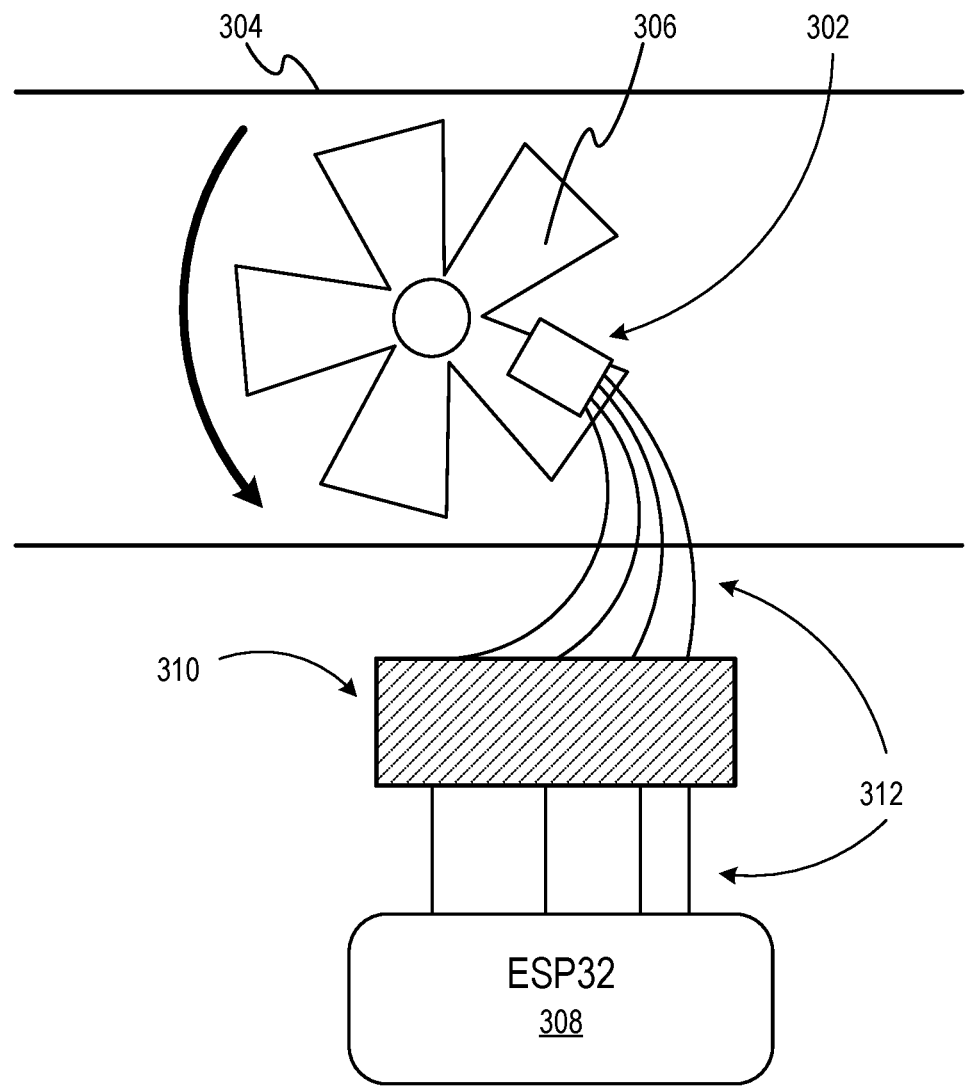
FIG. 3 illustrates an example system for identifying a leak within a toilet in accordance with one example.

FIG. 3 shows a flow chart of evaluation data collection within a training process. The evaluation data collection may be performed by an application of the current disclosure. In step 302, data associated with the monitored system/entity (e.g., fluid/gas system, machine/device, person performing sports/exercise/rehabilitation, etc.) is collected by one or more sensors. The data may be collected at the monitored system/entity or one or more similar/training systems under known conditions (e.g., at a fluid tank having no leak, at a fluid tank having a small leak; at a machine operating normally, at a machine having a malfunction; an athlete performing a particular swing, jump, or throw; a person performing a movement, etc.). The data may be obtained by one or more sensors (e.g., accelerometer, gyroscope, microphone, video camera and frame camera etc.) described elsewhere in the disclosure and include, for example, movement data, displacement data, audio data, etc. In step 304, the obtained data is associated with the known conditions and saved as evaluation data within one or more database(s). The evaluation data collection process of FIG. 3 may be performed multiple times, for example, (i) under the same conditions, (ii) under various different conditions, (iii) using multiple sensors. For example, vertical displacement sensor data may be collected for each of (i) a toilet tank under normal conditions, (ii) a toilet tank having a small leak, and (iii) a toilet tank having a medium leak. Data sets associated with each condition/event may be saved as evaluation data.

Figure 4:
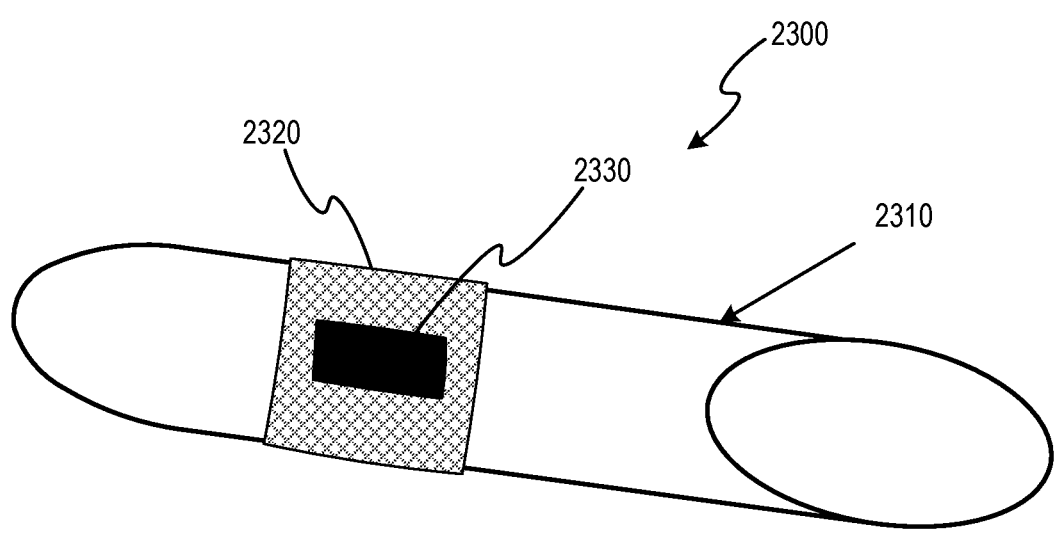
FIG. 4 illustrates a portion of a pipe having a detector device at least partially wrapped (e.g., clamped) around a pipe section.

FIG. 4 shows a flow diagram of a method of determining whether a specific event/condition has occurred within a monitored system/entity and/or whether current conditions are similar (how close) to the specific event/condition. The method can be performed using at least one hardware processor. In step 402, sensor data is obtained from one or more sensors coupled to the monitored system/entity. In step 403, evaluation data associated with the specific event/condition is obtained (e.g., from a database). The evaluation data may comprise one or more data sets and may be obtained prior to obtaining the current sensor data (step 402). In step 404, Wasserstein distance(s) are calculated from the obtained sensor data set to the evaluation data. The Wasserstein distance(s) may be calculated for a single parameter (e.g., vertical displacement taken over multiple time slots), multiple parameters (e.g., x-, y-, and z-displacement data), and using data from one or more sensors. In one embodiment, step 404 includes using an average or weighted average of multiple Wasserstein distances. In step 406, the Wasserstein distance is compared to a predetermined Wasserstein distance threshold. In an embodiment, the method determines that the specific event/condition has occurred if the calculated Wasserstein distance is smaller than the threshold. Alternatively, in step 406, the Wasserstein distance is determined to be within one or a number of predetermined ranges of Wasserstein distances, and the method determines how close (e.g., very similar, relatively similar, not similar) the current conditions are to the specific event/condition based on the range.

In one specific embodiment, a method of determining whether there is a leak in a fluid system is disclosed. The method can use at least one hardware processor in (a) obtaining evaluation data from a first sensor (e.g., weight sensor) coupled to a fluid system at a first time (step 403), (b) obtaining evaluation data from the first sensor at a second time different from the first time (step 403), (c) obtaining fluid data (e.g., distance data) from a second sensor (e.g., distance sensor) coupled to the fluid system at the first time and/or within an hour, 30 minutes, 15 minutes, 5 minutes and/or 1 minute of the first time (step 402), (d) obtaining fluid data from the second sensor at the second time different from the first time and/or within an hour, 30 minutes, 15 minutes, 5 minutes and/or 1 minute of the second time (step 402), and (e) determining whether there is a leak in the fluid system based at least in part on the evaluation data from the first sensor at the first time and the second time, and the fluid data from the second sensor at (and/or within an hour, 30 minutes, 15 minutes, 5 minutes and/or 1 minute of) the first time and the second time (steps 404-406).

In some aspects, the systems described herein can further comprise one or more sensors configured to detect at least one of a sound, a temperature, a humidity, an acceleration, and a barometric pressure. The application can be configured to receive sensor data associated with the sound, temperature, change in temperature, humidity, change in humidity, acceleration, vector magnitude data, barometric level pressure, etc. In some aspects, the application can be configured to determine if an event/condition has occurred in a monitored system/entity at least in part on the additional data. In some aspects, Wasserstein distance(s) are utilized to detect a specific condition/event. For example, the system can detect whether data is indicative of the specific condition/event by calculating Wasserstein distance(s) from the sensor data in order to classify sensor data as being indicative of the specific condition/event.

It should be appreciated that the sensors can be and/or compose a sensor platform, with sensors configured to detect sound, temperature, humidity, acceleration, barometric pressure, or some combination thereof. The combination of sensors can then be used to determine, motion, vibration, orientation of the sensor platform, to, among other things, provide a sound sample, as well as to sense height of the sensor platform, and/or a change in temperature in the monitored system.

In some aspects, the sensor an comprise one or a combination of: a gyroscope, a compass, and an accelerometer. In some aspects, the sensor can be coupled with the processing system via wires and a slip ring device.

In some aspects of the disclosure, the evaluation system can comprise, e.g., in platform 110, or a user system 130, algorithms and process that allow the system to recognize specific condition of a monitored system/entity based on the patterns, signature, and/or timing. Known pattern data can comprise any data indicative of a known pattern in the monitored system (e.g., classified data sets used as comparison evaluation flow data associated specific conditions).

In some aspects, a system can comprise a sensor and an ESP32 or similar microcontroller unit to read from the sensor. The sensor may be for example, one or more of: an accelerometer (e.g., ADXL345), a 3-axis magnetic compass (e.g., QMC5883L), and a gyroscope. The system can comprise a Secure Digital (SD) card or other memory card, a real-time clock (RTC) device, a buck-boost or other converter, and a micro USB or other port. Any suitable power source can be used, including batteries. In some aspects, a waterproof case is provided for the device, which can float in the water in, for example, a toilet water tank, or be positioned within a fluid pipe. The microcontroller and/or memory chip can receive sensor data from one or more sensors (e.g., an accelerometer), and it is contemplated that the data can be used in a Wasserstein distance(s) algorithm to categorize temporal events/conditions (e.g., normal water flow, stable water movements, major, medium, or small leaks, etc.). Data can continuously be gathered from the sensor after a specific interval, for example, 10 atomic readings of the sensor in 1 second (10 Hz frequency). In one embodiment, sensor values can be based on three-dimension data (x-axis, y-axis, z-axis) that is movement of the device. In another embodiment, sensor values can be based on heading/direction data associated with the device. Through these values the system can detect if there is normal/stable activity (no leak) or a leak, and can categorize the leak, for example, as a small, medium, or major leak.

According to another aspect, an evaluation system for event detection is provided, comprising at least one hardware processor, and one or more software modules that are configured to, when executed by the at least one hardware processor, obtain sensor data from a sensor positioned in and/or coupled to at least one monitored system/entity; and identify (e.g., by determining) a status/condition of the at least one monitored system/entity based at least in part on the sensor data and evaluation data stored in one or more databases.

Figure 5:
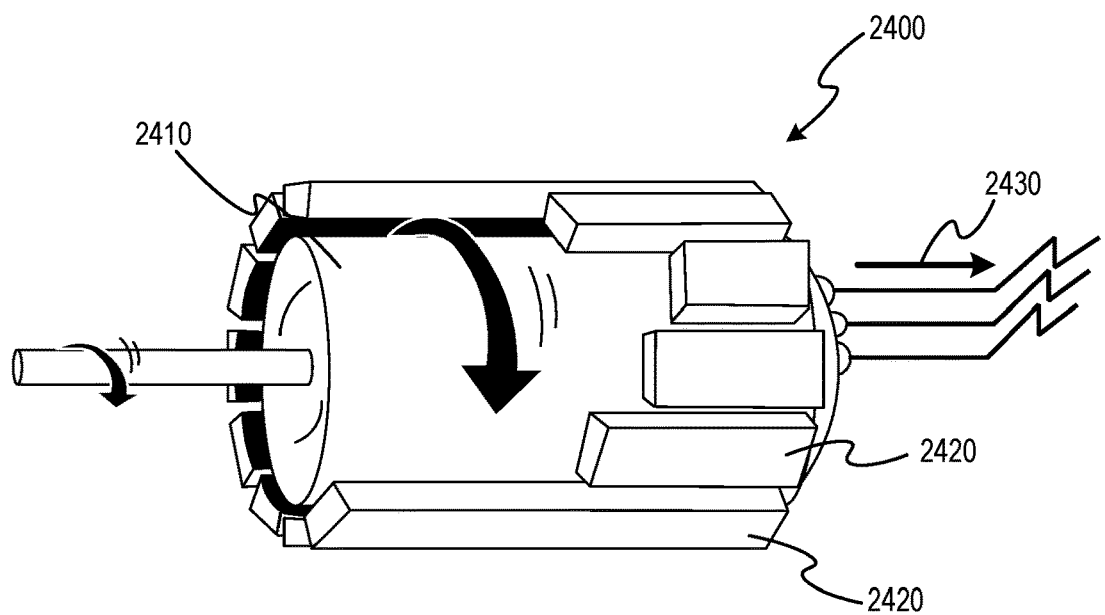
FIG. 5 illustrates an exemplary dynamo with coils shown, which can be used in some contemplated devices, systems and methods.

FIG. 5 shows a flow diagram of a method of categorizing a current condition of a monitored system/entity between a plurality of predetermined events/conditions. The method can be performed using at least one hardware processor. In step 502, sensor data is obtained from one or more sensors coupled to the monitored system/entity. In step 503, evaluation data associated with multiple events/conditions is obtained (e.g., from a database). The evaluation data may be obtained prior to obtaining the current sensor data (step 402). As an example, the evaluation data may comprise individual sensor data sets associated with (i) a toilet tank under normal conditions, (ii) a toilet tank having a small leak, and (iii) a toilet tank having a medium leak.

In step 504, Wasserstein distances are calculated from the obtained sensor data set to each of the evaluation data sets associated with the different events/conditions. The Wasserstein distances may be calculated for a single parameter (e.g., vertical displacement taken over multiple time slots), multiple parameters (e.g., x-, y-, and z-displacement data), and using data from one or more sensors. In one embodiment, each of the Wasserstein distance calculations includes using an average or weighted average of multiple Wasserstein distances within the same category of event. In step 506, the shortest Wasserstein distance is found from among the Wasserstein distances calculated in step 504 (e.g., distance from the current sensor data to evaluation data sets associated with individual events/conditions), and the algorithm determines that the monitored system is under the conditions associated with the shortest Wasserstein distance. In other words, if the current sensor data is compared (via Wasserstein distance) to evaluation data of normal conditions, small leak conditions, and medium, leak conditions, and the shortest distance is calculated to the small leak conditions, the algorithm determines that the monitored system (toilet tank) has a small leak.

A parameter associated with the at least one sensor can be, for example, associated with a frequency and/or length of time the accelerometer is configured to detect the fluid data. Causing the fluid valve coupled to the fluid pipe section to adjust can comprise closing the fluid valve. Additionally or alternatively, causing the fluid valve to adjust can comprise controlling an electric motor coupled to the fluid valve to adjust the fluid valve. The valve can comprise any suitable valve, including, for example, a ball valve. The fluid monitoring system can also comprise a motor coupled to the at least one sensor and the fluid valve.

The fluid data can comprise any suitable data as described elsewhere herein, and can include, for example, vibration data, or accelerometer data.

In some embodiments, the fluid monitoring system can comprise a second sensor (e.g., accelerometer) configured to detect a second fluid data associated with a second fluid flowing through a second pipe section, a second wired or wireless communication interface, and at least one second processor configured to perform instructions, the instructions configured to cause the at least one second processor to (a) receive the second fluid data, (b) determine whether the second fluid data is indicative of a second normal condition or a second abnormal condition, and (c) upon determining the second fluid data is indicative of a second abnormal condition, at least one of (1) cause a second fluid vale coupled to the second fluid pipe section to adjust, (2) modify a parameter associated with the second sensor, and (3) transmit to at least one of the platform, the external system and the user system, via the second communication interface, at least one of the second fluid data and a second notification relating to the second fluid data. The notification(s) can be indicative of, for example, a present or future leak.

In some aspects, a fluid monitoring system can comprise a sensor (e.g., accelerometer) configured to be positioned in a first portion of a pipe; a valve configured to be coupled to a second portion of the pipe; at least one processor; and a memory storing software instructions that, when executed by the at least one processor, cause the at least one processor to adjust the fluid valve upon a detection of an abnormal condition based at least in part on sensor data from the accelerometer.

In some aspects, a detector for monitoring fluid flow through a pipe section is provided, comprising an accelerometer configured to detect at least one of a measurement and a change associated with a fluid flow through the pipe section; a wired or wireless communication interface; and at least one processor configured to perform instructions, the instruction configured to cause the processor to: receive sensor data from the accelerometer, the sensor data associated with the at least one of the measurement and the change; determine whether the sensor data is indicative of a normal condition or an abnormal condition; and upon determining the sensor data is indicative of an abnormal condition, at least one of: cause a fluid valve coupled to the fluid pipe section to close; modify a parameter associated with the accelerometer; and transmit to at least one of a platform, an external system and a user system, via the communication interface, at least one of the sensor data and a notification relating to the at least one of the measurement and the change detected. In some aspects, the parameter associated with the accelerometer is associated with a frequency and/or length of time the accelerometer is configured to detect the at least one of the measurement and the change. In some aspects, the valve comprises a ball valve. In some aspects, the at least one of the measurement and the change is at least one of a vibration, an acceleration, a movement, and a flow rate during a time period. In some aspects, the software instructions, when executed by the at least one processor, further cause an alert (e.g., an alarm or other sound, a lighting of one or more lights (e.g., in a predetermined pattern and/or color).

In some aspects, a fluid monitoring system is provided, comprising at least one processor, and a memory storing software instructions that, when executed by the at least one processor, cause the at least one processor to: receive sensor data from an accelerometer, the accelerometer coupled to a motor, the motor coupled to a fluid valve, the sensor data associated with the at least one of the measurement and the change; determine whether the sensor data is indicative of a normal condition or an abnormal condition; and upon determining the sensor data is indicative of an abnormal condition, at least one of: cause the fluid valve to close; modify a parameter associated with the accelerometer; and transmit, via a communication interface, at least one of the sensor data and a notification relating to the at least one of the measurement and the change detected. In some aspects, the parameter associated with the accelerometer is associated with a frequency and/or length of time the accelerometer is configured to detect the at least one of the measurement and the change. In some aspects, the valve comprises a ball valve. In some aspects, the at least one of the measurement and the change is at least one of a vibration, an acceleration, a movement, and a flow rate during a time period. In some aspects, the software instructions, when executed by the at least one processor, further cause an alert (e.g., an alarm or other sound, a lighting of one or more lights (e.g., in a predetermined pattern and/or color).

In some aspects, a system is provided, comprising an accelerometer configured to be positioned in a first portion of a pipe; a valve configured to be coupled to a second portion of the pipe; at least one processor; and a memory storing software instructions that, when executed by the at least one processor, cause the at least one processor to adjust the fluid valve upon a detection of an abnormal condition based at least in part on sensor data from the accelerometer. In some aspects, the software instructions, when executed by the at least one processor, further cause an alert (e.g., an alarm or other sound, a lighting of one or more lights (e.g., in a predetermined pattern and/or color). In some aspects, the software instructions, when executed by the at least one processor, further cause a notification to be sent (e.g., via text, email, display of a computing device).

In some aspects a system can comprise a computer networking device (e.g., central hub) having at least one central processor, a user interface and one or more input/output (I/O) ports. One or a plurality of fluid control devices can communicate with the computer networking device. In some aspects, a fluid control device can comprise an electric motor coupled to a fluid valve and an accelerometer coupled to a fluid pipe section. The fluid pipe sections can comprise pipe sections of one or more pipes of a building (e.g., pipes of and/or coupled to toilets, sinks, tubs, washing machines, showers, dishwashers). Each control device can comprise a fluid pipe section including a fluid inlet and a fluid outlet. A fluid valve can be coupled with the fluid pipe section (e.g., in series), and an electric motor can be mechanically connected to the fluid valve. The fluid valve can control a fluid flow through the fluid pipe section. In some aspects, the fluid valve can comprise a ball valve. An adapter can abut an adapter o-ring and capture the ball valve along with the balls seats against a valve body. One or more accelerometers can be coupled to the fluid pipe section and be configured to monitor, detect and/or measure a fluid movement. At least one control device processor can be controllably connected to the electric motor and accelerometer. A control device I/O port can be coupled to the control device processor, and the control device I/O port can be in communication with the I/O port of the central hub. The fluid flow through any individual device may be a liquid flow, a gas flow, an air flow or a combination thereof.

In some aspects, the user interface may comprise a computer screen and a keyboard or a touch activated computer screen. In some aspects, the user interface may be a website accessible from a remote computer, an alarm system, a mobile computer or a portable electronic device.

In some aspects, a communication wire may be connected physically between the input/output ports of the central hub and control device. In some aspects, a battery may be coupled to the control device processor, and/or a power input may be electrically connected to the control device processor.

In some aspects, one or more speakers may be provided in a system and, for example, electrically connected to the central hub processor for sounding a warning sound and/or one or more lights may be electrically connected the central hub processor for illuminating a warning light.

In some aspects, the software instructions, when executed by the at least one processor, can cause the processor to alert a user when a specific condition (e.g., abnormal flow in a fluid system) is detected. The alert can comprise, for example, a warning light, a warning sound, a text, email or other notification.

In other aspects, a determination of whether a monitored system/entity is under a specific condition can include monitoring the system via sensor(s) for a defined learning period of time and automatically establishing a Wasserstein distance threshold during a defined learning period of time. In some aspects, data sets associated with one or more specific events/conditions can be stored as evaluation data in order to be compared to current data. In one example, data sets associated with a movement or flow of fluid with a normal or abnormal flow can be stored as evaluation data. In another example, data sets associated with various levels of abnormal flow may be stored as evaluation data for later comparison. In some aspects, a threshold Wasserstein distance may be determined.

In some aspects, a report, notification, alert, or summary can be generated by platform 110 based at least in part on movement data and optionally other sensor data from one or more sensors coupled to a monitored system/entity. The platform can also alert, report, cause an action (e.g., valve adjustment) and/or recommend appropriate steps to one or more user systems and external systems, for example a system associated with a plumber.

The application can be coupled to a database storing evaluation data. Evaluation data can comprise data associated with the monitored system/entity. For example, the database(s) can store evaluation data associated with numerous monitored systems, which can be indicative of various events and conditions. The application can be configured to determine if one of the various events/conditions has occurred by comparing current sensor data obtained from the one or more sensor devices to evaluation data associated with the various events and conditions. The application can be configured to determine a status of a monitored system comprising based at least in part on the current sensor data and the evaluation data.

By deploying the systems and methods described herein, sensor devices can be deployed coupled to monitored systems/entities, and the sensor data (e.g., displacement data) can be reported to, e.g., platform 110 having an application configured to determine status/condition of the monitored system/entity based on sensor data as described in this disclosure. User systems 130 can then be used to view information associated with the condition of one or more monitored systems. Platform 110 can also be configured to alert the user(s) when the data indicates a specific condition (e.g., a leak).

In some aspects, a system can include multiple sensor devices each comprising at least one sensor configured to obtain sensor data as described herein, the sensor data being associated with portions of a monitored system/entity. Each sensor device can comprise at least one processor configured to perform instructions, the instruction configured to cause the at least one processor to transmit sensor data, via a communication interface, to the platform. Viewed from another perspective, the systems described herein can comprise a second, third, fourth, fifth, or any suitable number of sensor devices as described. For example, sensor devices can be installed/attached around numerous conduits and/or containers in a home, building, etc. through which fluid flows, and transmit sensor data to a platform. In another example, sensor devices can be attached/worn on various parts of the body by a person performing sports/exercise. The platform can comprise and/or be coupled to one or more databases storing evaluation data, and can comprise an application storing software instructions that upon execution cause the application to determine status/condition of one or more parts of the monitored system/entity based at least in part on sensor data obtained from one or more sensor devices.

In some aspects, one or more of the sensor devices can be configured to be positioned at least partially around an outside of a conduit or other structure of a fluid system, and the sensor devices can comprise at least one sensor (e.g., an accelerometer, an ultrasonic sensor). The device can comprise a clamp, band or other component configured to removably and/or fixedly couple to (e.g., clamp around) an outside portion of a pipe, tube, or other conduit, and/or any other suitable portion of a conduit and/or appliance. In some aspects, a second sensor device can be provided at least partially around an outside of the same conduit, for example, downstream of the first sensor device.

One or more sensors of the sensor device can be configured to obtain sensor data associated with at least one of a vibration, a pressure change and/or length of time associated with a fluid flowing through the conduit. In some aspects, at least one processor configured to perform instructions can be provided, the instructions configured to cause the at least one processor to, among other things, receive sensor data from one or more detector devices, and at least one of transmit data associated with the sensor data (e.g., the sensor data), via a communication interface, to the platform. In some aspects, the platform can be configured to determine usage and/or condition information of a fluid system based at least in part on the sensor data. In some aspects, the platform can be configured to determine usage and/or condition information of the fluid system based at least in part on the sensor data and evaluation data stored in one or more databases.

It is contemplated that the techniques described herein can be used to determine a liquid flow and a potential leak or regular usage. In some aspects, one or more sensors (e.g., an accelerometer, a compass, an ultrasonic sensor, a laser sensor) are provided in a detection device that is at least partially wrapped around a portion of a conduit. Such a detection device can be configured to changing pressure/flow inside a pipe. Upon detection of a flow, the device and/or platform can utilize Wasserstein distance(s) algorithms to detect abnormal movements based on, among other criteria, length of the flow, timing of the flow, etc.

In some aspects, the devices and systems described herein can be used to determine usage, for example, from a faucet, a shower, a porch hose, etc.

Without wishing to be bound by any particular theory, the following principal can be used in connection with some wrapped sensor (e.g., accelerometer) devices described herein. Using the wrapped sensor device as described herein, it is contemplated that the system can measure vibration of the pipe and therefore derive the pressure fluctuation (or flow inside the pipe). By using the knowledge of pressure changes in the pipe or other conduit, the amount of flow of a fluid within the conduit can be determined. When the flow increases or decreases, fluid usage can be determined, for example, using Wasserstein distance(s) algorithms. This determination can be used to detect normal and/or abnormal behavior of a toilet, faucet, shower, hose, or other appliance. Some clamp on flow meters that measure flow rate of water or water/glycol solutions are expensive (e.g., over $1,000) and cost prohibitive. Applicant surprisingly discovered that a low cost ultrasonic sensor can be used in a detection device and/or system as described herein, to detect a leak using the time length of the flow of fluid (e.g., liquid) flowing in the pipe. The detection can be based on flow cycle and not the accuracy of the flow. For example, with respect to toilets, abnormal behavior detected can include a short refill every certain time or a very long refill which can be considered to be a major flow/leak. Wasserstein distance(s) algorithms can be used to identify cycles that are abnormal where there are many different edge devices to measure. This can be used to detect leaks (and/or other abnormal behavior) within many different devices that are connected to the water main, not just toilets (e.g., coffee machines, soda machines, washing machines, refrigerators, etc.).

According to one aspect, a system for leak detection is provided, comprising a sensor device comprising at least one sensor configured to detect vertical displacement data (displacement in the z-axis) of liquid in a container (and/or other fluid data such as movement data), a processing system coupled with the sensor and configured to communicate the displacement data (and/or other fluid data), and a platform comprising (and/or coupled to) one or more databases storing evaluation data, and an application coupled with the database and configured to receive the displacement data (and/or other fluid data) and determine if there is a leak in the container (e.g., in the container or associated plumbing) by, for example, comparing the displacement data (and/or other fluid data) to the evaluation data, wherein the comparison comprises a determination of Wasserstein distance(s) between the displacement data and the evaluation data. In some embodiments, the application is configured to communicate with an automated valve fluidly coupled to the container to cause the valve to adjust (e.g., shut off). In some embodiments, the application is configured to communicate with an external system (e.g., of a service company) to, for example, communicate a request for a plumbing consultation or service based on a detection.

In order to detect a leak, one or more sensors can be placed inside a container or tank containing a fluid and float on the liquid, outside and adjacent the container, inside a conduit fluidly coupled to the container, and/or at least partially wrapped around a conduit fluidly coupled to the container. The one or more sensors can be configured to detect, for example, z-displacement, i.e., vertical displacement (e.g., from the one or more sensors to a top of the container or other predetermined location, and/or a lid of the container), and/or any other fluid data as described elsewhere in this disclosure. This vertical displacement (and/or other fluid data) can then be reported to, for example, platform 110. Application 112 can be configured to determine whether the vertical displacement and/or other fluid data is indicative of a leak. In some aspects, determining whether there is a normal or abnormal condition (e.g., leak) associated with the fluid system comprising the container can comprise, for example, determining a vector magnitude, a change in distance from a sensor to a fluid portion (e.g., top of a fluid in a container) over time, a change in distance from a sensor to a predetermined fixed location (e.g., top of a container, a lid of a container) over time, a period of time of a flow associated with the fluid in the container (e.g., passing through a conduit), a movement of the sensor (e.g., accelerometer) over a period of time, or any other suitable data. In some aspects, determining whether there is a normal or abnormal condition (e.g., leak) associated with the fluid system comprising the container can comprise comparing the fluid data to evaluation data as described elsewhere in this disclosure.

Additionally or alternatively, the displacement data and/or other fluid data and/or data determined by application 112 can be sent to a user system 130 and application 132 can determine whether the displacement data and/or other fluid data is indicative of a leak. For example, the sensor can include or be interfaced with a processing system 200, e.g., via I/O interface 235. Radio 265 can then be used to communicate the displacement data and/or other fluid data to platform 110 and/or user system 130. In certain embodiments, the one or more sensors can be configured to detect displacement along the x, y and/or z axis. For example, the sensor(s) can be one or a combination of: a gyroscope, a compass, and an accelerometer. A gyroscope is a device used for measuring or maintaining orientation and angular velocity.

In some embodiments, the application is configured to communicate with a user system to, for example, communicate a need for a plumbing consultation or service based on a detection, and optionally providing options for service providers and/or information associated with such service providers via a user interface of the user system. In some aspects, the application 112 is configured to communicate with an external system and a user system and allow a user and a service provider to schedule a service or visit via inputs and outputs through the external system and user system. In some aspects, the application 112 is configured to communicate with an external system and/or a user system to communicate condition information and/or provide an alert. The indication can comprise a sound (e.g., an alarm), visual or other indication of a potential leak or abnormal activity. In some embodiments, the application 112 is configured to communicate with a user system of a service provider, building manager, and/or other entity, to indicate a type of leak, provide evidence, request and receive feedback (e.g., confirmation of leak) based at least in part on the displacement data (and/or other fluid data). The condition information can include, for example, information corresponding to a normal condition, a small, medium and/or major leak, usage information, a lifetime of a component of the fluid system, or any other suitable information relating to a condition (e.g., status) of a fluid system (which can include the container and plumbing associated therewith). The application 112 can be configured to receive user feedback, for example, relating to the accuracy of the condition information, from the user system and/or external system.

In certain embodiments a small drone or other device, for example one with a waterproof housing, can include one or more sensors can be floated in the water and can provide the displacement information. In some aspects, a drone comprising a sensor and can be remotely controlled or be programmed with a software-controlled flight plan.

The sensor can comprise any suitable sensor(s), including, for example, an accelerometer, a 3-axis compass, a gyroscope, a sound sensor, a temperature sensor, an ultrasonic sensor, a voltage measuring sensor, and/or a laser sensor. In some aspects, the sensor is an accelerometer configured to detect displacement in the x-axis, y-axis, and/or z-axis. It should be appreciated that accelerometer data comes in XYZ coordinate values, and contemplated systems can use accelerometer based fluid data in any suitable way in determining movement of the accelerometer (e.g., Delta overtime in each coordinate), for example, as the accelerometer floats in the fluid of a container. In another aspect, the sensor is a compass configured to detect X-Y-Z position and heading in time. In one embodiment, X and Y positions in time are collected as sensor data. In another embodiment, Z positions in time are collected. In another embodiment, X-, Y-, and Z-positions in time are collected as three sets of data, such that each set can be compared with matching evaluation data. In another aspect, the sensor is a gyroscope configured to detect orientation and angular velocity.

The sensor can be place anywhere in the container, including, for example, floating on the surface of the fluid in the container, or coupled to the float of the container (e.g., toilet tank).

It should be appreciated that vertical displacement data can comprise any data that indicates a vertical displacement (e.g., a change in vertical position of the top surface of a fluid in a container, a change in a vertical position of a sensor or sensor device positioned in the fluid (e.g., floating on the fluid) in the container, a change in vertical distance from a sensor or sensor device to a top surface of a fluid in the container).

In order for, for example, platform 110 to be able to discern a potentially problematic condition (e.g., a small, medium and/or major leak) from a normal condition (e.g., a flush, evaporation), some information/evaluation data about normal condition should be available. There are several ways such information can be made available.

In some embodiments, evaluation data can be collected as part of an installation process (e.g., the installer can collect baseline evaluation data for stable and normal conditions and the data can be sent to the database(s) via one or more sensor devices and/or via a user system input device. In some aspects, the database(s) can store evaluation data associated with numerous fluid systems located anywhere throughout a home, a building, a city, a county, a state, a country, and/or the world, which can be indicative of various events and conditions.

In some embodiments, two (or more) sensors or sensor devices can be used, and one or more of the sensor devices can detect and send evaluation data to the platform and/or database. For example, a smaller container can be provided inside the larger container (e.g., within the container but in a fashion where the water level in the controlled environment of the smaller container will not be affected by a leak in the larger container), and the smaller container can include the same liquid as in the larger container. In some aspects, the top of the liquid in the smaller container can match the top of the liquid in the larger container. One sensor can be placed in the smaller cup or container and one can be placed in the larger container of interest. The vertical (z) displacement for the sensor and/or fluid in the smaller container should be due to a normal condition (e.g., evaporation). Any displacement of the sensor and/or fluid in the larger container that exceeds the displacement or rate of displacement of the sensor and/or fluid in the smaller container can then be indicative of a potentially problematic condition (e.g., a leak). Such an approach essentially simulates the bucket test. For this to work, some reference may be helpful, such as altitude of the sensor. Such a measurement can be made manually or via a sensor, such as the laser or ultrasound sensors. Additionally or alternatively, one or more of the sensors that detects evaluation data can comprise a weight sensor, for example weight sensor 2930 of FIG. 10.

The evaluation data can comprise any suitable data associated with the system itself, the container, the liquid, and/or containers and liquids outside of the system. For example, the container can comprise a toilet, a pool, a spa, or a jacuzzi, and the evaluation data can comprise historic displacement data under normal and abnormal conditions, frequency data (e.g., of flushes or rapid displacements), time data associated with displacement data, displacement data associated with a condition, length of time data associated with displacement data and/or condition data, rate data associated with displacement data and/or condition data, historic movement data under normal and abnormal conditions, time data associated with movement data, movement data associated with a condition, length of time data associated with movement data and/or condition data, rate data associated with movement data and/or condition data, weight data (e.g., weight data associated with a smaller container in the pool, toilet, spa, jacuzzi or other large container), a change in weight data, feedback data (e.g., if a system determined leak has been confirmed or reported as inaccurate), threshold data (e.g., data values above which a valve should be adjusted, an alert should be provided and/or a service should be scheduled), evaporation data, or any other suitable data. As an example, evaluation data can comprise a length of time associated with a flush refill in a normal state (e.g., 40 seconds average). If sensor data indicates a refill length of time is shorter or longer, this can indicate a leak (e.g., 20-30 seconds indicating a medium leak, and 50 seconds or longer indicating a major leak). Viewed from another perspective, a normal flush refill takes "x" amount of seconds (x being any number) and depends on many technical parameters (e.g., city pressure, house pressure, internal mechanism). By training the system on what flush refill period is set as "normal," abnormal situations can be detected. For example, a short refill every certain time may indicate a medium leak, while a longer refill more than "x" may mean there is a potential future leak, while a much longer refill time than "x" can indicate a major leak.

In some aspects, the system can be trained over time to increase accuracy as to what a normal activity looks like (e.g. a flush has very rapid and extreme vertical displacement in a short amount of time and fills back up) and what a potentially problematic or abnormal activity looks like (e.g., a leak with steady downward displacement over a longer period of time).

Figure 10:
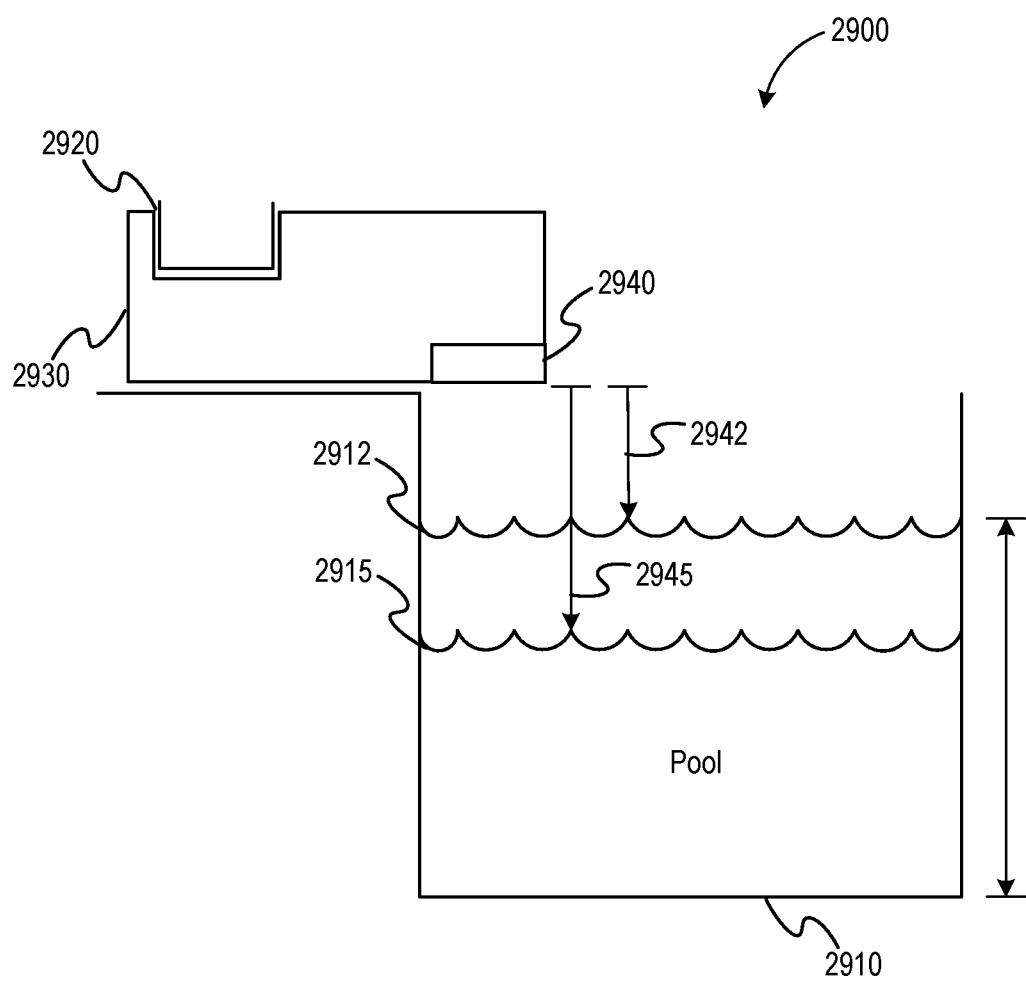
FIG. 10 illustrates a detector system provided for use in monitoring a fluid in a pool, according to an embodiment.
Figure 11:
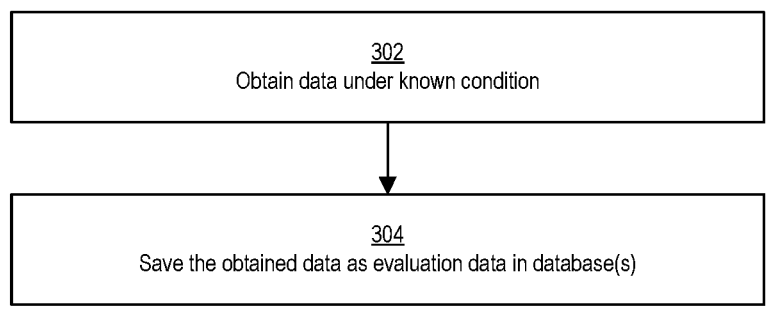
FIG. 11 is a flow diagram of a process of training a data set, according to an embodiment.
Figure 12:
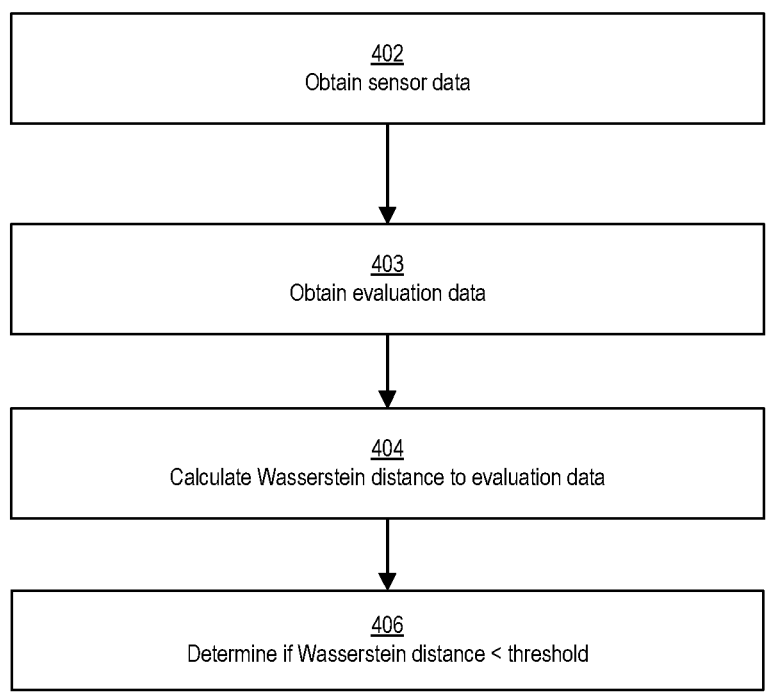
FIG. 12 is a flow diagram of a process of detecting a specific event, according to an embodiment.
Figure 13:
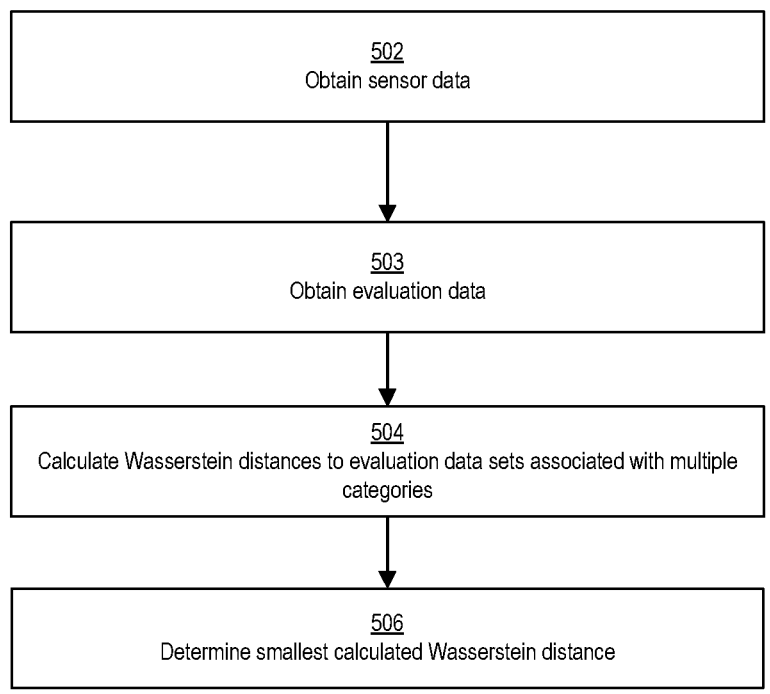
FIG. 13 is a flow diagram of a process of categorizing an event, according to an embodiment.

An exemplary pool system (which can comprise any fluid system comprising a large container) is illustrated in FIG. 10, and comprises at least two sensors (a weight sensor, and a distance sensor (e.g., laser, ultrasonic, or infrared distance sensor)). System 2900 comprises a pool 2910, a small container (e.g., a cup) 2920, wherein the pool 2910 and small container 2920 hold the same type of fluid (e.g., water) and optionally wherein the smaller container has a controlled environment that is not affected by a leak in the pool. The small container 2920 can be positioned on a weight sensor 2930. The distance sensor 2940 can be positioned anywhere in or adjacent the pool 2910 that allows a laser or infrared beam to be directed to the fluid in the pool 2910. As shown in FIG. 10, the distance sensor 2940 and the weight sensor 2930 can be housed in a single device (or separate devices). In some embodiments, a change in weight of the small container 2920 (with fluid) is equal to a measured evaporation, and a non-limiting example of calculations to determine whether there is a leak is as follows: k=weight/(volume/area) of the small container, and distance of evaporation measured=weight loss/k. In this example, if a starting weight is 5 kg, and an end weight is 3 kg, k=1 kg/(20 cm$^3$/4 cm$^2$) setting k based on cup size=1 kg/5 cm. In some aspects, "k" is uniquely set based on the size of the water cup holding the reference water that is used to determine the evaporated volume. Based on "k" and weight loss, the actual drop can be determined and compared to the drop in the swimming pool. The change in weight=Weight (W) start−W end=2 kg. Weight loss/k=2 kg/(1 kg/5 cm)=10 cm due to evaporation. Distance sensor 2940 can utilize, for example, laser or infrared technology, or other signal to measure a change in distance from the sensor to, for example, the top of the water in the pool over time. For example, the signal can be transmitted at a target (e.g., top of water in a pool), the target can reflect the signal back to the sensor, the sensor can receive the reflected signal, and the time delay between the sending of the signal and its reception can be used to calculate a distance to the target. In FIG. 10, at a start time, the water level in the pool 2910 is at a higher position (starting level) 2912 than at an end time where the water level is at a lower position (end level) 2915. Distance sensor 2940 measures a distance from the sensor to the starting level 2912, which is distance 2942, and the distance from the sensor to the end level 2915, which is distance 2945. Where distance 2945 from the sensor to end level 2915—distance 2942 from sensor to starting level 2912=evaporation→the system can determine there is no leak. Where (distance 2945 from the sensor to end level 2915—distance 2942 from sensor to starting level 2912—evaporation)>0→the system can determine a leak is detected.

In some aspects, a method of determining whether there is a leak in a fluid system is disclosed. The method can use at least one hardware processor to (a) obtaining evaluation data from a first sensor (e.g., weight sensor 2930) coupled to a fluid system at a first time, (b) obtaining evaluation data from the first sensor at a second time different from the first time, (c) obtaining fluid data (e.g., distance data) from a second sensor (e.g., distance sensor 2940) coupled to the fluid system at the first time and/or within an hour, 30 minutes, 15 minutes, 5 minutes and/or 1 minute of the first time, (d) obtaining fluid data from the second sensor at the second time different from the first time and/or within an hour, 30 minutes, 15 minutes, 5 minutes and/or 1 minute of the second time, and (e) determining whether there is a leak in the fluid system based at least in part on the evaluation data from the first sensor at the first time and the second time, and the fluid data from the second sensor at (and/or within an hour, 30 minutes, 15 minutes, 5 minutes and/or 1 minute of) the first time and the second time.

In some aspects, the systems described herein can further comprise one or more sensors configured to detect at least one of a sound, a temperature, a humidity, an acceleration, and a barometric pressure. The application can be configured to receive sensor data associated with the sound, temperature, change in temperature, humidity, change in humidity, acceleration, vector magnitude data, barometric level pressure, etc. In some aspects, the application can be configured to determine if there is a leak in the container at least in part on the additional data. In some aspects, Wasserstein distance(s) are utilized to detect a leak. For example, the system can detect whether data is indicative of normal use conditions or a leak by calculating Wasserstein distance(s) from the data in order to classify sensor data as being indicative of normal and/or abnormal conditions.

In some aspects, the container can comprise a pool, jacuzzi or tub, and the application can further be configured to determine whether a person has entered the pool based on the displacement data (and/or other fluid data). In some aspects, the system can further comprise a second sensor configured to detect at least one of a chlorine level, a bromine level, a pH level, and an alkaline level in the liquid, wherein the processing system is coupled with the second sensor and configured to communicate data associated with the at least one of the chlorine level, the bromine level, the pH level, and the alkaline level to the platform.

In other embodiments, rates of evaporation can be determined through testing and used to calibrate the vertical displacement due to evaporation for a given environment. For example, the normal evaporation rate can be determined for a given type of liquid, in a certain environment, and whether the container is open or covered. A single sensor (or multiple sensors) can then be deployed and used to provide vertical displacement information, which can be compared to the normal displacement or rate of displacement for normal evaporation. For example, a typical rate of evaporation can be determined for a toilet tank. A single sensor can then be deployed into the tank to detect leaks.

Whether in a toilet tank, pool or another container, it should be appreciated that the sensors can be and/or compose a sensor platform, with sensors configured to detect sound, temperature, humidity, acceleration, barometric pressure, or some combination thereof. The combination of sensors can then be used to determine, motion, vibration, orientation of the sensor platform, to, among other things, provide a sound sample, as well as to sense height of the sensor platform, and/or a change in temperature in the water. For example, an ultrasound or laser system can also be included to detect a distance to the top of the container. These sensors and combinations thereof can be used in addition to, or as an alternative to z-axis displacement to detect a leak. Thus, things like a change in temperature from tank to city water, change of humidity within the tank, tank sound bites, e.g., flushing will run for 4 seconds where leak can be one second or longer periods of time, barometric pressure depicts altitude delta, etc., can be used to detect a leak.

In another embodiment, the sensor platform can be deployed in a pool or jacuzzi. In such embodiments, other types of sensors can be included to detect, e.g., chlorine levels, PH levels, alkaline levels, and/or all the types of readings necessary for pool maintenance. Platform and/or application 132 can then be configured to display the information to the pool owner (e.g., via a display of a user system).

Just as the sensor deployed in a toilet can detect a flush or other activity, such a pool sensor can be configured to detect when someone jumps or falls into the pool. When it is detected that someone has entered the pool in this manner, or that there is a struggle, for example, based at least in part on sensor data, then an alert can be presented to the user. In this way, the system can be used to prevent accidental drownings. It is contemplated that an accelerometer floating in a pool has a general behavior due to wind, temperature, rain, and/or other factors. This behavior can be measured and tagged as normal. When someone is jumping into the water causing a splash, a higher amplitude of movement can happen and can be detected by the accelerometer. Comparing the data obtained at the time of the splash with the normal data, it can be determined that someone has jumped into the pool. In certain embodiments, a feed from a camera can also be tied into the information gathered and presented to the user, so they can see when someone enters the pool and make sure there is not a problem.

The sensor platform can be deployed as part of an existing floating device such as those that are used for chlorine (or bromine).

As discussed above, a pool application must have some way to differentiate a leak from a normal use, change and/or condition, for example, a flush, or evaporation. As such a reference should be determined as described herein. In some aspects, the reference can also be determined by visual inspection, and image of the pool edge with analysis over time, altitude barometric pressure, and/or any other suitable device, method or mechanism. In this way a single sensor can still be used. In other words, a reference can be determined that is used to determine the change (regardless of how it is measured) due to evaporation, and then just using one sensor, measuring the overall change at a given time and then you can subtract the established evaporation change (or other normal change) to determine the leak.

As described herein, it should be appreciated that a controlled, non-leaking environment, such as a cup, bucket, or small container can be deployed in or near the pool, but in a fashion where the water level in the controlled environment will not be affected by a leak in the pool. The sensor can then be deployed in the controlled environment to determine a reference evaporation value. Alternatively, as noted, inspection or images of the water level in the cup over a certain time period can be used to establish the reference for a normal condition, use, and/or change.

Evaporation modeling of this type can be based on some combination of temperature, humidity, the amount of sun or light, wind, and/or time event series that detects any big changes over time. These can be measured using the sensors described herein and that can be included in the detector, or sensor platform. Essentially, various parameters can be measured on a regular basis and when a drop or change in the parameter(s) exceeds a certain threshold or matches a certain pattern, in degree, timing, etc., then a flag or alert can be generated.

As described above, the devices, systems and methods described herein also provide a system for leak detection in a building comprising a plurality of toilet tanks. Some contemplated systems can comprise a plurality of sensors each configured to detect vertical displacement data (and/or other fluid data) of water in a toilet tank, each sensor of the plurality of sensors being deployed in a different toilet tank of the plurality of toilet tanks. The system can further comprise a plurality of processing systems, each processing system of the plurality of processing systems coupled with a sensor of the plurality of sensors and configured to communicate the displacement data (and/or other fluid data). The system can further comprise a platform, comprising a database storing evaluation data, and an application coupled with the database and configured to receive the displacement data (and/or other fluid data) and determine if there is a leak in a toilet tank (e.g., the toilet tank or associated plumbing) of the plurality of toilet tanks by comparing the displacement data (and/or other fluid data) to the evaluation data.

In some aspects, the system can further comprise a user system application configured to receive condition information from the platform associated with a status of the one or more of the toilet tanks. The user system application can be further configured to display or otherwise transmit an indication of the status of one or more of the toilet tanks via a display of the user system, and/or to receive user feedback, for example, relating to the accuracy of the condition information. The indication can comprise a sound (e.g., an alarm), visual or other indication of a potential leak or abnormal activity.

The sensor can comprise any suitable sensor(s), including at least one of, for example, an accelerometer, a compass, a gyroscope, a sound sensor, a distance sensor, an ultrasonic sensor, and/or a laser sensor. In some aspects, the sensor is configured to detect displacement in the x-axis, y-axis, and/or z-axis. The sensor can be place anywhere in the container, including, for example, floating on the surface of the fluid in the tank, coupled to the float of a toilet tank, and/or within and/or wrapped around a portion of a conduit of a piping system for the container.

In some aspects, the systems described herein can further comprise one or more sensors configured to detect at least one of a sound, a temperature, a humidity, an acceleration, and a barometric pressure. The application can be configured to receive sensor data associated with the sound, temperature, humidity, acceleration, barometric pressure, etc. In some aspects, the application can be configured to determine if there is a leak in one or more of the toilet tanks at least in part on the additional data.

In some aspects, the system can further comprise a second sensor (as part of one or more of the plurality of sensors and/or separate from the plurality of sensors), the second sensor coupled to a processing system of the plurality of processing systems, and wherein the processing system is configured to communicate at least one of sound data, temperature data, humidity data, acceleration data, and barometric pressure data detected by the second sensor with respect to a toilet tank to the platform.

In some aspects, the system can further comprise a user system application configured to receive condition information from the platform associated with a status of at least one toilet tank of the plurality of toilet tanks. In some aspects, the user system application can be further configured to display (or otherwise transmit) an indication of the status of the at least one toilet of the plurality of toilet tanks via a display, speaker or other interface of the user system.

In certain embodiments the sensor can be included in and/or coupled to an existing float in the toilet tank. The electronics can also be included in and/or coupled to the float. In some aspects, the sensor can be positioned within and/or wrapped around a portion of a conduit of a piping system for the container.

In some contemplated embodiments of the disclosure, and as shown in FIG. 3, a leak can be detected and/or usage of a fluid system can be determined by putting a fan or other spinning device 306 within a water pipe 304 through which a fluid (e.g., water) flows to and/or from a toilet or other appliance. A sensor, such as an accelerometer 302 can be coupled (e.g., attached) to the spinning device 306 (e.g., a vane/blade or a hub of the spinning device). The sensor 302 can sense when device 304 spins, or turns, and detect spin data such as number of rotations, length of time of spin, speed of spin, or any other suitable data. Patterns in the spinning data and/or data associated with the recharge of a battery coupled to an electrical generator (e.g., dynamo) as further described below can then be used to identify leaks, versus a flush or other normal activity. In some aspects, a sensor device positioned inside a float of a toilet tank can be coupled with a spinning device and optionally a dynamo or other electrical generator. In some aspects, the dynamo can generate an output based on the spinning of the device to charge a battery of the sensor device. The battery can be configured to power the sensor, controller and/or other component(s) of the system.

Viewed from another perspective, a system for leak detection is provided, comprising a spinning device, a sensor coupled with the spinning device and configured to detect flow data associated with a flow of fluid in a conduit (e.g., a number of rotations associated with a flow event, a length of time of a flow event, a length of time of a rotation event), a processing system coupled with the sensor and configured to communicate the flow data, and a platform comprising and/or communicatively coupled to one or more databases storing known pattern data related to known patterns of flow (e.g., number of rotations and/or speed of rotations and/or length of time of a rotation event associated with a normal flush and/or various types of leaks), and an application coupled with the database and configured to receive the flow data and determine if there is a leak by comparing the data to a subset of the known pattern data.

The flow data can comprise any data associated with the fluid flowing through the conduit (e.g., rate of flow, length of time of flow, type of flow, content of flow, accelerometer data, movement of accelerometer, spin data, number of spins data, number of spins during a time period data, ultrasonic sensor data). In some aspects, the flow data can be used to calculate a length of time of a flow, a rate of flow, a type of flow, etc.

The known pattern data can comprise any data indicative of a known pattern of flow in the system or outside of the system (e.g., classified data sets used as comparison evaluation flow data associated normal and abnormal conditions).

In some aspects, the sensor an comprise one or a combination of: a gyroscope, a compass, and an accelerometer. In some aspects, the sensor can be coupled with the processing system via wires and a slip ring device.

In some aspects, the system can be trained over time to increase accuracy as to what a normal activity and abnormal activity looks like.

In some aspects, the systems described herein can further comprise one or more sensors configured to detect at least one of a sound, a temperature, a humidity, an acceleration, and a barometric pressure. The application can be configured to receive sensor data associated with the sound, temperature, humidity, acceleration, barometric pressure, etc. In some aspects, the application can be configured to determine if there is a leak in the container at least in part on the additional data.

In some aspects, the conduit can be coupled to a pool, jacuzzi, tub, toilet, sink, coffee maker, washing machine, or any other appliance with a fluid connection.

In some aspects, sensor 302 can communicate data wirelessly to a controller 308, which can then communicate the data to, for example, platform 110 and/or an application on a user system 130. In some aspects, where sensor 302 is inside of pipe 304, wireless communication may not be possible. In certain embodiments, a slip ring device 310 can be used in order to allow wires 312 to connect from sensor 302 to controller 308.

In certain embodiments, a controller (e.g., controller 308) can comprise, for example, a series of low-cost, low-power, system on a chip microcontrollers with integrated Wi-Fi and dual-mode Bluetooth such as the Digi-Key ESP32. The ESP32 series can employ a Tensilica Xtensa LX6 microprocessor in both dual-core and single-core variations, Xtensa LX7 dual-core microprocessor or a single-core RISC-V microprocessor and includes built-in antenna switches, RF balun, power amplifier, low-noise receive amplifier, filters, and power-management modules. ESP32 is created and developed by Espressif Systems, a Shanghai-based company, and is manufactured by TSMC using their 40 nm process. It is a successor to the ESP8266 microcontroller.

A sensor of the disclosure (e.g., sensor 302) can comprise, for example, Analog Device's ADXL335, which is a complete, low-power 3-axis accelerometer that measures dynamic acceleration (motion, shock, or vibration) and static acceleration (tilt or gravity) over a 3 g range with 0.3% nonlinearity and 0.01%/° C. temperature stability. The user can select the bandwidth of the accelerometer using the $C_X$, $C_Y$, and $C_Z$ capacitors at the $X_{OUT}$, $Y_{OUT}$, and $Z_{OUT}$ pins. Measurement bandwidth can be selected to suit the application from 0.5 Hz to 1600 Hz for X- and Y-axes and from 0.5 Hz to 550 Hz for the Z-axis. Operating on a single 1.8 V to 3.6 V supply, the ADXL335 consumes 350 µA. Available in a 16-lead LFCSP package, it is specified from −40° C. to +85° C.

It should be noted that the system depicted in FIG. 3 and other systems described herein can also be used to detect air flow, or the flow of other liquids or gases in other environments, in order to detect a leak or other conditions or events.

In some aspects, leaks can be categorized into three categories: a major leak, where there is a lot of flow, for a longer period than a flush; a small (minor) leak where there is a constant but very low flow, and a medium leak, where there is a noticeably periodic emptying, but then sometimes refilling of the tank. It is likely more of a continuum. For example, even with a low leak, the float inside the tank will eventually drop enough that it causes the tank to refill. The period between refills can be based on the rate that water is exiting due to the leak.

Thus, the system can comprise, e.g., in platform 110, or a user system 130, or even in controller 308, algorithms and process that allow the system to recognize a leak based on the patterns, signature, and/or timing of flow. Moreover, the system can learn over time to predict leaks, or worsening leaks, as well as inefficient water usage generally.

In some aspects, a system can comprise a sensor and an ESP32 or similar microcontroller unit to read from the sensor. The sensor may be for example, one or more of: an accelerometer (e.g., ADXL345), a 3-axis magnetic compass (e.g., QMC5883L), and a gyroscope. The system can comprise a Secure Digital (SD) card or other memory card, a real-time clock (RTC) device, a buck-boost or other converter, and a micro USB or other port. Any suitable power source can be used, including batteries. In some aspects, a waterproof case is provided for the device, which can float in the water in, for example, a toilet water tank, or be positioned within a fluid pipe. The microcontroller and/or memory chip can receive sensor data from one or more sensors (e.g., an accelerometer), and it is contemplated that the data can be used in a Wasserstein distance(s) algorithm pipeline to categorize temporal events e.g., normal water flow, stable water movements, major, medium, or small leaks. Data can continuously be gathered from the sensor after a specific interval, for example, 10 atomic readings of the sensor in 1 second (10 Hz frequency). In one embodiment, sensor values can be based on three-dimension data (x-axis, y-axis, z-axis) that is movement of the device. In another embodiment, sensor values can be based on heading/direction data associated with the device. Through these values the system can detect if there is normal/stable activity (no leak) or a leak, and can categorize the leak, for example, as a small, medium, or major leak.

According to another aspect, a system for leak detection is provided, comprising at least one hardware processor, and one or more software modules that are configured to, when executed by the at least one hardware processor, obtain sensor data from a sensor positioned in and/or coupled to at least one of a conduit and a container, the sensor data including at least one of flow data, vertical displacement data and/or other fluid data; and identify (e.g., by determining) a status of the at least one of the conduit and the container (e.g., normal activity, a leak, a danger, activity in the container; environment around the conduit and/or container) based at least in part on the flow data, vertical displacement data and/or other fluid data and evaluation data stored in one or more databases. In some contemplated systems, the one or more software modules are further configured to, when executed by the at least one hardware processor, communicate with an automated valve fluidly coupled to the container and/or conduit to cause the valve to adjust (e.g., shut off). In some contemplated systems, the one or more software modules are further configured to, when executed by the at least one hardware processor, communicate with an external system to schedule a plumbing consultation or service based on a detection. In some contemplated systems, the one or more software modules are further configured to, when executed by the at least one hardware processor, communicate with a user system of a service provider, building manager, and/or other entity, to indicate a type of leak, provide evidence, request and receive feedback (e.g., confirmation of leak) based at least in part on the displacement data and/or other fluid data.

The disclosure herein also provides devices, systems and methods for monitoring and/or controlling a fluid flowing through a pipe. An exemplary fluid monitoring system can comprise at least one sensor (e.g., an accelerometer) configured to detect fluid data associated with a fluid flowing through a first pipe section, a wired or wireless communication interface; and at least one processor configured to perform instructions, the instructions configured to cause the at least one processor to (a) receive the fluid data, (b) determine whether the fluid data is indicative of a normal condition or an abnormal condition, and (c) upon determining the fluid data is indicative of an abnormal condition, at least one of (1) cause a fluid valve coupled to the fluid pipe section to adjust, (2) modify a parameter associated with the at least one sensor, and (3) transmit to at least one of a platform, an external system and a user system, via the communication interface, at least one of the fluid data and a notification relating to the fluid data.

The parameter associated with the at least one sensor can be, for example, associated with a frequency and/or length of time the accelerometer is configured to detect the fluid data. Causing the fluid valve coupled to the fluid pipe section to adjust can comprise closing the fluid valve. Additionally or alternatively, causing the fluid valve to adjust can comprise controlling an electric motor coupled to the fluid valve to adjust the fluid valve. The valve can comprise any suitable valve, including, for example, a ball valve. The fluid monitoring system can also comprise a motor coupled to the at least one sensor and the fluid valve.

The fluid data can comprise any suitable data as described elsewhere herein, and can include, for example, vibration data, or accelerometer data.

In some embodiments, the fluid monitoring system can comprise a second sensor (e.g., accelerometer) configured to detect a second fluid data associated with a second fluid flowing through a second pipe section, a second wired or wireless communication interface, and at least one second processor configured to perform instructions, the instructions configured to cause the at least one second processor to (a) receive the second fluid data, (b) determine whether the second fluid data is indicative of a second normal condition or a second abnormal condition, and (c) upon determining the second fluid data is indicative of a second abnormal condition, at least one of (1) cause a second fluid vale coupled to the second fluid pipe section to adjust, (2) modify a parameter associated with the second sensor, and (3) transmit to at least one of the platform, the external system and the user system, via the second communication interface, at least one of the second fluid data and a second notification relating to the second fluid data. The notification(s) can be indicative of, for example, a present or future leak.

In some aspects, a fluid monitoring system can comprise a sensor (e.g., accelerometer) configured to be positioned in a first portion of a pipe; a valve configured to be coupled to a second portion of the pipe; at least one processor; and a memory storing software instructions that, when executed by the at least one processor, cause the at least one processor to adjust the fluid valve upon a detection of an abnormal condition based at least in part on sensor data from the accelerometer.

In some aspects, a detector for monitoring fluid flow through a pipe section is provided, comprising an accelerometer configured to detect at least one of a measurement and a change associated with a fluid flow through the pipe section; a wired or wireless communication interface; and at least one processor configured to perform instructions, the instruction configured to cause the processor to: receive sensor data from the accelerometer, the sensor data associated with the at least one of the measurement and the change; determine whether the sensor data is indicative of a normal condition or an abnormal condition; and upon determining the sensor data is indicative of an abnormal condition, at least one of: cause a fluid valve coupled to the fluid pipe section to close; modify a parameter associated with the accelerometer; and transmit to at least one of a platform, an external system and a user system, via the communication interface, at least one of the sensor data and a notification relating to the at least one of the measurement and the change detected. In some aspects, the parameter associated with the accelerometer is associated with a frequency and/or length of time the accelerometer is configured to detect the at least one of the measurement and the change. In some aspects, the valve comprises a ball valve. In some aspects, the at least one of the measurement and the change is at least one of a vibration, an acceleration, a movement, and a flow rate during a time period. In some aspects, the software instructions, when executed by the at least one processor, further cause an alert (e.g., an alarm or other sound, a lighting of one or more lights (e.g., in a predetermined pattern and/or color).

In some aspects, a fluid monitoring system is provided, comprising at least one processor, and a memory storing software instructions that, when executed by the at least one processor, cause the at least one processor to: receive sensor data from an accelerometer, the accelerometer coupled to a motor, the motor coupled to a fluid valve, the sensor data associated with the at least one of the measurement and the change; determine whether the sensor data is indicative of a normal condition or an abnormal condition; and upon determining the sensor data is indicative of an abnormal condition, at least one of: cause the fluid valve to close; modify a parameter associated with the accelerometer; and transmit, via a communication interface, at least one of the sensor data and a notification relating to the at least one of the measurement and the change detected. In some aspects, the parameter associated with the accelerometer is associated with a frequency and/or length of time the accelerometer is configured to detect the at least one of the measurement and the change. In some aspects, the valve comprises a ball valve. In some aspects, the at least one of the measurement and the change is at least one of a vibration, an acceleration, a movement, and a flow rate during a time period. In some aspects, the software instructions, when executed by the at least one processor, further cause an alert (e.g., an alarm or other sound, a lighting of one or more lights (e.g., in a predetermined pattern and/or color).

In some aspects, a system is provided, comprising an accelerometer configured to be positioned in a first portion of a pipe; a valve configured to be coupled to a second portion of the pipe; at least one processor; and a memory storing software instructions that, when executed by the at least one processor, cause the at least one processor to adjust the fluid valve upon a detection of an abnormal condition based at least in part on sensor data from the accelerometer. In some aspects, the software instructions, when executed by the at least one processor, further cause an alert (e.g., an alarm or other sound, a lighting of one or more lights (e.g., in a predetermined pattern and/or color). In some aspects, the software instructions, when executed by the at least one processor, further cause a notification to be sent (e.g., via text, email, display of a computing device).

In some aspects a system can comprise a computer networking device (e.g., central hub) having at least one central processor, a user interface and one or more input/output (I/O) ports. One or a plurality of fluid control devices can communicate with the computer networking device. In some aspects, a fluid control device can comprise an electric motor coupled to a fluid valve and an accelerometer coupled to a fluid pipe section. The fluid pipe sections can comprise pipe sections of one or more pipes of a building (e.g., pipes of and/or coupled to toilets, sinks, tubs, washing machines, showers, dishwashers). Each control device can comprise a fluid pipe section including a fluid inlet and a fluid outlet. A fluid valve can be coupled with the fluid pipe section (e.g., in series), and an electric motor can be mechanically connected to the fluid valve. The fluid valve can control a fluid flow through the fluid pipe section. In some aspects, the fluid valve can comprise a ball valve. An adapter can abut an adapter o-ring and capture the ball valve along with the balls seats against a valve body. One or more accelerometers can be coupled to the fluid pipe section and be configured to monitor, detect and/or measure a fluid movement. At least one control device processor can be controllably connected to the electric motor and accelerometer. A control device I/O port can be coupled to the control device processor, and the control device I/O port can be in communication with the I/O port of the central hub. The fluid flow through any individual device may be a liquid flow, a gas flow, an air flow or a combination thereof.

The systems and devices disclosed herein can include some, all, or nearly all components described in U.S. Pat. Nos. 9,857,805 and/or 11,237,574 to Flo Technologies, Inc. However, it should be appreciated that Applicant surprisingly discovered that an accelerometer as described herein can advantageously be utilized to detect fluid movement, for example, in addition to and/or in place of a pressure sensor, flow rate sensor and/or temperature sensor. These and all applications and publications referenced herein are incorporated herein in their entireties.

In some aspects, a housing may be provided to enclosed one or more components. In some aspects, a control device wireless communication transmitter and receiver may be connectable to the control device input/output port. In some aspects, a proximity sensor and/or a moisture sensor may be in communication with the central hub. In some aspects, the input/output port of the central hub may include a central hub wireless communication transmitter and receiver in communication with the control device wireless communication transmitter and receiver.

In some aspects, the user interface may comprise a computer screen and a keyboard or a touch activated computer screen. In some aspects, the user interface may be a website accessible from a remote computer, an alarm system, a mobile computer or a portable electronic device.

In some aspects, a communication wire may be connected physically between the input/output ports of the central hub and control device. In some aspects, a battery may be coupled to the control device processor, and/or a power input may be electrically connected to the control device processor.

In some aspects, one or more speakers may be provided in a system and, for example, electrically connected to the central hub processor for sounding a warning sound and/or one or more lights may be electrically connected the central hub processor for illuminating a warning light.

In some aspects, a method of fluid control can utilize a fluid monitoring and control system having a central hub or other central platform and the plurality of control devices discussed herein. In some aspects, a system may comprise at least one processor, and a memory storing software instructions that, when executed by the at least one processor, cause the at least one processor to: automatically monitor a movement of fluid flowing in the fluid pipe section of the at least one control device of the plurality of devices, determine whether the movement is indicative of a normal flow or abnormal flow, and, upon determining the movement is indicative of an abnormal flow, automatically close the respective fluid valve of the at least one control device of the plurality of control devices. For example, the motor can be coupled to the valve (e.g., ball valve) through a motor coupling that engages a limit stop. The valve stem can engage the motor coupling and valve. The valve stem can slip through a spring seal and o-ring for providing a water tight seal. Tactile switches can be provided that indicate the position of the valve ball. The motor may be directly connected to the ball valve or may be connected through a gear reduction system or other system. Many gear reduction systems known to those skilled in the art may be used to effectively couple the motor to the ball valve such as belts, pulleys or gears.

It should be appreciated that ball valves as well as other fluid valves could be utilized such as a gate valve, cylinder valve, globe valve, butterfly valve, diaphragm valve or needle valve.

In some aspects, the software instructions, when executed by the at least one processor, can cause the processor to alert a user when an abnormal flow is detected. The alert can comprise, for example, a warning light, a warning sound, a text, email or other notification.

In some aspects, the software instructions, when executed by the at least one processor, can cause the processor to close a fluid valve of at least one control device (e.g., for a predetermined amount of time) when an abnormal flow is detected.

In other aspects, a determination of whether a flow is abnormal beyond a threshold amount can include monitoring the movement of the fluid flow for a defined learning period of time and automatically establishing a Wasserstein distance threshold during a defined learning period of time. In some aspects, data sets associated with a movement or flow of fluid with a normal or abnormal flow can be stored as evaluation data in order to be compared to current data. In other aspects, data sets associated with various levels of abnormal flow may be stored as evaluation data for later comparison. In some aspects, a threshold Wasserstein distance may be determined.

In some aspects, a detector for monitoring a fluid flow comprises an accelerometer, a wired or wireless communication interface, and at least one processor configured to perform instructions. The instructions can be configured to cause the processor to receive sensor data from the accelerometer, and transmit to at least one of a platform, external system and a user system, via the communication interface, at least one of the sensor data and a notification relating to the measurement and/or change in a fluid flow (e.g., flow rate) detected.

Also provided herein as systems comprising at least one processor and a memory storing software instructions that, when executed by the at least one processor, cause the at least one processor to receive sensor data from an accelerometer positioned in in, on or adjacent a fluid pipe section and configured to detect at least one of a measurement and a change associated with a fluid flowing through the pipe section, associate the sensor data with a normal and/or abnormal status (and optionally a type and/or severity of an abnormal status), and present, via a user interface, an alert associated with the status. In some aspects, the instructions, when executed by the at least one processor, can further cause the at least one processor to cause the valve to be partially or fully closed upon determination of an abnormal status (e.g., abnormal beyond a threshold amount). In some aspects an alert can be sent to two or more user interfaces (e.g., to a speaker or light(s) in the building housing the pipes, and a building manager or owner's computing device). In some aspects, the software instructions, when executed by the at least one processor, can further cause the at least one processor to present, via a user interface, a listing or one or more service providers within a radius, and/or an option to schedule an appointment with one or more service providers (e.g., plumber).

In order to monitor a fluid flowing through a pipe or portion thereof, a device and/or system of the disclosure can be deployed in, on and/or adjacent a pipe. For example, the device and/or accelerometer can be positioned in a pipe section. The device can act as a user system 130, although it may not contain a local database 134. The device can contain a processing system, with instructions and one or more sensors, including an accelerometer. In some aspects, the processing system can be configured to control the device and/or sensor. The device therefore can comprise a system 200 with a sensor interfaced, e.g., via I/O interface 235.

In certain embodiments, the system can comprise detection, notification and/or scheduling capabilities. In some aspects, the measurement and/or change is associated with a flow rate of a fluid through a pipe section. The flow rate data can be compared to data stored in one or more databases (e.g., flow data associated with normal conditions, vibration data associated with abnormal conditions) to determine whether a pipe or appliance coupled thereto is functioning properly or if a valve should be shut or otherwise adjusted and/or a service (e.g., maintenance, repair, replacement) is needed or recommended).

The detector system can, for example, upon a detection of a measurement and/or a change associated with a fluid flow, cause a valve coupled to an inlet or other portion of a pipe section to be shut off A fluid valve can be coupled with the fluid pipe section (e.g., in series), and an electric motor can be mechanically connected to the fluid valve. The fluid valve can control a fluid flow through the fluid pipe section. In some aspects, the detector system can communicate such detection, via communication interface 240 and/or radio 265. This can be, e.g., communicated back to a platform 110 operated by, or on behalf of, for example, a building owner. In some aspects, the platform 110 can determine, for example, based at least in part on the detection and a query of one or more databases comprising normal and faulty component data, a condition of a pipe and/or appliance coupled thereto. Thus, platform 110 can generate and/or present an alert associated with the flow status based at least in part on the accelerometer data to a user system or external system. Moreover, platform 110 can store data, for example, to show that the detector systems are functional and functioning correctly in case a user wants evidence associated with a recommendation and/or alert.

In some aspects, a report, notification, alert, or summary can be generated by platform 110 based at least in part on accelerator data obtained and optionally other sensor data from one or more sensors deployed in, on and/or adjacent a pipe. The platform can also alert, report, cause an action (e.g., valve adjustment) and/or recommend appropriate steps to one or more user systems and external systems, for example a system associated with a plumber.

As noted above, certain embodiments can also provide for scheduling (e.g., appointment to for a plumber to inspect the plumbing.

Figure 6:
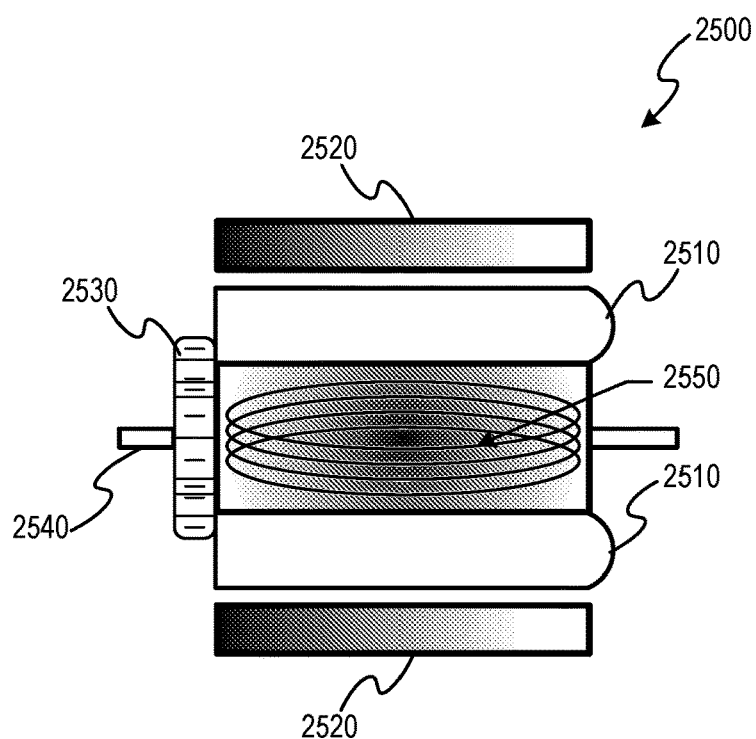
FIG. 6 is an illustration of another exemplary dynamo, according to an embodiment.

The disclosure herein also provides systems for monitoring usage and/or detecting abnormal activity (e.g., a leak) that includes an electrical generator, such as a dynamo. An exemplary dynamo is illustrated in FIG. 5. Dynamo 2400 comprises a coiled copper wire 2410, magnets 2420 surrounding the coiled copper wire 2410, wherein a rotation of the coiled copper wires generates electricity 2430. FIG. 6 illustrates an exemplary CAD for a dynamo 2500, which comprises a ferromagnetic core 2510, a neodymium magnet 2520, a commutator 2530, a central axis 2540, and field coils 2550. It should be appreciated that the materials may be different than those described herein, and all suitable materials are contemplated. In real life scenarios there can always be a margin of errors, especially in small sizes. In some aspects, it is contemplated that the electrical generator(s) of a system can comprise nano-dynamos. For example, a dynamo (or component thereof) can be made using nanoparticles or flakes of silver and/or copper and sintering it to form a nano metal paste.

Figure 7:
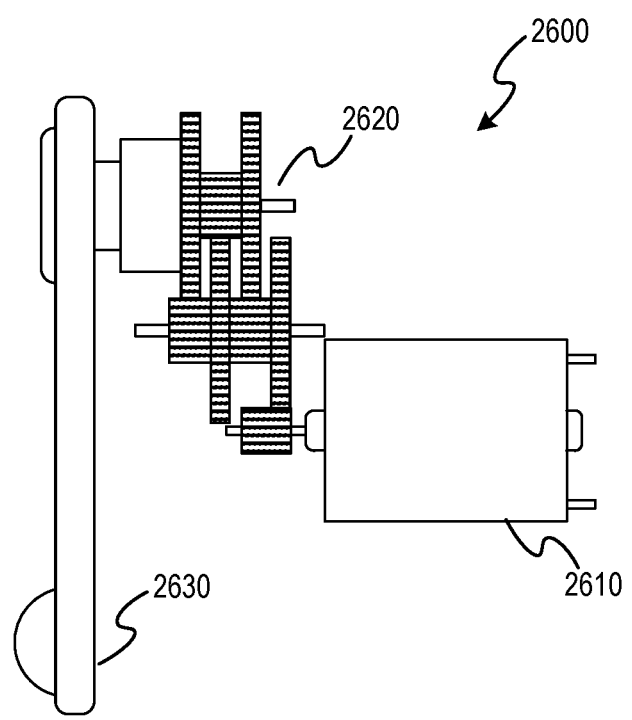
FIG. 7 illustrates a dynamo coupled to a propeller via gears, according to an embodiment.

FIG. 7 illustrates a system 2600 comprising an electrical generator, here, dynamo 2610, coupled to a hub of a spinning device 2630 via a set of gears 2620. In some aspects, a dynamo could be made using a High power N52 grade neodymium magnets and Fine 38 Guage or smaller magnet wire depending on calculations.

Figure 8:
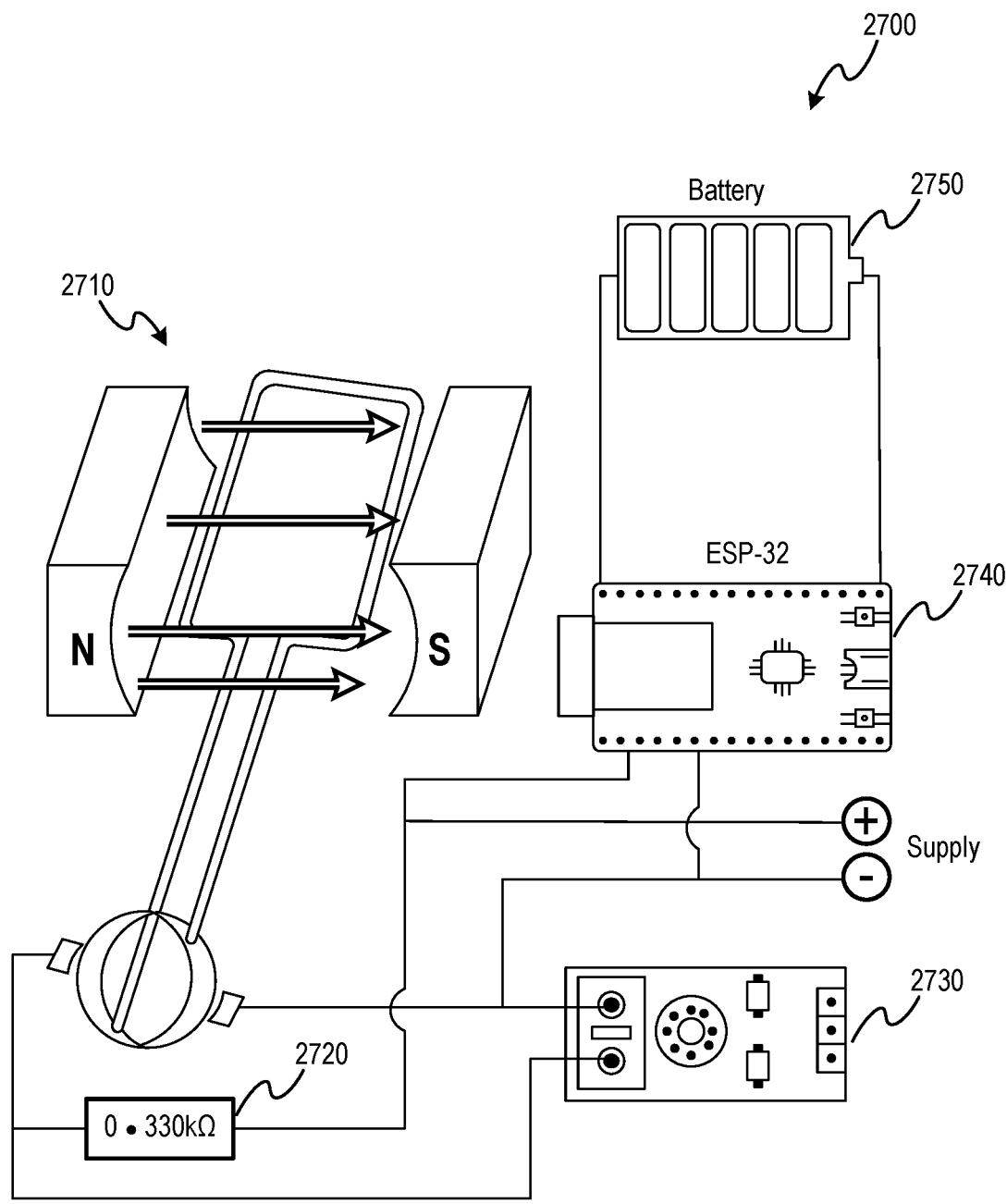
FIG. 8 illustrates an exemplary system comprising a dynamo and controller, according to an embodiment.

FIG. 8 illustrates a system 2700 wherein a battery 2750 is charged by an output of an electrical generator 2710. The system 2700 comprises a spinning device and gear system (for example, as shown in FIG. 26), a dynamo 2710, a calibration resistor 2720, a voltmeter (2730), a microcontroller module 2740, and a battery 2750 that is configured to power the microcontroller 2740. In some embodiments, the propeller is configured to rotate by a flow of water, for example, in a conduit. The gears can be configured to rotate by being connected to the hub of the propeller, and to reduce the torque of the rotational motion generated by the propeller in exchange to the speed of rotational motion. In other words, the gears can reduce the torque to gain speed. This gained speed can help to generate higher voltages. The rotational motion can be channeled to the central axis (e.g., as shown in 2540 of FIG. 6) of dynamo 2710. Dynamo 2710 can convert the rotational energy into electrical energy by the principle of electromagnetic induction. The output (electrical energy) can then pass through a small resistor 2720. In some embodiments, the value of the resistor is small so it allows maximum flow of current. The resistor in itself is advantageous because the current can be measured using the voltage drop across the resistor, which saves money and delays compared to a current meter. However, it is also contemplated that a micro ampere current meter or other suitable meter can be used. The overall voltage of the system can be measured by a voltmeter or voltage module 2730. The power of the system can be calculated by using the formula Power=Voltage×Current. The calculations can be performed in the microcontroller module 2740 (e.g., an ESP32 module), and can be sent through, for example, WiFi, to a mobile device. It is contemplated that the calculations/data associated with the calculations can be viewed through a display screen and an app (e.g., Blink™ application) of the mobile device. The power generated by the dynamo 2710 can be used to charge a battery, for example, a 50 milliampere/hour (mAh) battery. In some embodiments, two aspects can be used to determine whether there is a potential leak. A software loop can be used to check when there is current across the resistor, which can be used to determine the time period of fluid flow in the conduit. This time period or length of time can indicate whether there is a normal condition (e.g., a normal flush) or an abnormal condition (e.g., a small, medium or major leak). The controller can detect when a flow starts and ends to determine a time period of fluid flow and/or whether an activity is normal or abnormal. The microcontroller module can comprise the main processing unit of the circuit. A primary function of the microcontroller module can be to collect data from the resistor and voltage measuring module, then perform a series of calculations that can ultimately be sent using a WiFi module to a mobile app/server. This unit can be any microcontroller and connect to any radio frequency (RF) modules/devices such as Lora, Cellular, etc. In some aspects, the propeller and dynamo can be housed in a first housing, and the microcontroller, resistor and battery can be housed in a second housing separate from the first housing. In some aspects, the propeller, dynamo, microcontroller, resistor and battery can be housed in a single housing. The systems described herein can be used to measure the period of flow of a fluid in a pipe. For example, if evaluation data shows that a normal flush refill in the fluid system comprising the conduit takes, for example, 20 seconds (or falls within a range—e.g., 15-25 seconds), and a calculation shows a 5 seconds flow, this can indicate a potential leak. If the leak is synchronous, it can be tagged as a medium leak as it repeats every n seconds (n being any number). If it is asynchronous, it can be tagged as a small leak. If the leak extends over the normal time (or range of times), it can be tagged as a major leak. Major leak can be a one time or a continuous leak over a long period. The device can be connected via wires or wireless to a switch to shut off the water leading into the toilet, swimming pool, or other fluid container and/or fluid utilizing appliance. An advantage of using a system comprising a dynamo is that we can use the same device in a closed environment without a need for external charge connection. Using such a system we can detect, for example, how many times there is a flush refill and determine water consumption. The microcontroller can determine the number of flush events taking place in a given fluid system.

Viewed from another perspective, a system for a conduit having a fluid flowing therethrough is provided herein, comprising a spinning device, an electrical generator, a resistor, at least one module, a battery, and a controller. The spinning device can comprise a hub, and optionally a set of blades radiating from the hub, and can be configured to be positioned in the conduit and to rotate when the fluid flows therethrough. The electrical generator (e.g., a dynamo) can be coupled to the spinning device and configured to generate an output (e.g., electrical energy) based at least in part on a rotation of the spinning device when the fluid flows therethrough. The resistor can be configured such that the output passes through the resistor. The at least one module (e.g., voltage measuring module) can be configured to obtain output data associated with the output that passes through the resistor (e.g., voltage across the resistor). The battery can be coupled to the electrical generator and configured to be charged by the output. The controller can comprise an application configured to receive the output data and determine a status of a fluid system comprising the conduit based at least in part on the output data.

All suitable fluids are contemplated, including liquids (e.g., water, liquefied/liquid gas) and gases. All suitable fluid systems are contemplated, including toilet systems (including toilet and associated plumbing), a pool system (including a pool and associated plumbing), a hot tub system (including a hot tub and associated plumbing), a gas system (e.g., an appliance such as a stove utilizing gas and associated piping), an irrigation system, and/or an HVAC system (e.g., including heating element, pipe system, ventilation element, air conditioner).

The status can comprise a normally functioning fluid system (e.g., toilet system) or an abnormally functioning fluid system (e.g., minor, medium or major leak, or future leak detected).

The electrical generator can be coupled to the controller, for example, via wires and a slip ring device. The electrical generator can be coupled to the spinning device via gears, and the gears can be configured to reduce a torque of a rotational motion generated by the spinning device. Additionally or alternatively, the electrical generator can be coupled to the hub of the spinning device, or a blade of a set of blades radiating from the hub.

The application can be coupled to a database storing evaluation data. Evaluation data can comprise data associated with the fluid system and/or data associated with other fluid systems. For example, the database(s) can store evaluation data associated with numerous fluid systems located anywhere throughout a home, a building, a city, a county, a state, a country, and/or the world, which can be indicative of various events and conditions. Such evaluation data can include, among other things, fluid data (e.g., historic fluid data), output data associated with a normal flush, output data associated with a small leak, output data associated with a medium leak, output data associated with a major leak, length of time of flow and/or charge associated with a normal flush, length of time of flow and/or charge associated with a small leak, length of time of flow and/or charge associated with a medium leak, length of time of flow and/or charge associated with a major leak, a normal number of flushes in a given period of time, a high number of flushes in a given period of time, a tank refill time under normal conditions, a tank refill time under a leak condition, and/or output and/or length of time of flow associated with an activity in a container (e.g., a subject (e.g., person, animal, baby, kid, adult—of various sizes, shapes, weight, etc.) jumping in a pool, a subject struggling in a pool, a subject swimming in a pool). The application can be configured to determine if there is a leak in the fluid system by comparing the output data obtained from the one or more sensor devices to evaluation data associated with various events and conditions. The application can be configured to determine a status of a fluid system comprising the conduit based at least in part on the output data and the evaluation data. In some embodiments, the application can be configured to determine the status based at least in part on determining a current in the system based on the output data (e.g., where the output data comprises, data associated with voltage across the resistor). In some embodiments, the application is configured to determine the status based at least in part on determining an overall power of the system based on the current and the power data. In some embodiments, the application is configured to transmit power data associated with the overall power to a user system application (e.g., a mobile phone app, a home monitor application such as Blink™).

It is contemplated that the amount of energy in water is given by is potential energy. The potential energy of water is given by the formula PE=mgh, where m is the mass of water in kilograms, g is the force of gravity which is 9.8 m/s². and h is the displacement traveled by water in meters. In a scenario where the amount of water used for a normal flush is 4 pounds, or approximately 1.8 kg, and the distance traveled by water is 0.3m. Using the formula PE=mgh, PE=1.8 kg×9.8 m/s²×0.3m, which is approximately 5.3 Joules. 1 Watt=1 Joule per second. If 4 pounds of water is released in, for example, 10 seconds, 5.3 Joules/10 seconds=0.53 Watts. This 0.53 Watts of energy is equal to about 5V (volts) and 0.1A (amperes). 0.1A is equal to 100 mA. If the efficiency of contemplated propeller (spinning devices) is, for example, 10%, the amount of electricity that can be generated can be considered to be 0.053 Watts (or about 5V and 10 mA). This would mean the amount of electricity that can be generated is about 0.053 Watts. The propeller design can be optimized, and it is contemplated that the accepted efficiency can range from about 10% to a maximum of about 92% about.

In some embodiments, the voltage generated by the dynamo can be capped at, for example, 5 Volts for usage purposes. The current in the system can be the same everywhere where the components are connected in series (except the voltage meter). The current in the circuit can be measured by using the value of voltage across the resistor. The voltage across a fixed value resistor in a series circuit can be used to calculate the current in the system. A formula used to do this is Ohm's law (V=IR, where V is the voltage (across resistor), I is the current (through the resistor), and R is resistance (the value of the resistor itself)).

As one non-limiting example, if voltage across a resistor is 10 Volts, the value of the resistor is 2 Ohms, then the current in the circuit is 5 Amperes. With these measurements, the power generated can go to the battery charging circuit that charges the battery. In order to calculate the energy generated in the process, suppose the water delivered by a tank is 4 gallons in 20 seconds, the diameter of the pipe is, for example, 0.5 inches, and the speed of water is, for example, 0.5 meters per second. Using the equation P=y× g×η, wherein P is Power in watts, y is the flow rate of water, g is the gravitational constant, and η is the combined efficiency of the system, P=approximately 0.5×9.8×0.5 (assuming 50% efficiency of system)=approximately 2.45 watts. Converting the 2.45 watts to watt hours, we get 2.45×20 seconds and then divided by 3600 to convert to watt hours, that comes out to be 13.6 mAh. To fill a 50 mAh battery, we would need about 3.67 hours of total runtime. 3.67 hours=13,212 seconds. 13,212 divided by 20=about 660 flushes. If there are 10 flushes per day, that would mean it would take about 65 days to fill a battery.

If a device produces power of 1000 watts and maintains that power for one hour, then it is said to have produced 1 kW/h. If, for example, a device produces 2.45 watts per second for 20 seconds, we can convert seconds to hours by dividing 20/3600, which is about 0.0056. We can convert watts to kilowatts by dividing 2.45 by 1000, which equals about 0.0025 kW. By merging both of the values that is kW multiplied by hours we get 0.0024 kw×0.0056 h=0.000014 kWh. In order to convert kWh to mAh in this example, the formula kWh×1000/voltage=0.000014×1000/5 (where voltage is 5 as an example), which equals about 0.0028 mAh per flush. If we need 50 mAh, then the number of flushes would be given by 50 divided by 0.0028, which is about 17,000 flushes. This is simply an example for explanation purposes, and the actual power generated by the devices and systems of the inventive subject matter can be much higher.

As another non-limiting example, where a voltage in a circuit is regulated at 5 Volts, suppose the current flows a total of 5 milliamperes (mA). The power of the circuit can be, for example, P=5×5×103=about 0.02 Watts. This is an example but it is contemplated that the actual current would be greater. If 0.02 Watts maintained for 40 seconds (which can be representative of a normal length of flow from a flush)=approximately 0.0002 Watt hours. 0.0002 Watt hours=approximately 0.00004 ampere hours (Ah) or 0.04 mAh. To charge a 1,000 mAh battery, it would take approximately 25,000 cycles (or 25,000 normal flushes), which is 1,000/0.04.

In some aspects of the disclosure, devices, systems and methods for charging a power source (e.g., rechargeable battery), leak detection, and/or detecting a fluid flowing through a conduit such as a pipe or tube are provided. An exemplary system can comprise an electrical generator (e.g., a dynamo) configured to generate power from a fluid flowing through at least a portion of a pipe, tube or other conduit(s), and a detector configured to be powered by the electrical generator, the detector can comprise at least one sensor configured to monitor fluid flowing through the pipe, tube or other conduit(s), and at least one processor configured to perform instructions (e.g., receive and transmit sensor data) to a platform. A power meter can be coupled to the electrical generator and be configured to measure power generated by the electrical generator. In some aspects, a power meter can comprise, for example, an IoT power meter, which could be made using esp32 and suitable measuring instruments. The main code could be, for example, written in esp32 and transmitted over internet using Blink.

In some aspects, a dynamo or other electrical generator can generate power, and can be coupled to one or more sensors (e.g., accelerometer) or other devices, for example, via wires.

In some aspects, a system is provided, comprising a dynamo or other electrical generator configured to generate power from a fluid flowing through at least a portion of a pipe, tube or other conduit(s). A power meter (e.g., an IoT power meter) can be coupled to the dynamo or other electrical generator and be configured to measure power generated by the electrical generator. The system can comprise at least one processor configured to perform instructions that cause the at least one processor to receive power data from the power meter, and transmit the power data, via a communication interface, to a platform. It is contemplated that the dynamo or other electrical generator can continuously charge a rechargeable battery of the detector. In some aspects, the platform comprises an application configured to obtain the power data and determine if there is a leak based at least in part on the power data and evaluation data (e.g., known pattern data) stored in one or more databases.

In some aspects, a system is provided, comprising an electrical generator (e.g., a dynamo) configured to generate power from a fluid flowing through at least a portion of a pipe, tube or other conduit(s) of a fluid system. A detector configured to be powered by the electrical generator can be provided, and the detector can comprise at least one sensor configured to monitor fluid flowing through the pipe, tube or other conduit(s), and at least one processor configured to perform instructions, the instructions configured to cause the at least one processor to receive fluid data detected by the at least one sensor, and transmit the fluid data, via a communication interface, the a platform. The at least one sensor can comprise one or a combination of a gyroscope, a compass, and an accelerometer. The at least one sensor can be coupled with the processing system via wires and a slip ring device. The platform can comprise an application communicatively coupled to one or more databases (e.g., remote databases) storing evaluation data, and can be configured to receive the fluid data and determine if there is a leak in the fluid system based at least in part on comparing the fluid data to the evaluation data. In some embodiments, the platform can comprise one or more databases storing evaluation data, and an application coupled with the at least one database and configured to receive the fluid data and determine if there is a leak in the fluid system based at least in part on comparing the fluid data to the evaluation data. Evaluation data can comprise data associated with the fluid system and/or data associated with other fluid systems. For example, the database(s) can store evaluation data associated with numerous fluid systems located anywhere throughout a home, a building, a city, a county, a state, a country, and/or the world, which can be indicative of various events and conditions. Such evaluation data can include, among other things, historic fluid data, known patterns (e.g., known pattern data indicative of a normal flow, a flush, a leak), vertical displacement data associated with a normal flush, displacement data associated with a small leak, displacement data associated with a medium leak, displacement data associated with a major leak, movement data associated with a normal flush, movement data associated with a small leak, movement data associated with a medium leak, movement data associated with a major leak, length of time of flow through a conduit portion associated with a normal flush, length of time of flow through a conduit portion associated with a small leak, length of time of flow through a conduit portion associated with a medium leak, length of time of flow through a conduit portion associated with a major leak, a normal number of flushes in a given period of time, a high number of flushes in a given period of time, a tank refill time under normal conditions, a tank refill time under a leak condition, and/or displacement and/or length of time of flow associated with an activity in a container (e.g., a subject (e.g., person, animal, baby, kid, adult—of various sizes, shapes, weight, etc.) jumping in a pool, a subject struggling in a pool, a subject swimming in a pool). The application can be configured to determine if there is a leak in the fluid system by comparing the fluid data obtained from the one or more sensor devices to evaluation data associated with various events and conditions. In some aspects, the application can be configured to determine an event type (e.g., a leak, a flush, a jumping in a pool, a struggle in a pool) by comparing the fluid data obtained from the one or more sensor devices to evaluation data. In some aspects, a power meter can be coupled to the electrical generator and configured to measure power generated by the electrical generator. In some aspects, the application can be configured to receive the power data and determine whether there is a leak based at least in part on the power data.

The system can further comprise a spinning device, wherein the at least one sensor is coupled to the spinning device and configured to detect a flow of the fluid (e.g., a liquid, a gas, or combination thereof) flowing through the pipe, tube or other conduit.

In some aspects, a system can further comprise a second electrical generator configured to generate power from a second fluid flowing through at least a portion of a second pipe or tube, a second detector configured to be powered by the second electrical generator, the second detector comprising at least one sensor configured to monitor the second fluid flowing through the second pipe or tube, and at least one processor configured to perform instructions, the instruction configured to cause the at least one processor to receive a second set of sensor data from the at least one sensor of the second detector, and transmit data associated with the second set of sensor data, via a communication interface, to the platform. Viewed from another perspective, the systems described herein can comprise a second, third, fourth, fifth, or any suitable number of dynamos or other electrical generator coupled to a detector as described herein and/or one or more power meters. For example, a dynamo (or other electrical generator)-detector and/or dynamo-detector-power meter combination can be installed throughout conduits in a home, building, etc. and transmit data associated with the sensor and/or power and/or fluid flow to a platform.

It should be appreciated that some systems and methods described herein provide a way to detect a leak by measuring the recharge amount (e.g., mAh) during an event and/or the length of time a voltage across the resistor is measured and comparing it to a time span therefore differentiating a normal timed operation like flush refill to a leak event. The system or device can be self-charged via the dynamo or other electrical generator so it can last, presumably for as long as there is a fluid connection. It can be implemented in the manufacturing of the toilet mechanical system. It can be used to charge the detector and/or sensor devices described herein, and can be connected to some or even every water device within a smart home or building.

Also disclosed herein are devices, systems and methods for monitoring a fluid and/or detecting a leak in a liquid container and/or conduit (e.g., pipe, tube) that comprise a wrapped sensor (e.g., accelerometer, ultrasonic sensor), for example, as shown in FIG. 4. In some aspects, for example in a system 2300, a detector device 2330 is provided, the detector device configured to be positioned at least partially around an outside of a conduit 2310, comprising at least one sensor (e.g., an accelerometer, an ultrasound sensor). The device can comprise a clamp, band or other component 2320 configured to removably and/or fixedly couple to (e.g., clamp around) an outside portion of a pipe, tube, or other conduit.

Figure 9:
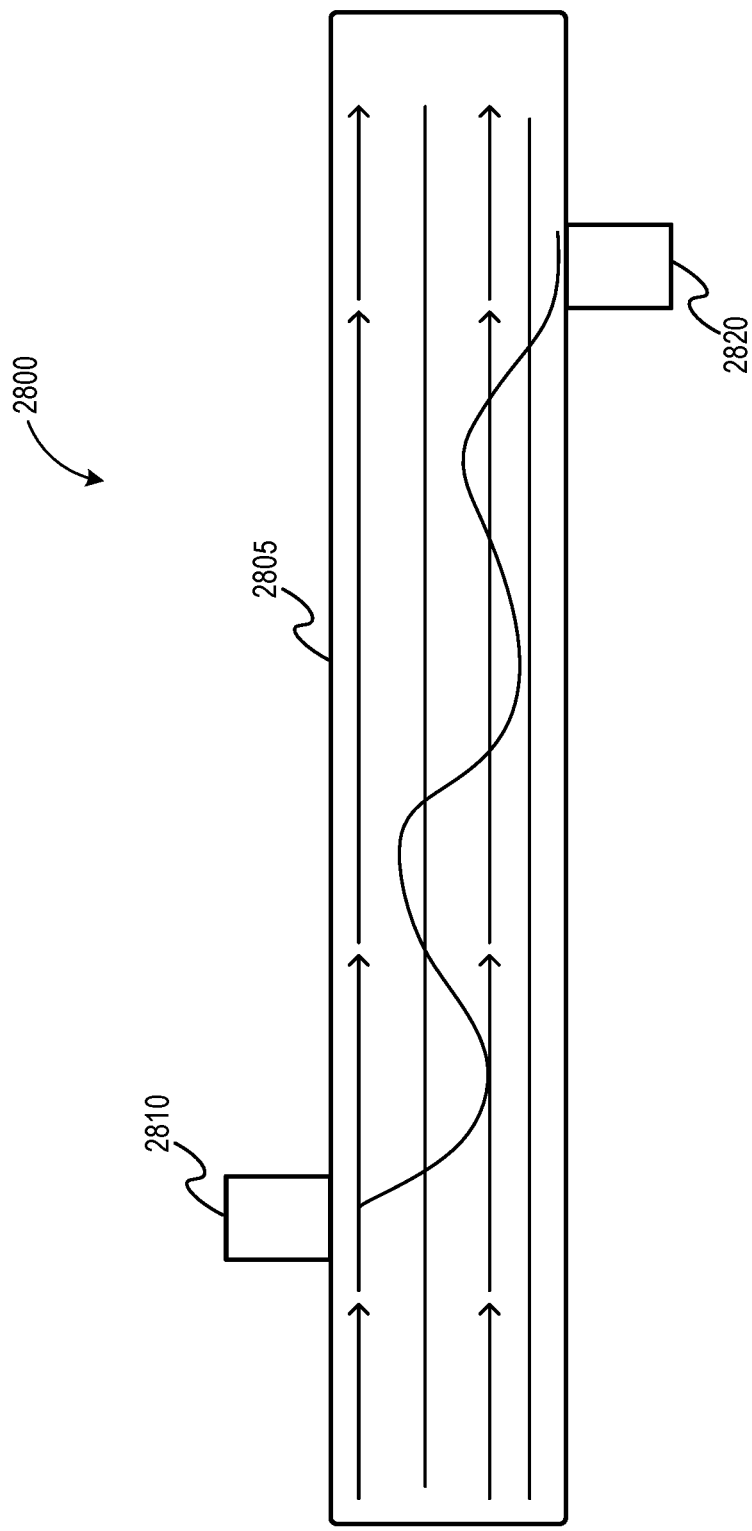
FIG. 9 illustrates a set of ultrasonic sensors coupled to a conduit and configured to monitor a fluid flowing through the conduit.

FIG. 9 illustrates another system 2800 of the disclosure comprising a conduit 2805, a first ultrasonic sensor device 2810 wrapped around at least a portion of the conduit at a first position, and a second ultrasonic sensor device 2820 wrapped around at least a portion of the conduit at a second position separate from the first ultrasonic sensor device 2810 (e.g., downstream from the first ultrasonic sensor device). The sensor devices can be configured to measure a length of flow of a fluid (e.g., water) flowing through the conduit 2805. An echo incidence time delay registry code can be calibrated according to the frequency of at least one of the first ultrasonic sensor device 2810 and the second ultrasonic sensor device 2820. The ultrasonic sensor device(s) can comprise a driver circuit, for example, a high frequency gate controlled drive (or H-bridge driver). In some embodiments, this is necessary for the main circuit because the main circuit may not compensate for the power draw of the module. Esp32 in this regard is very sensitive to reverse spikes.

Without wishing to be bound by any particular theory, exemplary calculations using ultrasound sensors are provided below:

The time taken by waves to travel from point A to B is $T_1$, and the time taken for waves to move from B to A is $T_2$. $T_2$ is greater than $T_1$ because waves moving from point A to point B are assisted by the flow of water moving in the same direction. In some embodiments, speed of water can be measured using ultrasound at two distinct points on a pipe. The frequency can be changed with respect to speed of water. The speed of ultrasound can increase as the sound is moving in the direction of fluid. The speed of ultrasound can decrease in the opposite direction of travel of fluid. This is called transit time method of finding relative speeds.

In some aspects, $T_1 = L/(U+\text{(assistance by water)})$.

In some aspects, $T_2 = L/(U+\text{(resistance due to water)})$.

In some aspects, the assistance and resistance due to water are inversely proportional to the angle that waves make with water (cos x). After substitution the equations can become: $T_1 = L/(U+\cos x)$, and $T_2 = L/(U-\cos x)$.

$\Delta T = (L/(U-\cos x)) + (L/(U+\cos x))$.

$\Delta T = 2VL\cos x/(U^2 - V^2 \cos^2 x)$.

Example: $\Delta T$ when U=1497 m/s, V=1 m/s, D=100 mm (width of pipe) and x=45°

Solution: L=D/sin x=155.5/1000=0.1555 meters; $T_1$=L/(U+V cos(x))=0.1555/(1497+1 cos(45))=103825 nano seconds; $T_2$=0.1555/(1497−1 cos(45))=103923 nano seconds; $\Delta T = T_2 - T_1 = 98$ nano seconds. ($\Delta T \times$(speed of ultrasound in fluid))/2=speed of fluid in pipes. The time difference between sent and received waves can be used, for example, to measure the speed of flow.

The speed of sound in water also depends on the temperature of water so necessary adjustment may be needed to eliminate the errors from calculations and a temperature sensor needs to be placed on pipe to measure real-time fluid temperature.

In some aspects, a total of 4 transducers are provided to be used for this setup to work. Generally, the higher the frequency of transducer the more accurate it is and more expensive the transducer is. In some aspects, the recommended frequency of transducer is greater than 1 MHz and a preferred value of transducer is 10 MHz or greater with accuracy within 1%. The transducers may be operated by some source that has frequency greater than transducers frequency. So, a frequency generator can be introduced in the setup. And some power electronics to amplify the signal so the transducer receives the necessary power. Then any microcontroller board can be used to analyses the data and then represent on any given screen or output device.

Contemplated systems can also be used for submetering purposes. In office buildings, apartments, or other multi-tenant buildings, the systems described herein can be used to measure each apartment unit and/or office space's water usage (e.g., for billing purposes). This can be very important for commercial buildings like hotels, apt buildings and warehouses, which can have numerous toilets, but usually have one water meter for the building. Tenants or guests usually do not care about their water usage in such environments, but the cost of leaks can be significant. By deploying the systems and methods described herein, sensor devices can be deployed in the toilets and the displacement data and/or other fluid data can be reported to, e.g., platform 110 having an application configured to determine usage and/or condition of a toilet system (or other fluid system of the building) based on sensor data (e.g., fluid data) as described in this disclosure. User systems 130 can then be used to view information associated with the usage and/or condition of one or more toilet systems within the building. Platform 110 can also be configured to alert the user(s) when the data indicates a potential leak. The sensor and platform can actually be used, in such embodiments to provide water usage per toilet, appliance, unit, space and/or owner. This is because the sensor(s) can monitor fluid flowing through various conduits throughout a building (e.g., using vibration data, pressure change data, and any other suitable data), and can measure displacement each time, for example, a toilet is flushed. A flush is something much different than a leak or evaporation and as such, the "signature" for a flush can be detected. But the displacement data and/or other fluid data due to flushing, leaks, evaporation, etc., for each unit can be detected and, for example, displayed and/or provided to a user system of a building manager or other entity. In some aspects, the system can measure usage by getting fluid data and additional data associated with the fluid system (e.g., the size of a toilet tank or pool of a fluid system). A length of time of a flush refill can indicate usage. A small leak might be continuous and prevent a refill of the tank until the leak is fixed. Viewed from another perspective, a normal activity, which can be a flush refill, times the size of the tank, times the number of uses, can indicate a use. A continuous small leak (or a major leak), for example, can prevent the tank from refill and continue water stream until it is fixed. Such a leak can be detected and determined to be indicative of an abnormal event (e.g., a small leak).

Thus, the systems described herein can comprise, e.g., in platform 110, or a user system 130, algorithms and processes that allow the system to recognize a leak based on the patterns, signature, and/or timing of flow, and/or measure usage based on sensor data. Moreover, the system can learn over time to predict leaks, or worsening leaks, as well as inefficient water usage generally.

It is contemplated that the systems described herein can be positioned around and/or adjacent any suitable conduit of a fluid system where fluid passes (e.g., drain pipe, any suitable portion of a breast pump through which fluid flows, any suitable portion of a milking machine through which fluid flows), and/or in or adjacent a container of a fluid system.

In some aspects, a system can multiple sensor devices each comprising at least one sensor configured to obtain sensor data as described herein, the sensor data being associated with a second fluid flowing through various fluid systems. Each sensor device can comprise at least one processor configured to perform instructions, the instruction configured to cause the at least one processor to transmit sensor data, via a communication interface, to the platform. Viewed from another perspective, the systems described herein can comprise a second, third, fourth, fifth, or any suitable number of sensor devices as described. For example, sensor devices can be installed around numerous conduits and/or containers in a home, building, etc. through which fluid flows, and transmit sensor data to a platform. The platform can comprise and/or be coupled to one or more databases storing evaluation data, and can comprise an application storing software instructions that upon execution cause the application to determine usage and/or condition of one or more of the fluid systems of the system based at least in part on sensor data obtained from one or more sensor devices deployed in one or more fluid systems (conduits and/or containers).

A way to detect any flow of liquids in multiple devices such as showers, faucets, dish washer, outside hose, and even to other applications like sub metering multi-unit apartments, measuring flow of milk from cows, determine amount of milk coming out during breast feeds or breast pumps, and various other applications, including industrial applications, are contemplated herein.

In some aspects, once a leak is detected, the system can automatically cause an on/off or partial close (e.g., of a pipe valve) function to be performed. In some aspects, a detector (and/or other components described herein) can be connected to a toilet, faucet, beverage machine, or other appliance, and the system, or an operator using the system, can schedule a maintenance service and/or determine a charge based on usage and/or cause supplies to be ordered (e.g., filters, pods, etc.) based on use and/or a subscription and/or be presented with options, via a user interface, to schedule a service, order supplies, and/or send out a bill based on a charge, among other things.

In some aspects, the above can be done in mesh networks that has a custom hub and repeaters as needed to RF sensors installed in each device. In some aspects, components can be connected to a WiFi, cellular or other network. In some aspects, the RF sensors can utilize WiFi, cellular, LoRa, Zigbee, Z Wave, and/or other suitable technologies. In some aspects, the RF sensors are custom made.

In some aspects, one or more of the sensor devices can be configured to be positioned at least partially around an outside of a conduit or other structure of a fluid system, and the sensor devices can comprise at least one sensor (e.g., an accelerometer, an ultrasonic sensor). The device can comprise a clamp, band or other component configured to removably and/or fixedly couple to (e.g., clamp around) an outside portion of a pipe, tube, or other conduit, and/or any other suitable portion of a conduit and/or appliance. In some aspects, a second sensor device can be provided at least partially around an outside of the same conduit, for example, downstream of the first sensor device.

One or more sensors of the sensor device can be configured to obtain sensor data associated with at least one of a vibration, a pressure change and/or length of time associated with a fluid flowing through the conduit. In some aspects, at least one processor configured to perform instructions can be provided, the instructions configured to cause the at least one processor to, among other things, receive sensor data from one or more detector devices, and at least one of transmit data associated with the sensor data (e.g., the sensor data), via a communication interface, to the platform. In some aspects, the platform can be configured to determine usage and/or condition information of a fluid system based at least in part on the sensor data. In some aspects, the platform can be configured to determine usage and/or condition information of the fluid system based at least in part on the sensor data and evaluation data stored in one or more databases.

In some aspects, it is contemplated that the devices and systems described herein can be used as a mechanism to detect leaks in swimming pools by wrapping one or more of the intake and outtake pipes.

In some aspects, it is contemplated that the devices and systems described herein can be used as a nondestructive testing mechanism to detect gaps in concrete and/or wood and/or other piling, columns and/or other structures. In some aspects, the devices and systems can be used to detect minor or hidden/unseen cracks. It is contemplated that the nondestructive testing can also be done, for example, by applying specific known Force using a mechanical hammer to the piling and/or other structure, and measuring the acceleration via the accelerometer, thereby identifying the mass or voids by using the formula F=ma.

In an embodiment, systems, methods, and non-transitory computer-readable media disclosed herein can detect leaks based at least in part on sensor data obtained from at least one sensor positioned outside of a conduit that a fluid flows through. As shown in FIG. 10, at least one sensor 2330 can be held in place in a position outside of a portion of the conduit 2310 via a clamp, ring, straps, or any other suitable component 2320. In some aspects, the device can transmit data to a platform where the data can be viewed, used to query a database to determine if there is a leak, and/or transmitted to a user system, i.e., a smartphone, application for viewing. In some aspects, the platform can be configured to alert a user system when a leak is detected.

It is contemplated that the techniques described herein can be used to determine a liquid flow and a potential leak or regular usage. In some aspects, one or more sensors (e.g., an accelerometer, a compass, an ultrasonic sensor, a laser sensor) are provided in a detection device that is at least partially wrapped around a portion of a conduit. Such a detection device can be configured to changing pressure/flow inside a pipe. Upon detection of a flow, the device and/or platform can utilize Wasserstein distance(s) algorithms to detect abnormal movements based on, among other criteria, length of the flow, timing of the flow, etc.

In some aspects, the devices and systems described herein can be used to determine usage, for example, from a faucet, a shower, a porch hose, etc.

Without wishing to be bound by any particular theory, the following principal can be used in connection with some wrapped sensor (e.g., accelerometer) devices described herein.

The pipe acceleration/vibration can be measured as the second derivative over time (t)=−C*p'(x), wherein p'(x) is pressure fluctuation, and C is a constant.

Using the wrapped sensor device as described herein, it is contemplated that the system can measure vibration of the pipe and therefore derive the pressure fluctuation (or flow inside the pipe). By using the knowledge of pressure changes in the pipe or other conduit, the amount of flow of a fluid within the conduit can be determined. When the flow increases or decreases, fluid usage can be determined, for example, using Wasserstein distance(s) algorithms. This determination can be used to detect normal and/or abnormal behavior of a toilet, faucet, shower, hose, or other appliance.

Some clamp on flow meters that measure flow rate of water or water/glycol solutions are expensive (e.g., over $1,000) and cost prohibitive. Applicant surprisingly discovered that a low cost ultrasonic sensor can be used in a detection device and/or system as described herein, to detect a leak using the time length of the flow of fluid (e.g., liquid) flowing in the pipe. The detection can be based on flow cycle and not the accuracy of the flow. For example, with respect to toilets, abnormal behavior detected can include a short refill every certain time or a very long refill which can be considered to be a major flow/leak. Wasserstein distance(s) algorithms can be used to identify cycles that are abnormal where there are many different edge devices to measure. This can be used to detect leaks (and/or other abnormal behavior) within many different devices that are connected to the water main, not just toilets (e.g., coffee machines, soda machines, washing machines, refrigerators, etc.).

Experiment.

Nowadays, toilet leakage is a major problem. There are a large percentage of toilets facing this leakage problem. Toilet leaks lead to several problems like water waste and damage to the water container. The devices, systems and methods advantageously provide a leakage detection solution. In the examples discussed herein, the device used is based on ESP32 with ADXL 345 containing SD card, RTC, buck boost, and mini-USB. AAA batteries are used, and rechargeable battery (e.g., lithium polymer (LiPo)) can be used. The device is inside a waterproof case and floats in the water in the toilet water tank. It takes readings form a sensor (accelerometer) that can be used with the Wasserstein distance approach to flawlessly categorize temporal events e.g., normal water flow, stable water movements, major, medium, or small/minor leaks. This can be viewed as a classification problem as we are continuously getting data from the sensor during a specific interval, for example, 10 atomic readings of the sensor in 1 second (10 Hz frequency). Sensor values may be based on three-dimension data (x-axis, y-axis, z-axis) that is movement of the device. Through these values the devices and systems of the disclosure are configured to detect if there is a leak (major, medium, small) or no leak (normal and stable).

Here, time series data of five classes that are major leaks, medium leaks, small (minor) leaks, normal, or stable, and explored. One file is considered as an atomic activity or one sample point for model training or validation. So, it is important to analyze and understand how much data we have for each class. As this is a time series problem, we separately place validation files in another folder. We did not do random splitting because it can place data samples from a same file into two sets. In the validation set, we keep nearly equal distribution for each class.

The data distribution of training data was analyzed, which is shown in FIG. 4, and the data distribution of validation data was analyzed, which is shown in FIG. 5. Small leaks are not included in the validation dataset given the low number of examples in this class.

Exploratory Data Analysis.

In this section we explore how data values change in their chronological order. We do not just observe the absolute values but normalize them in a way that we only observe movement of the device relative to its initial position. We call this methodology as absolute average, as the values are simply the average of window with a size of 30 slided over the data in chronological order. The trend for the medium leak class is shown in FIG. 6, the stable class in FIG. 7, the small leak class in FIG. 8, the normal class in FIG. 9, and the major leak class in FIG. 10.

Application Architecture. The application comprises three major modules: IoT devices, Firebase and/or other platform for creating mobile and web applications, and user interface.

IoT Devices: We have multiple IoT devices that are placed in different locations. We are using IoT devices for multiple purposes. A major purpose of the device is to detect if there is a water leak or not. Another purpose is for data gathering. The data we gather is classified (e.g., by fluid environment) and later used for in the Wasserstein distance(s) algorithms All the IoT devices are connected to the Firebase.

It should be noted that the processing described herein can occur on platform 110, or at the edge, i.e., on a user system 130—where the user system in this case is any system that includes the sensor platforms or is connected there with remote from platform 110. Being able to perform the processing at the edge provides low power, improved latency and speed, lowers the cost of data, because it reduces cloud cost, etc. With respect to power consumption, certain embodiments or applications can implement thresholds that are configured to detect or determine stable operation and allow the user system, or remote sensor platform so that the edge device(s) can be put into a sleep or deep sleep mode to reduce power. The thresholds can be related not only to operational parameters, i.e., steady not steady, but also to the timing of any potential issues being detected. For example, if it is known that a toilet is operating properly, and that typically any leaks start small and more intermittent, before growing and becoming more frequent, then this information can be used to set a time period for how long the sensor platform is put into a sleep mode.

Firebase: Firebase is a mobile application development platform (but any suitable mobile application development platforms are contemplated herein, such as Appwrite) that helps you build, improve, and grow your app. Traditional app development typically involves writing both frontend and backend software. The frontend code just invokes API endpoints exposed by the backend, and the backend code actually does the work. However, with Firebase products, the traditional backend is bypassed, putting the work into the client. Firebase provides multiple features including cloud function (no need to run and maintain your own server, you do have an isolated code base for back-end code, highly scalable), real-time database (that is cloud-hosted in which data is stored as JSON, the data can be synchronized in real-time to every connected client such that all of the clients share one real time database instance and automatically receive updates with the newest data, so if there is a change in any device configuration it can automatically reflect in UI), and hosting (host web application o cloud, cloud hosting for deploying angular application).

User Interface. User interface modules can contain the dashboard development. The dashboard can contain a complete user and device registration process. The dashboard can also contain data gathering functionality.

Data Gathering: The Esp32 module can be connected to an Adxl343 triple-axis accelerometer with a broad sensitivity range. It can detect various kinds of motions like single tap, double-tap, activity, inactivity, and free-fall. In order to detect these different kinds of motions, the interrupts can be enabled and mapped.

In the experiments, firebase can be used to store the data. The Esp32 module can connect to the Firebase Realtime Database. The Firebase Realtime Database is a cloud hosted database that allows you to sync and store data between your users in real time, and it is available even when our app goes offline. A single instance of the database can be shared amongst all of our clients.

For authentication, the anonymous method can be used. Every time a user connects, the user is added to the users table.

Using the Firebase Realtime Database, we can subscribe to a variable. So, whenever a change in the value of that variable occurs, we can listen to it. Using the listener class, we will get the values for start and stop.

Whenever start is clicked, the Esp32 module will get the value for the start flag. Get the data using the Adxl343 accelerometer in normal state for 2 minutes, stop and send the data.

In order to send the data, the values will be added to a string. Then the string will be added to a JSON object which will be sent to the Firebase Realtime Database.

Then this step will repeat for medium, stable, major, and small leaks.

Data Validation. For the data validation, data had been collected in different states. That data was used for validation, Then, the predicted and actual states were matched.

Interrupts. The Adxl343 is a triple-axis accelerometer that generates values for the x-axis, y-axis, and z-axis. It has a broad sensitivity range. We can use the Adxl343 to detect various types of motions such as free fall, single tap, double-tap, or any other activity.

In order to detect these different kinds of motions, we will be using the Sparkfun_Adxl345 library. The Adxl343 is pretty similar to Adxl 345, so the Sparkfun_Adxl345 works well with the Adxl343. Interrupts on any of the three-axis can be detected. We can customize to select what kind of motion or on which axis to detect that interrupt. The threshold values for interrupts can be changed and set through experimentation.

Usage in ESP32. Initially, the device is kept in sleep mode to save battery, and when any movement activity happens it can be configured to turn on. Optimal threshold for directional movements can be identified by analyzing simulated experiments, for example, in which we place the device in various water conditions. Then the Adxl can start generating data for a fixed duration which can be determined through experimentation. Data can be collected for a certain amount of time before any predictions are made. The data can then be preprocessed and the model will make predictions about which type of leak occurred. Device can be set to sleep mode again.

Wasserstein Distance Algorithm

While U.S. patent application Ser. Nos. 17/834,904; 17/834,914; 17/834,916; and Ser. No. 17/834,920, which are incorporated herein by their entirety as if set forth in full, disclose the use of machine learning to train the sensors and the algorithms used to detect activity. But the Wasserstein distance algorithm can also be used.

Preprocessing. In order to perform preprocess of the data, a preprocessing module can be built that takes data, remove anomalies (super high variations or noise), adds new features generated by weighted directional and temporal averaging of accelerometer readings, and exports them as input data for training and inference.

Classified Data Sets. We can employ vectorized version of Support Vector Machines (SVM) with polynomial kernel to perform the task of multi-class leakage classification. We can utilize grid search to find optimal trade-off between the speed and performance. This model works within an atomic matrix operation and polynomial kernel operation but as there is no LAPACK support available in ESP32, the underlying algorithm may not be vectorized.

Benchmarking Battery Usage. Finding the battery consumption of a microcontroller can be an important step in designing the algorithm or hardware. We are currently using Esp32. Before move on to any other module, the current battery consumption can be determined. Instead of designing all the hardware and then determining the battery consumption during different steps, another approach would be to run a simulation and observe the battery consumption during different processes.

Shunt Resistor. In order to measure the current, a 1 Ohm resistor can be used. In a series circuit, the value of the current remains the same. So, adding the resistor in series to the circuit allows us to measure the current. Ohm's law states voltage can be calculated as V=IR, but when calculating the current the equation becomes I=V/R. We have a 1 Ohm resistor, if we have the voltage we can get the value of current as well. Voltage around the resistor was measured using another isolated controller so that it does not affect the flowing current. If you insert 1 Ohm and measure the voltage, I=V/R→I=V/1→I=V.

Configurations.

Adxl sensor configuration: ADXL343_RANGE_16_G; ADXL343_DATARATE_100_HZ.

Battery Percentage calculation per hour: Battery Percentage per hour=current (milliamps)/Battery current value (milliamp hour)*100.

Calculations.

TABLE 1

| Configuration | 3000 mAH | 1200 mAH |
|---|---|---|
| Arithematic Operation(Basic) | 0.94% | 2.33% |
| Arithematic Operation (Basic) with Adxl Sensor | 1.06% | 2.66% |
| HTTP Request | 2.27% | 5.67% |
| Adxl with no wifi and no Bluetooth | 0.83% | 2.09% |
| Deep sleep | 0.0001% | 0.00027% |

Some exemplary experiments yielding promising results are provided below.

Experiment 1A. In a first experiment, Wasserstein distance was used to compare data clouds/distributions using an accelerometer in a toilet tank in order to classify toilet leaks. Data sets from an accelerometer during known fluid tank conditions (e.g., stable, small, and major) were obtained. Wasserstein distances between the known data sets were calculated.

First, we split the data into fixed size chunks, and later also studied the dependence of results on the size of chunks. We used 10, 15, 30, 60 second chunks. As will be show in the data later, it was demonstrated that the results were not improving beyond 15 second chunks, so we choose it as a default size later.

For each chunk size, we took 5 samples from each of 3 types of circumstances: Stable, Small leak, Major leak. Then for all other data chunks, we would compute Wasserstain distance to all 15 originally picked samples. Then for each type (stable, small, major) we would compute an average of 5 distances, and consider it as a "distance to the corresponding type". Our classification then would say that the data chunk belongs to the type to which it had the smallest distance.

For computing Wasserstain distance, we use Keops Geomloss package

Evaluation Results are provided in Table 2 below.

| Run | Intervals (sec) | Total cases (plus samples) | Correct | Wrong |
|---|---|---|---|---|
| 1 | 10 | 552 (+15) | 336 | 216 |
| 2 | 10 | 544 (+15) | 380 | 164 |

| Run | Intervals (sec) | Total cases (plus samples) | Correct | Wrong |
|---|---|---|---|---|
| 3 | 10 | 548 (+15) | 380 | 164 |
| 4 | 15 | 363 (+15) | 230 | 133 |
| 5 | 15 | 358 (+15) | 251 | 107 |
| 6 | 15 | 360 (+15) | 252 | 108 |
| 7 | 30 | 173 (+15) | 111 | 62 |
| 8 | 30 | 171 (+15) | 132 | 39 |
| 9 | 30 | 173 (+15) | 123 | 50 |
| 10 | 60 | 79 (+15) | 46 | 33 |
| 11 | 60 | 77 (+15) | 62 | 15 |
| 12 | 60 | 78 (+15) | 56 | 22 |
| 13 | 10 | 163 (+15) | 161 | 2 |
| 14 | 10 | 163 (+15) | 59 | 104 |
| 15 | 10 | 164 (+15) | 102 | 62 |
| 16 | 15 | 103 (+15) | 103 | 0 |
| 17 | 15 | 103 (+15) | 38 | 65 |
| 18 | 15 | 104 (+15) | 70 | 34 |

Experiment 1B. In a second experiment, Wasserstein distance was used to compare data clouds/distributions using an accelerometer in a toilet tank in order to determine whether data was indicative of a stable (no leak) environment. We switched to a new setup, where we collected 5 samples from a stable environment. Then, for every other chunk of data, we established if the data chunk/set is "close enough" to stable or not.

We computed Wasserstein distances between the samples of data sets indicative of a stable environment. Then we find minimal distance between any two points in the sample. For other chunks of data, we classify them as stable if they are closer to any of the stable sample than 5 times the minimal distance. In other words, 5 times the minimal distance is taken as the threshold Wasserstein distance that indicates that the data set can be classified in a certain set.

Evaluation Results are provided in Table 3 below.

| Run | Intervals (sec) | Total cases (plus samples) | Correct | Wrong |
|---|---|---|---|---|
| 1 | 15 | 103 (+15) | 101 | 2 |
| 2 | 15 | 103 (+15) | 73 | 30 |
| 3 | 15 | 104 (+15) | 93 | 11 |
| 4 | 15 | 363 (+15) | 258 | 105 |
| 5 | 15 | 358 (+15) | 323 | 35 |
| 6 | 15 | 360 (+15) | 342 | 29 |

Experiment 1C.

Experiment 1B was modified to classify longer chunks of data (2 minute interval) by checking eight 15-chnks and establishing whether most of the intervals are classified as stable or not.

Evaluation Results are provided in Table 4 below.

| Run | Intervals (sec) | Total cases (plus samples) | Correct | Wrong |
|---|---|---|---|---|
| 1 | 15 | 15 | 15 | 0 |
| 2 | 15 | 14 | 10 | 4 |
| 3 | 15 | 15 | 15 | 0 |
| 4 | 15 | 47 | 41 | 6 |
| 5 | 15 | 46 | 43 | 3 |
| 6 | 15 | 46 | 45 | 1 |

In one aspect, the sensor data may be obtained from one or more sensors coupled to (attached or positioned in proximity to) animal-related devices/systems. The animal-related devices or systems may include one or more of: animal traps, animal/pet feeders, aquarium feeders, pet doors, chicken coop doors, and other animal-related systems that may benefit from identification of animal activities. One or more machine learning models may be used to classify the sensor data. The one or more sensors may include one or more of: an accelerometer, a gyroscope, and a compass. In one embodiment, the sensors include the combination of at least one of each an accelerometer, a gyroscope, and a compass. The sensor(s) produce motion/movement sensor data associated with animal activities.

Smart Animal Detection System

In one aspect, a smart animal detection system and method are disclosed. The animal detection system may include one or more sensors coupled to one or more of: animal trap(s), animal feeder(s), aquarium feeders, animal doors/enclosures (e.g., pet door, chicken coop, etc.), and a monitored area (e.g., a building, a house backyard, etc.).

In an exemplary embodiment, the one or more sensors may be included on IoT device(s) which both collect and analyze the sensor data in real time. Alternatively or additionally, the IoT device(s) may collect the sensor data and provide the sensor data to other parts of the smart animal detection system (e.g., a platform, as described elsewhere in the disclosure) for analysis. The smart animal detection system may use a machine learning/data evaluation method to detect animal activity based on the sensor data obtained from the one or more sensors. In one embodiment, the sensor data includes motion data associated with animals' micro-movements. Machine learning (ML) algorithm(s) may be used to classify current sensor data as belonging to sensor data indicative of: a specific animal activity, a detection of an animal, a detection of a specific animal, a detection of a type/species of animal, a detection of a specific or type of animal performing a specific animal activity, etc. In an embodiment, the system may implement one or more functions based on the results of the sensor data evaluation (e.g., controlling a door, sending a notification, etc.).

The system uses one or more optimization methods to lower the ML model's memory footprint and latency while keeping the energy usage/battery life of devices (e.g., IoT devices within the system) low. In one embodiment, devices within the system may be kept in sleep mode by default and woken up/turned on when an activity pattern relevant to a particular animal activity or group/species is detected. A threshold for the activity pattern may be calculated via statistical analysis of simulated and synthetically generated data. During model inference, large amounts of data is transferred between CPU and RAM, which increases computational costs and induces latency during operations. The system includes a hardware delegate code for efficient coordination of RAM and CPU. Finally, the system sues an optimal kernel for SVM (e.g., determined by building a testing framework to iteratively test kernel latency on the device through grid search).

Smart Animal Trap System

In one embodiment, the animal detection system may comprise a smart animal trap system having one or more sensors coupled to one or more animal traps. In one embodiment, the animal trap system includes a device for attracting animals via one or more of smell, vision, or sound. For example, the device may disperse a smell/fragrance or sound that is familiar/attractive to one or more specific animals. A mesh network of devices may be used to attract an animal (e.g., rodent) into a trap. The animal trap system may identify/detect an animal or an activity based on the sensor data and, based on a specific animal/activity, implement one or more actions. For example, the animal trap may determine that a wrong type of animal has been captured by a trap and, based on the determination, cause the trap to release the animal. In another example, the animal trap system may determine that an animal has been caught and, as a response, send an alert or notification to a user system. In another example, after determining that an animal has been caught by a trap, one or more sensors monitoring that trap may be turned off to conserve energy. In one embodiment, ML is used to predict that an animal is near a trap based on real-time sensor data and/or predict that a capture of the animal is imminent (or not). Time series data (real-time) may be used to train ML model(s).

Other Smart Systems

In one embodiment, the animal detection system comprises a smart animal/pet feeder system having sensor(s) coupled to an animal feeder. The smart animal feeder system may include one or more sensors coupled to a food/water feeder. The system may use ML to classify/analyze sensor data in order to, for example, identify specific animals or types of animals. The smart animal feeder may, for example, only disperse food/water based on a detection of a specific animal (e.g., a user's pet) or specific type of animal (e.g., cat). In another example, the animal feeder may automatically disperse a particular type of food or a particular amount of food based on a detection of a specific animal or type of animal.

In one embodiment, the animal feeder comprises an aquarium feeder. Using sensor data, the aquarium feeder may determine a type of fish (e.g., a specific species/grouping, a size/weight, etc.) currently trying to feed and, based on the determination, automatically disperse feed of an appropriate amount/type. In one implementation, the sensor(s) coupled to the aquarium feeder include one or more image sensors (e.g., video cameras). The system may use image processing and machine learning algorithm(s) to, for example, learn and/or predict fish habits and behaviors, and feed the fish as necessary.

In another embodiment, the smart animal detection system comprises a smart animal door/enclosure system (e.g., a house pet door, a chicken coop, etc.). The smart door/enclosure system may determine, based on sensor data, that a specific animal (e.g., a pet or a wild predator) is approaching or trying to enter an enclosure/building and, based on the determination, perform one or more appropriate functions (e.g., send a notification, sound an alarm/noise, open or close a door, etc.).

In other embodiments, the smart animal detection system comprises a mesh network of sensors distributed throughout an area of interest in order to detect animal activity in that area. For example, a network of microphones may be distributed in an outdoor area and the system may use the microphone audio data to identify/detect dangerous animals (e.g., rattlesnakes) within the area. The system may, in response to the determination, send an alert to nearby user device, send a notification to specific user system(s) and/or appropriate service/authority (e.g., animal control), and/or control one or more devices in the area (e.g., to scare off the animal or warn passerby).

Data Evaluation

In an aspect, a data evaluation system for identification/classification of movement (or other sensor data) is provided. In one embodiment, the movement may be related to animals interacting with (or being detected by) an animal trap, an animal/pet feeder, an animal door/enclosure, and/or a general monitored area. The movement/sensor data may be obtained via one or more sensors coupled a trap, a feeder, a door/enclosure, and/or distributed (e.g., as a mesh network) around an area. In an embodiment, one or more sensors may be used to obtain data related to micro-movement. Additionally or alternatively, one or more sensors may be used to obtain data related to sound. In one aspect, data from one or more of sensors including an accelerometer, a compass, a gyroscope, and/or a microphone can be obtained for analysis/classification. In one embodiment, the system performs analysis/classification of the movement/sensor data in order to determine whether a specific activity has occurred. In another embodiment, the system performs analysis/classification of the sensor data in order to identify an animal (e.g., specific animal, a type/species of animal, etc.).

In one aspect, analysis/classification of sensor data is performed using an ML algorithm/model. In one embodiment, an ML system is used to analyze the sensor data and produce a multi-class output whereas the classes represent animal species or groupings.

In one embodiment, a Wasserstein distance/metric approach is used in the ML algorithm. Analysis/classification of sensor data may be performed by using a Wasserstein distance/metric approach on the data received from the one or more sensor devices. The Wasserstein distance is a distance defined between two probability distributions on a given metric space and may be calculated as a distance between two data sets obtained from a sensor. The one embodiment, the system and/or method for classification/identification of motion/movement sensor data calculates Wasserstein distances between a first data set and a second data set, wherein the first data set comprises a known and identified evaluation data and the second data is the current movement/sensor data. In one embodiment, the Wasserstein distance(s) are then used to determine whether the second data set is "close enough" to the first data set to be categorized as belonging to the same category. In another embodiment, the second (current) data set may be compared (i.e., via Wasserstein distances) to a plurality of different classified first data sets (evaluation data) to determine the correct classification of the second/current data set.

In one embodiment, a method and device for identification/classification of an animal is disclosed. The classification may include classifying by a type of animal (e.g., mouse, rat, other rodent, etc.), a weight category of an animal (e.g., small, medium, large), or other types of animal categorization (e.g., for animal studies, etc.). The animal identification/classification may comprise identifying a type or category of animal by using ML (e.g., the Wasserstein distance/metric approach) on data received from one or more sensor devices (e.g., an accelerator, a 3-axis compass, a gyroscope, a microphone, etc.). The method and device may use sensor data obtained from a sensor coupled to one or more of: animal traps (e.g., attached to a door or body of a trap), animal food/water feeders, aquarium feeders, animal doors/enclosure, and a monitored area (e.g., several sensors distributed in an area). In one implementation, sensors may be distributed throughout an area (e.g., in a mesh network configuration).

In another embodiment, a method and device for identification/classification of an animal-related activity/event using is disclosed. The method may use ML (e.g., the Wasserstein distance approach) on data sets obtained from one or more sensors (described elsewhere in the disclosure) to classify sensor data as being indicative of a specific animal activity. The event identification may comprise detecting one or more specific activities, for example, an animal trapped in a trap, an animal triggering a trap without getting caught, an animal eating or drinking from a feeder, an animal approaching or trying to eat/drink from a feeder, an animal overturning/disturbing a feeder, an animal approaching but not triggering a trap or feeder, an animal trying to enter an enclosure, etc.

A processing system can be coupled with the at least one sensor and configured to communicate the movement/sensor data, for example, to a platform.

In one embodiment, the platform can comprise an application communicatively coupled to one or more databases (e.g., remote databases) storing evaluation data, and can be configured to receive the movement/sensor data and (i) determine if a specific animal-related event has occurred at/in the monitored system (e.g., near or in an animal trap, animal feeder, animal door/enclosure, monitored area) and/or (ii) identify/classify a type of event/activity of the monitored system/object using ML algorithm(s)/model(s). The ML algorithm may be based at least in part on calculating Wasserstein distances between data clouds obtained from the current movement/sensor data to the previously obtained and classified evaluation data (e.g., data corresponding to specific conditions/activities/events).

In another embodiment, the platform can comprise an application communicatively coupled to the one or more databases storing evaluation data, and can be configured to receive the movement/sensor data and (i) determine if a specific animal or type of animal has been detected within the monitored system/object and/or (ii) identify/classify a type of animal in or near the monitored system/object using ML. The ML algorithm may be based at least in part on calculating Wasserstein distances between data clouds obtained from the current movement/sensor data to the previously obtained and classified evaluation data (e.g., data corresponding to movement related to types of animals).

In some embodiments, the platform can comprise one or more databases storing evaluation data associated with a specific event/activity or a specific animal type within the system, and an application coupled with the at least one database and configured to receive the movement/sensor data and determine if the specific event/activity has occurred (e.g., a specific type of animal has been caught by a trap) based at least in part on comparing the movement/sensor data to the evaluation data.

Evaluation data can comprise data associated with the monitored system/entity (e.g., trap, feeder, etc.). In some aspects, evaluation data can be collected as part of an installation or training process, for example, movement/sensor data under known/specific conditions may be collected and saved as evaluation data and the evaluation data can be sent to the database(s) via one or more sensor devices and/or via a user system input device. Alternatively or additionally, evaluation data can be continuously or periodically collected during the operation of the animal detection system.

Such evaluation data can include, among other things, historic movement/sensor data associated with known specific conditions (e.g., movement or audio data associated with a specific animal activity or a specific type of animal). The application can be configured to use ML to determine whether a specific animal activity/event has occurred (or if a specific animal has been detected) by comparing the movement/sensor data obtained from the one or more sensor devices to evaluation data associated with various known events and conditions. Specifically, the application can be configured to calculate Wasserstein distance(s) from the current movement/sensor data to the evaluation data to determine whether the conditions associated with the current movement/sensor data can be accurately categorized as belonging to one of the known events and conditions.

In some aspects, the application can be configured to determine an event type (e.g., animal caught by trap, animal escaping trap, animal eating/drinking from feeder, etc.) or an animal type by comparing sensor data obtained from the one or more sensor devices (e.g., attached to a trap) to evaluation data. In another aspect, the application can be configured to determine a type of event/condition of the monitored system/entity by comparing the current movement/sensor data to a plurality of pre-categorized sets of evaluation data.

Sensor

In some aspects, the at least one sensor comprises one or a combination of: an accelerator, a compass, a gyroscope, and a microphone/sound sensor. In an embodiment, the at least one sensor comprises at least one accelerometer, wherein the accelerometer is attached to the body and/or door of an animal trap, a feeder, etc. The movement data can comprise accelerometer data (e.g., X, Y and/or Z coordinate data at different times; delta in X, Y and/or Z coordinate data over time) from the accelerometer coupled to the monitored system/entity (e.g., animal trap(s), feeder(s), monitored area), and the evaluation data can comprise at least accelerometer data associated with one or more known conditions (e.g., non-animal movement, an animal caught in a trap, a specific animal caught in a trap, an animal escaping a trap, etc.). In another embodiment, the at least one sensor comprises at least one compass (e.g., a 3-axis magnetic compass sensor) coupled to the monitored system/entity. The movement data can include, for example, X-Y-Z position data and heading/orientation data associated with a known condition of the monitored system/entity. The movement data can also include the compass data associated with different known conditions/events. In one embodiment, the at least one sensor comprises at least one gyroscope (e.g., attached to a trap) and the movement data can include, for example, heading/orientation and angular velocity data associated with known conditions. In one embodiment, the at least one sensor comprises at least one microphone (e.g., positioned on, in, or near a trap, feeder, monitored area, etc.), and the sensor data can include audio data (e.g., amplitude and frequency) associated with known conditions of the system/entity (e.g., audio data associated with a specific animal). In one aspect, data from one or more of the accelerometer, compass, gyroscope, and/or microphone can be used to identify an event or condition of the monitored system/entity as discussed elsewhere in the disclosure.

The at least one sensor can further comprise a distance sensor (e.g., laser sensor, ultrasound sensor), and the sensor data can comprise distance data at various times from the sensor to a specific portion of the system/entity. In one embodiment, the evaluation data can comprise weight data, which can for example be obtained using a weight sensor configured to weigh a trap or feeder at various times. The weight sensor can be coupled to the sample trap or feeder. Thus, the weight data can comprise weight data at different times and/or a change in weight between two or more times or time periods.

The sensor data can comprise data indicative of a distance from a sensor to the specific portion of the monitored system/entity and/or data indicative of a movement of a sensor coupled to the monitored system/entity (e.g., sensor attached to trap) over time. In some aspects, a second sensor device separate from the first sensor can comprise an ultrasonic sensor, a first sensor device can comprise the weight sensor, and optionally a third sensor device separate from the first and second devices can comprise a third sensor (e.g., ultrasonic sensor, accelerometer). It should be appreciated that each sensor device can comprise a processing system coupled with at least one sensor of the sensor device, and be configured to communicate sensor data to the application running on the platform.

In some aspects, the at least one sensor can comprise an accelerometer and the sensor data can comprise vector magnitude data.

Thus, it should be appreciated that the at least one sensor can comprise any suitable number and type(s) of sensors, including, for example, one or more accelerometers, one or more magnetic compasses, one or more gyroscopes, one or more microphones, one or more temperature sensors, one or more laser sensors, and/or one or more ultrasonic sensors.

In one embodiment, one or more sensor device(s) can be attached to, for example, an inside or outside an animal trap or feeder. In another embodiment, the one or more sensor device(s) can be detached but positioned near enough to the monitored system/entity to obtain movement or audio data of the system/entity (e.g., near a trap/feeder or near an area being monitored for animal activity).

User System

A user system application may be provided, and can be configured to receive condition information from the platform. The condition information can be associated with a status of the monitored system/entity. In some aspects, the user system application can be configured to display the indication of the status of the system/entity via a display of the user system. The indication can comprise, for example, a warning or alert (e.g., a caught animal, a triggered trap, an empty feeder). In some aspects, the user system application can be configured to receive information associated with the monitored system/entity via the user interface.

Method—Wasserstein

In some aspects, a method for animal or animal activity identification/classification comprises using one or more hardware processors to (a) obtain sensor data (e.g., vector magnitudes within small time intervals, collected over a given period of time) from at least one sensor device coupled to a monitored system/device, (b) calculate Wasserstein distances between a data distribution set from the obtained sensor data and at least one previously classified distribution data set, and (c) use the Wassertein distance(s) to categorize the sensor data. In an exemplary embodiment, the sensor data can be classified as belonging to a particular set (e.g., non-disturbed animal trap, a specific animal caught in a trap, etc.) if the Wasserstein distance between the sensor data and the particular evaluation set (associated with the environment) is within a predetermined threshold. In another embodiment, the sensor data set can be compared to (i.e., via Wasserstein distance) to multiple evaluation data sets associated with multiple scenarios of the system/entity and be classified according to the shortest Wasserstein distance.

In some aspects, a method for detecting an event/condition comprises using one or more hardware processors to (a) obtain sensor data from a first sensor device (e.g., a microphone attached to a trap or near an area), (b) obtain sensor data from a second sensor device, (c) obtain sensor data from a third sensor device, wherein each of the first, second and third sensor devices are deployed in different monitored systems (e.g., first, second and third monitored areas of the same building or environment), and (d) determine a condition associated with each of the first, second and third systems based at least in part of the sensor data obtained from the first, second and third sensor devices. In some aspects, determining if there is a condition (e.g., pest(s) detected) in one or more of the systems can comprise, for example, determining a vector magnitude, a change in distance from a sensor to a portion of the system over time, a period of time of a movement associated with the sensor data, or any other suitable data based on the sensor data. In some aspects, determining if a condition has occurred (e.g., presence of pests) in one or more of the systems can comprise, for example, comparing sensor data obtained from the first, second and/or third sensor devices to evaluation data stored in one or more databases.

A sensor device of the plurality of sensor devices can comprise any suitable number and type(s) of sensors, including, for example, one or more accelerometers, one or more compass sensors, one or more gyroscopes, one or more microphones, one or more laser sensors, one or more temperature sensors, one or more weight sensors, and/or one or more ultrasonic sensors. In some aspects, an ultrasonic sensor can use a transducer to send and receive ultrasonic pulses that relay back information about a flow, for example, the length of time of a flow. In some aspects, the one or more sensors can comprise an accelerometer and the fluid data can comprise vector magnitude data.

A sensor device of the plurality of sensor devices can be coupled to a monitored system/entity (e.g., positioned in/on a trap/feeder).

The application can further be configured to determine a future event is likely in one or more monitored systems by comparing the sensor data to the evaluation data.

Any of the methods above and elsewhere in this application may be embodied, individually or in any combination, in executable software modules of a processor-based system, such as a server, and/or in executable instructions stored in a non-transitory computer-readable medium.

Other advantages and benefits of the disclosed devices, systems and methods will be apparent to one of ordinary skill with a review of the following drawings and detailed description.

Thus, specific examples of devices, systems and methods for activity detection, measuring and/or monitoring have been disclosed. The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

As used herein and in the appended claims, the singular forms "a," "an," and "the" include plural referents unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation.

Reference throughout this specification to "an embodiment" or "an implementation" means that a particular feature, structure, or characteristic described in connection with the embodiment is included in at least one embodiment or implementation. Thus, appearances of the phrases "in an embodiment" in various places throughout this specification are not necessarily all referring to the same embodiment or a single exclusive embodiment. Furthermore, the particular features, structures, or characteristics described herein may be combined in any suitable manner in one or more embodiments or one or more implementations.

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Certain numerical values and ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

All structural and functional equivalents to the components of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for leak detection in a fluid system including a conduit and a fluid passing through the conduit, comprising: a sensor device comprising at least one sensor configured to detect fluid data associated with the fluid passing through the conduit, wherein the at least one sensor comprises a compass and wherein the fluid data comprises heading data; a processing system coupled with the at least one sensor and configured to communicate the fluid data; and a platform comprising: an application communicatively coupled with at least one database storing evaluation data, and configured to receive the fluid data and determine if there is a leak in the fluid system by determining a Wasserstein distance between the fluid data to the evaluation data.

2. The system of claim 1, wherein the fluid system comprises at least one of a toilet system, a pool system, a gas system, an irrigation system, and an air conditioning system.

3. The system of claim 1, wherein the fluid data is associated with a first time period of flow of the fluid passing through the conduit at a first time, wherein a second time period of flow of the fluid passing through the conduit at a second time, and wherein the evaluation data comprises at least one of period of flow data associated with a normal flow of the fluid passing through the conduit, and period of flow data associated with at least one of a minor leak, a medium leak, and a major leak of the fluid passing through the conduit.

4. The system of claim 1, wherein the at least one sensor comprises an accelerometer and wherein the accelerometer is positioned in a tank coupled to the conduit, the tank comprising the fluid, wherein the fluid data comprises accelerometer data, wherein the evaluation data comprises at least accelerometer data associated with a normal flow of the fluid passing through the conduit, and accelerometer data associated with at least one of a minor leak, a medium leak, and a major leak of the fluid passing through the conduit.

5. The system of claim 1, in addition to the compass, the at least one sensor further comprising one or more of an accelerometer, a gyroscope, a sound sensor, a laser sensor, a temperature sensor, a video camera, a frame camera, and an ultrasonic sensor.

6. The system of claim 1, wherein the at least one sensor comprises an accelerometer and wherein the fluid data comprises vector magnitude data.

7. The system of claim 1, wherein the sensor device is configured to be wrapped around at least a portion of the conduit, and wherein the fluid data is associated with a set of time periods of flow of the fluid of the conduit.

8. The system of claim 1, wherein the fluid system comprises a toilet system including a toilet tank, and wherein the sensor device is positioned in a float of the toilet tank.

9. The system of claim 1, wherein the fluid data comprises vector magnitude data and time periods of flow data.

10. The system of claim 1, wherein the fluid system comprises a pool system, wherein the pool system comprises a sample container within a pool, each of the sample container and the pool comprising the fluid, wherein the at least one sensor comprises a distance sensor, wherein the fluid data comprises distance data associated with a distance from the sensor to a top of the fluid in the pool at a set of different time periods, and wherein the evaluation data comprises weight data obtained from a weight sensor configured to determine a weight of the sample container and the fluid contained therein at the set of different time periods.

11. A fluid monitoring system, comprising:
a sensor comprising at least one or more of an accelerometer, a gyroscope, a compass, a sound sensor, a laser sensor, a temperature sensor, video camera and frame camera, and an ultrasonic sensor, alone or in combination;
the sensor configured to detect fluid data associated with a fluid flowing through a first pipe section;
a wired or wireless communication interface; and
at least one processor configured to perform instructions, the instruction configured to cause the at least one processor to:
receive the fluid data;
determine whether the fluid data is indicative of a normal condition or an abnormal condition; and
upon determining the fluid data is indicative of an abnormal condition, at least one of:
cause a fluid valve coupled to the fluid pipe section to adjust;
modify a parameter associated with the accelerometer; and
transmit to at least one of a platform, an external system and a user system, via the communication interface, at least one of the fluid data and a notification relating to the fluid data; and
a second sensor configured to detect a second fluid data associated with a second fluid flowing through a second pipe section;
a second wired or wireless communication interface; and
at least one second processor configured to perform instructions, the instruction configured to cause the at least one second processor to:
receive the second fluid data;
determine whether the second fluid data is indicative of a second normal condition or a second abnormal condition; and
upon determining the second fluid data is indicative of a second abnormal condition, at least one of:
cause a second fluid valve coupled to the second fluid pipe section to adjust;
modify a parameter associated with the second accelerometer; and
transmit to at least one of the platform, the external system and the user system, via the second communication interface, at least one of the second fluid data and a second notification relating to the second fluid data.

12. The system of claim 11, wherein the parameter associated with the sensor is associated with a frequency and/or length of time the accelerometer is configured to detect the fluid data.

13. The system of claim 11, wherein the valve comprises a ball valve, wherein the sensor is coupled to a motor that is coupled to the fluid valve, and wherein the fluid data comprises a vibration data during a time period.

14. The system of claim 11, wherein causing the fluid valve coupled to the fluid pipe section to adjust comprises controlling an electric motor coupled to the fluid valve.

15. The system of claim 11, wherein the at least one of the fluid data and the notification relating to the fluid data comprises usage data.

16. The system of claim 11, wherein the notification relating to the fluid data is indicative of a present or future leak.

* * * * *